US007545822B2

(12) United States Patent
Fukunaga et al.

(10) Patent No.: US 7,545,822 B2
(45) Date of Patent: Jun. 9, 2009

(54) INFORMATION COMMUNICATION SYSTEM, INFORMATION COMMUNICATION METHOD, INFORMATION SIGNAL PROCESSING DEVICE AND INFORMATION SIGNAL PROCESSING METHOD, AND STORAGE MEDIUM

(75) Inventors: Koji Fukunaga, Kanagawa (JP); Kiyoshi Katano, Chiba (JP); Atsushi Nakamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 711 days.

(21) Appl. No.: 11/222,784

(22) Filed: Sep. 12, 2005

(65) Prior Publication Data

US 2006/0002314 A1 Jan. 5, 2006

Related U.S. Application Data

(60) Division of application No. 09/843,911, filed on Apr. 30, 2001, now Pat. No. 6,996,112, which is a continuation of application No. PCT/JP00/05931, filed on Aug. 31, 2000.

(30) Foreign Application Priority Data

Aug. 31, 1999 (JP) .................................. 11-246725
Aug. 31, 1999 (JP) .................................. 11-246729
Aug. 31, 1999 (JP) .................................. 11-246730

(51) Int. Cl.
*H04L 12/28* (2006.01)
(52) U.S. Cl. .................... 370/401; 370/257; 710/306
(58) Field of Classification Search ................ None
See application file for complete search history.

(56) References Cited

U.S. PATENT DOCUMENTS

| 5,764,930 A | | 6/1998 | Staats ......................... 710/107 |
| 6,160,796 A | * | 12/2000 | Zou ............................. 370/257 |
| 6,512,767 B1 | * | 1/2003 | Takeda et al. ............... 370/389 |
| 6,542,510 B1 | * | 4/2003 | Fujimori et al. ............. 370/402 |
| 6,678,781 B1 | | 1/2004 | Domon ........................ 710/312 |

(Continued)

FOREIGN PATENT DOCUMENTS

CN  1 208 290 A  2/1999

(Continued)

OTHER PUBLICATIONS

Scheel, Dick, "Proposal for change to reset notification/acknowledgement procedure in P1394.1 draft 0.02", <URL:http://grouper.ieee.org/groups/1394/1/Documents/BR002r00.pdf>, retrieved Feb. 21, 2002.

(Continued)

*Primary Examiner*—Duc C Ho
(74) *Attorney, Agent, or Firm*—Fitzpatrick, Cella, Harper & Scinto

(57) ABSTRACT

When a plurality of information signal processing apparatuses are connected via IEEE 1394 communication control buses, these buses are connected via bridges, and bus reset occurs on a remote bus other than connected buses (step S1501), occurrence of remote bus reset is notified (steps S1502, S1505). Thus, even if bus reset occurs, the consistency of bus reset processing in an upper protocol layer can be ensured to realize normal data communication between buses.

5 Claims, 40 Drawing Sheets

U.S. PATENT DOCUMENTS

| | | |
|---|---|---|
| 6,735,619 B1 | 5/2004 | Sawada .................. 709/212 |
| 6,757,743 B1 * | 6/2004 | Tamori et al. ............ 709/249 |
| 7,383,341 B1 * | 6/2008 | Saito et al. .............. 709/228 |

FOREIGN PATENT DOCUMENTS

| | | |
|---|---|---|
| DE | 198 35 668 | 2/1999 |
| EP | 0 833 485 | 4/1985 |
| JP | 11-68884 | 3/1999 |

OTHER PUBLICATIONS

Serial Bus reset detection, <URL:http://grouper.ieee.org/groups/1394/1/documents/br003r00.pdf>, retrieved Feb. 12, 2002.

* cited by examiner

FIG. 7
CSR CORE REGISTER

| OFFSET (HEXADECIMAL) | REGISTER NAME | FUNCTION |
|---|---|---|
| 000 | STATE_CLEAR | INFORMATION ABOUT STATUS AND CONTROL |
| 004 | STATE_SET | INFORMATION REPRESENTING WHETHER STATE_CLEAR CAN BE WRITTEN |
| 008 | NODE_IDS | BUS ID + NODE ID |
| 00C | RESET_START | RESET BUS BY WRITE IN THIS AREA |
| 010~014 | INDIRECT_ADDRESS, INDIRECT_DATA | REGISTER FOR ACCESSING ROM LARGER THAN 1K |
| 018~01C | SPLIT_TIMEOUT | VALUE OF TIMER FOR DETECTING TIME-OUT OF SPLIT TRANSACTION |
| 020~02C | ARGUMENT, TEST_START, TEST_STATUS | DIAGNOSTIC REGISTER |
| 030~04C | UNITS_BASE, UNITS_BOUND, MEMORY_BASE, MEMORY_BOUND | UNUSED IN IEEE1394 |
| 050~054 | INTERRUPT_TARGET, INTERRUPT_MASK | INTERRUPT NOTIFICATION REGISTER |
| 058~07C | CLOCK_VALUE, CLOCK_TICK_PERIOD, CLOCK_STROBE_ARRIVED, CLOCK_INFO | UNUSED IN IEEE1394 |
| 080~0FC | MESSAGE_REQUEST, MESSAGE_RESPONSE | MESSAGE NOTIFICATION REGISTER |
| 100~17C | | RESERVED |
| 180~1FC | ERROR_LOG_BUFFER | RESERVED FOR IEEE1394 |

FIG. 8
SERIAL BUS REGISTER

| OFFSET (HEXADECIMAL) | REGISTER NAME | FUNCTION |
|---|---|---|
| 200 | CYCLE_TIME | COUNTER FOR ISOCHRONOUS TRANSFER |
| 204 | BUS_TIME | REGISTER FOR SYNCHRONIZING TIME |
| 208 | POWER_FAIL_IMMINENT | REGISTER CONCERNING POWER SUPPLY |
| 20C | POWER_SOURCE | |
| 210 | BUSY_TIMEOUT | CONTROL RETRY OF TRANSACTION LAYER |
| 214~218 | | RESERVED |
| 21C | BUS_MANAGER_ID | NODE ID OF BUS MANAGER |
| 220 | BANDWIDTH_AVAILABLE | MANAGE ISOCHRONOUS TRANSFER BANDWIDTH |
| 224~228 | CHANNELS_AVAILABLE | MANAGE ISOCHRONOUS TRANSFER CHANNEL NUMBER |
| 22C | MAINT_CONTROL | DIAGNOSTIC REGISTER |
| 230 | MAINT_UTILITY | |
| 234~3FC | | RESERVED |

CONFIGURATION ROM OF MINIMUM FORMAT

FIG. 11

SERIAL BUS DEVICE REGISTER

| OFFSET (HEXADECIMAL) | REGISTER NAME | FUNCTION |
|---|---|---|
| 800~FFC | | RESERVED |
| 1000~13FC | TOPOLOGY_MAP | INFORMATION ABOUT CONFIGURATION OF SERIAL BUS |
| 1400~1FFC | | RESERVED |
| 2000~2FFC | SPEED_MAP | INFORMATION ABOUT TRANSFER SPEED OF SERIAL BUS |
| 3000~FFFC | | RESERVED |

SECTIONAL VIEW OF CABLE

EXCLUSIVE OR SIGNAL OF Data AND Strobe

□ : PORT
p : PORT CONNECTED TO PARENT NODE
c : PORT CONNECTED TO CHILD NODE

REQUESTS FOR BUS ACCESS

PERMISSION FOR BUS ACCESS

PACKET OF ISOCHRONOUS DATA

FIG. 26
SERIAL BUS REGISTER

| OFFSET (HEXADECIMAL) | REGISTER NAME | FUNCTION |
|---|---|---|
| 200 | CYCLE_TIME | COUNTER FOR ISOCHRONOUS TRANSFER |
| 204 | BUS_TIME | REGISTER FOR SYNCHRONIZING TIME |
| 208 | POWER_FAIL_IMMINENT | REGISTER CONCERNING POWER SUPPLY |
| 20C | POWER_SOURCE | |
| 210 | BUSY_TIMEOUT | CONTROL RETRY OF TRANSACTION LAYER |
| 214~218 | | RESERVED |
| 21C | BUS_MANAGER_ID | NODE TRANSFER OF BUS MANAGER |
| 220 | BANDWIDTH_AVAILABLE | MANAGE ISOCHRONOUS TRANSFER BANDWIDTH |
| 224~228 | CHANNELS_AVAILABLE | MANAGE ISOCHRONOUS TRANSFER CHANNEL NUMBER |
| 22C | MAINT_CONTROL | DIAGNOSTIC REGISTER |
| 230 | MAINT_UTILITY | |
| 234~3FC | | RESERVED |
| 240 | REMOTE_BUS_RESET | BUS RESET NOTIFICATION ON REMOTE BUS |

FIG. 30

SERIAL BUS REGISTER

| OFFSET (HEXADECIMAL) | REGISTER NAME | FUNCTION |
|---|---|---|
| 200 | CYCLE_TIME | COUNTER FOR ISOCHRONOUS TRANSFER |
| 204 | BUS_TIME | REGISTER FOR SYNCHRONIZING TIME |
| 208 | POWER_FAIL_IMMINENT | REGISTER CONCERNING POWER SUPPLY |
| 20C | POWER_SOURCE | |
| 210 | BUSY_TIMEOUT | CONTROL RETRY OF TRANSACTION LAYER |
| 214~218 | | RESERVED |
| 21C | BUS_MANAGER_ID | NODE ID OF BUS MANAGER |
| 220 | BANDWIDTH_AVAILABLE | MANAGE ISOCHRONOUS TRANSFER BANDWIDTH |
| 224~228 | CHANNELS_AVAILABLE | MANAGE ISOCHRONOUS TRANSFER CHANNEL NUMBER |
| 22C | MAINT_CONTROL | DIAGNOSTIC REGISTER |
| 230 | MAINT_UTILITY | |
| 234~3FC | | RESERVED |
| 240 | REMOTE_BUS_RESET | BUS RESET NOTIFICATION ON REMOTE BUS |
| 244 | NOTIFY_BUS_RESET | RESERVATION OF BUS RESET NOTIFICATION ON REMOTE BUS |

F I G. 37
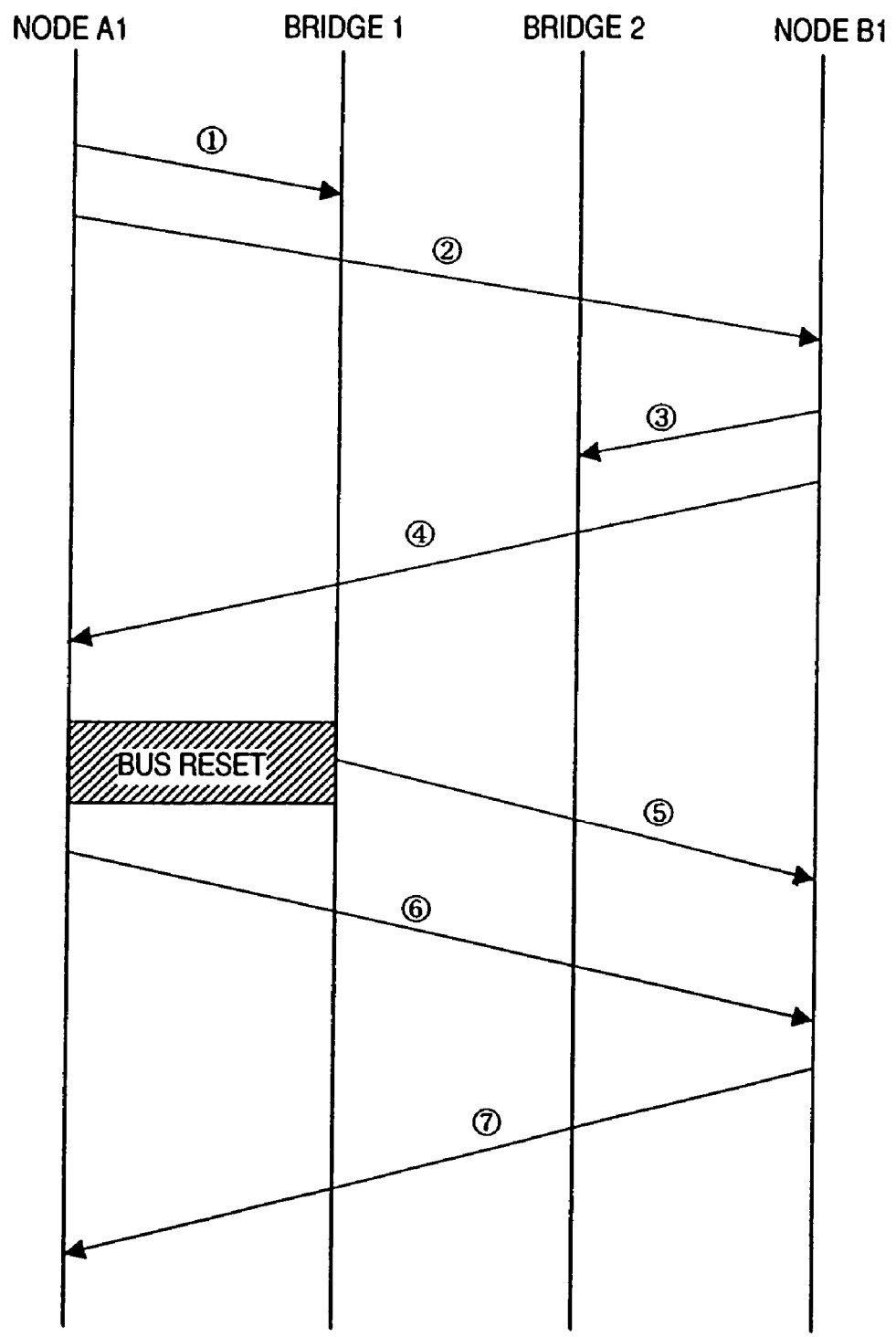

FIG. 39
SERIAL BUS REGISTER

| OFFSET (HEXADECIMAL) | REGISTER NAME | FUNCTION |
|---|---|---|
| 200 | CYCLE_TIME | COUNTER FOR ISOCHRONOUS TRANSFER |
| 204 | BUS_TIME | REGISTER FOR SYNCHRONIZING TIME |
| 208 | POWER_FAIL_IMMINENT | REGISTER CONCERNING POWER SUPPLY |
| 20C | POWER_SOURCE | |
| 210 | BUSY_TIMEOUT | CONTROL RETRY OF TRANSACTION LAYER |
| 214~218 | | RESERVED |
| 21C | BUS_MANAGER_ID | NODE ID OF BUS MANAGER |
| 220 | BANDWIDTH_AVAILABLE | MANAGE ISOCHRONOUS TRANSFER BANDWIDTH |
| 224~228 | CHANNELS_AVAILABLE | MANAGE ISOCHRONOUS TRANSFER CHANNEL NUMBER |
| 22C | MAINT_CONTROL | DIAGNOSTIC REGISTER |
| 230 | MAINT_UTILITY | |
| 234~23C | | RESERVED |

INFORMATION COMMUNICATION SYSTEM, INFORMATION COMMUNICATION METHOD, INFORMATION SIGNAL PROCESSING DEVICE AND INFORMATION SIGNAL PROCESSING METHOD, AND STORAGE MEDIUM

This application is a divisional application of application Ser. No. 09/843,911, filed Apr. 30, 2001, now U.S. Pat. No. 6,996,112, which is a Rule 1.53(b) continuation application of International Application No. PCT/JP00/05931, filed Aug. 31, 2000, both of which are incorporated herein by reference.

TECHNICAL FIELD

The present invention relates to an information signal processing apparatus connected to a communication control network and an information signal processing method and, more particularly, to an information signal processing apparatus connected to an IEEE 1394-compliant communication control bus and an information signal processing method.

Moreover, the present invention relates to an information communication system having a first communication control network, a second communication network different from the first communication control network, and a connection device for enabling communication between the first communication control network and the second communication network, and an information communication method and, more particularly, to an information communication system connected by, e.g., an IEEE 1394 serial interface, and an information communication method.

BACKGROUND ART

A serial bus interface such as an IEEE 1394 interface can simultaneously connect a plurality of devices such as a DV (Digital Video), DC (Digital Camera), host computer, scanner, and VTR, unlike a so-called centronics parallel interface for one-to-one connection between a host computer and a terminal (device). This serial bus interface can realize a data communication network system or home network constructed by connecting a plurality of devices based on an IEEE 1394 standard as one of serial bus standards.

Various devices are connected to these networks, and many unspecified devices of different manufacturers may be connected.

According to IEEE 1394-1995, a maximum of 63 nodes can be connected to one 1394 bus (to be referred to as a "local bus" hereinafter) by an IEEE 1394 serial bus address designation method. If a 10-bit address space is defined for designation of a bus ID for specifying a bus, 1,023 buses can be connected to each other. In a cable environment, a cable between information signal processing apparatuses (to be referred to as "nodes" hereinafter) serving as devices is 4.5 m long at maximum.

To solve technical limitations posed when more than a connectable maximum of 63 devices are to be connected via an IEEE 1394 bus or a plurality of IEEE 1394 buses located at remote places are to be connected to each other, a device called a "1394 bridge" is generally used. By connecting a plurality of IEEE 1394 local buses via 1394 bridges, devices connected to the different local buses can communicate data.

In IEEE 1394, when the bus configuration changes by, e.g., an increase/decrease in the number of nodes upon insertion/removal of a device node, ON/OFF operation of the power supply, activation by hardware detection owing to a network error, or a direct instruction under host control from a protocol, a new network configuration must be recognized. In this case, each node which has detected the change transmits a bus reset signal to execute a mode in which a new network configuration is recognized.

This bus reset signal is transmitted to another nodes on the local bus. After all the nodes detect the bus reset signal, bus reset starts. When bus reset starts, data transfer is temporarily suspended. After the bus reset is finished, the suspended data transfer is restarted in a new network configuration.

In a device connected to an IEEE 1394 bus, a physical layer and data link layer in a transfer protocol are defined by IEEE 1394. As, for the upper layer, various upper protocols are defined and implemented in accordance with the intended use and application of a device.

The upper protocols of IEEE 1394 determine a connection establishment method in communicating data with a specific device using an IEEE 1394 bus, a resource management method, an application data transmission/reception method, a connection cancellation method at the end of data transfer, a resume method in bus reset which is a feature of IEEE 1394 in addition to resume from an error, and protocols before and after bus reset.

A DPP (Direct Print Protocol) as an example of the upper protocols defines that when bus reset occurs, a device which establishes a connection at the start of data transfer issues a reset command, and the other device returns an acknowledge upon reception of the command, thereby restarting data transfer.

An AV/C protocol defines that when bus reset occurs before a node which has received an AV/C command issued by the other node sends a response, the command itself becomes invalid, and the command issuing node cannot expect any response.

In this manner, when IEEE 1394 bus reset occurs, data transfer is temporarily suspended, and the network topology changes before and after bus reset. An upper protocol layer must cope with such a status change, so that the protocol standard defines procedures on both the data transmitting and receiving sides upon occurrence of bus reset. This definition allows continuing data transfer between devices which implement the same upper protocol without any influence because, if bus reset occurs, the data transmitting and receiving sides execute the defined appropriate processes in data transfer.

However, if bus reset occurs on one local bus connected to another IEEE 1394 bus, the IEEE 1394 bridge does not transfer the bus reset signal to the other local bus (to be referred to as a "remote bus" hereinafter), i.e., does not propagate bus reset between the busses. Therefore, an error may occur in data transfer between nodes via the bridge.

When data is transferred between devices on the same local bus using the above-mentioned upper protocols, bus reset is transmitted to all the nodes on the local bus. Accordingly, both the data transmission and reception nodes can detect bus reset, and can appropriately execute bus reset procedures by the upper protocols.

However, if bus reset occurs on one local bus during data transfer from a data transmission node on the local bus to a data reception node connected to the other local bus via an IEEE 1394 bridge, the IEEE 1394 bridge does not propagate bus reset to the other bus. Therefore, the node connected to the remote bus cannot detect the bus reset, only the device connected to the local bus executes a bus reset procedure by the upper protocol layer, and the processes between the data transmitting and receiving sides are inconsistent.

DISCLOSURE OF INVENTION

It is an object of the present invention to provide a communication network system capable of performing normal data communication between communication control networks while maintaining the consistency of network configuration update request processing in an upper protocol layer in a system constituted by connecting a plurality of communication control networks (e.g., IEEE 1394 buses) via a connection device (e.g., IEEE 1394 bridge).

It is another object of the present invention to provide a communication network system capable of performing normal data communication between buses while maintaining the consistency of bus reset processing in an upper protocol layer in a system constituted by connecting a plurality of communication control networks (e.g., IEEE 1394 buses) via a connection device (e.g., IEEE 1394 bridge).

Other features and advantages of the present invention will be apparent from the following description taken in conjunction with the accompanying drawings, in which like reference characters designate the same or similar parts throughout the figures thereof.

BRIEF DESCRIPTION OF DRAWINGS

FIG. 7 is a view showing an example of the address and function of information stored in a CSR core register in the first embodiment;

FIG. 8 is a view showing an example of the address and function of information stored in a serial bus register in the first embodiment;

FIG. 11 is a view showing an example of the address and function of information stored in the serial bus register of a unit space in the first embodiment;

FIG. 26 is a view showing the serial bus register area of the 1394 node in the first embodiment;

FIG. 30 is a view showing the serial bus register area of a 1394 node in the second embodiment according to the present invention;

FIG. 37 is a view showing communication control procedures complying with a DPP protocol in the fourth embodiment;

FIG. 39 is a view showing the serial bus register area of a 1394 node in the fifth embodiment according to the present invention;

BEST MODE FOR CARRYING OUT THE INVENTION

Preferred embodiments of present invention will be described in detail below with reference to the accompanying drawings.

First Embodiment

Figure 1:
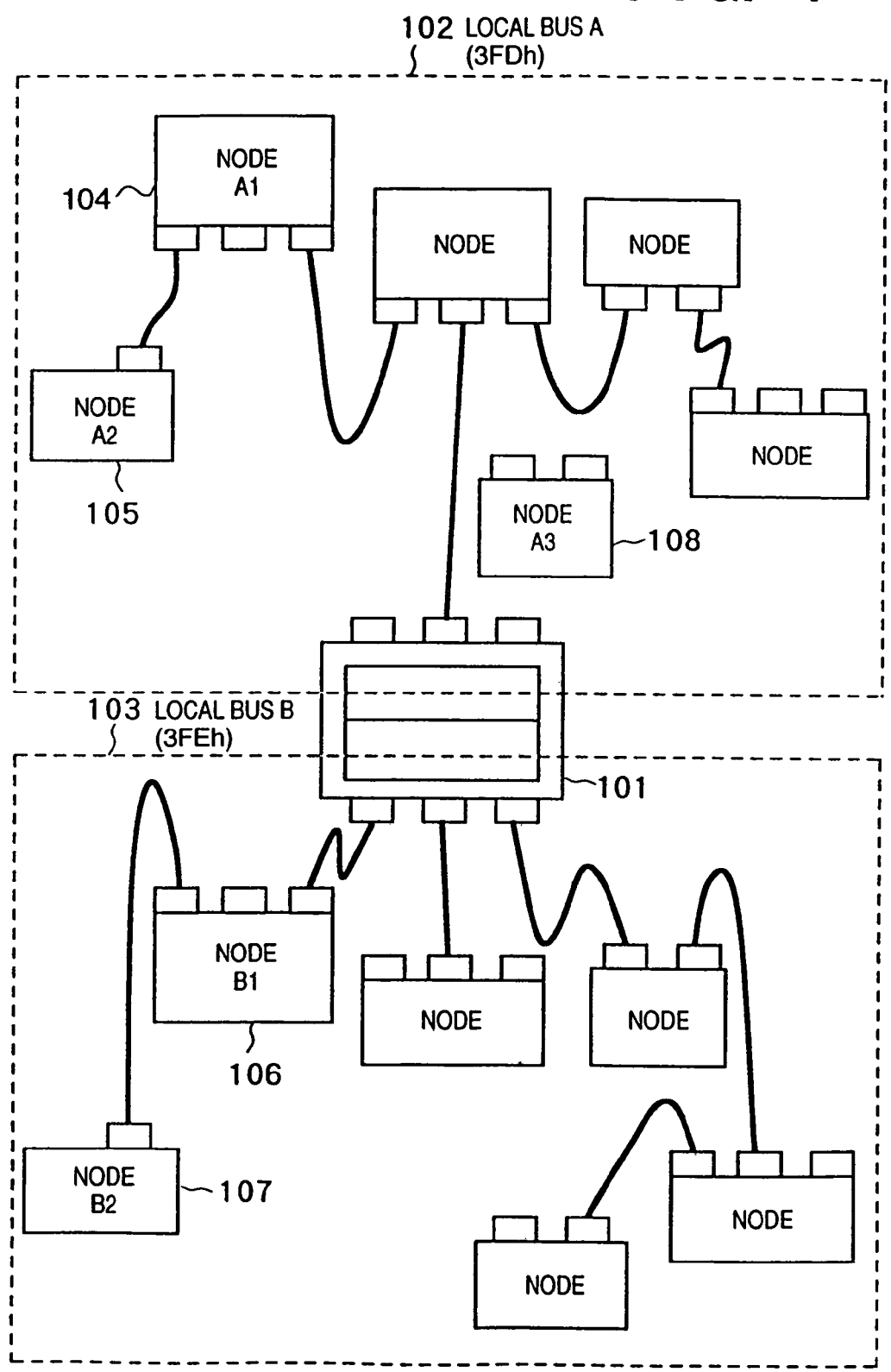
FIG. 1 is a block diagram showing the schematic configuration of the first embodiment according to the present invention.

FIG. 1 is a block diagram showing the schematic configuration of the first embodiment according to the present invention. The first embodiment is constituted by two IEEE 1394-compliant local buses A 102 and B 103, and a 1394 bridge 101 for connecting them. FIG. 1 shows two local buses, but a larger number of local buses can be connected via 1394 bridge devices.

Each local bus has a bus ID as bus specifying information for specifying each local bus. The local bus A 102 represented by a bus ID "3FDh" and the local bus B 103 represented by a bus ID "3FEh" are connected to a plurality of device nodes.

In the first embodiment shown in FIG. 1, a node A1 (104) connected to the local bus A 102 is a digital still camera, and a node A2 (105) is a digital video cam coder. A node B1 (106) connected to the local bus B 103 is a printer, and a node B2 (107) is a digital video cam coder.

The node A1 (104) implements a direct print protocol standardized in advance as an upper protocol, whereas the node A2 (105) implements a standardized AV/C protocol.

Similarly, the node B1 (106) connected to the local bus B 103 implements a direct print protocol as an upper protocol, whereas the node B2 (107) implements an AV/C protocol.

<Technical Overview of IEEE 1394 Standard>

The technique of the IEEE 1394-1995 standard applied to the digital interface shown in FIG. 1 of the first embodiment will be explained. Details of the IEEE 1394-1995 standard (to be referred to as the "IEEE 1394 standard" hereinafter) are described in "IEEE Standard for a High Performance Serial Bus" published by IEEE (The Instituted of Electrical and Electronics Engineers, Inc.), Aug. 30, 1996.

(1) Overview

Figure 2:
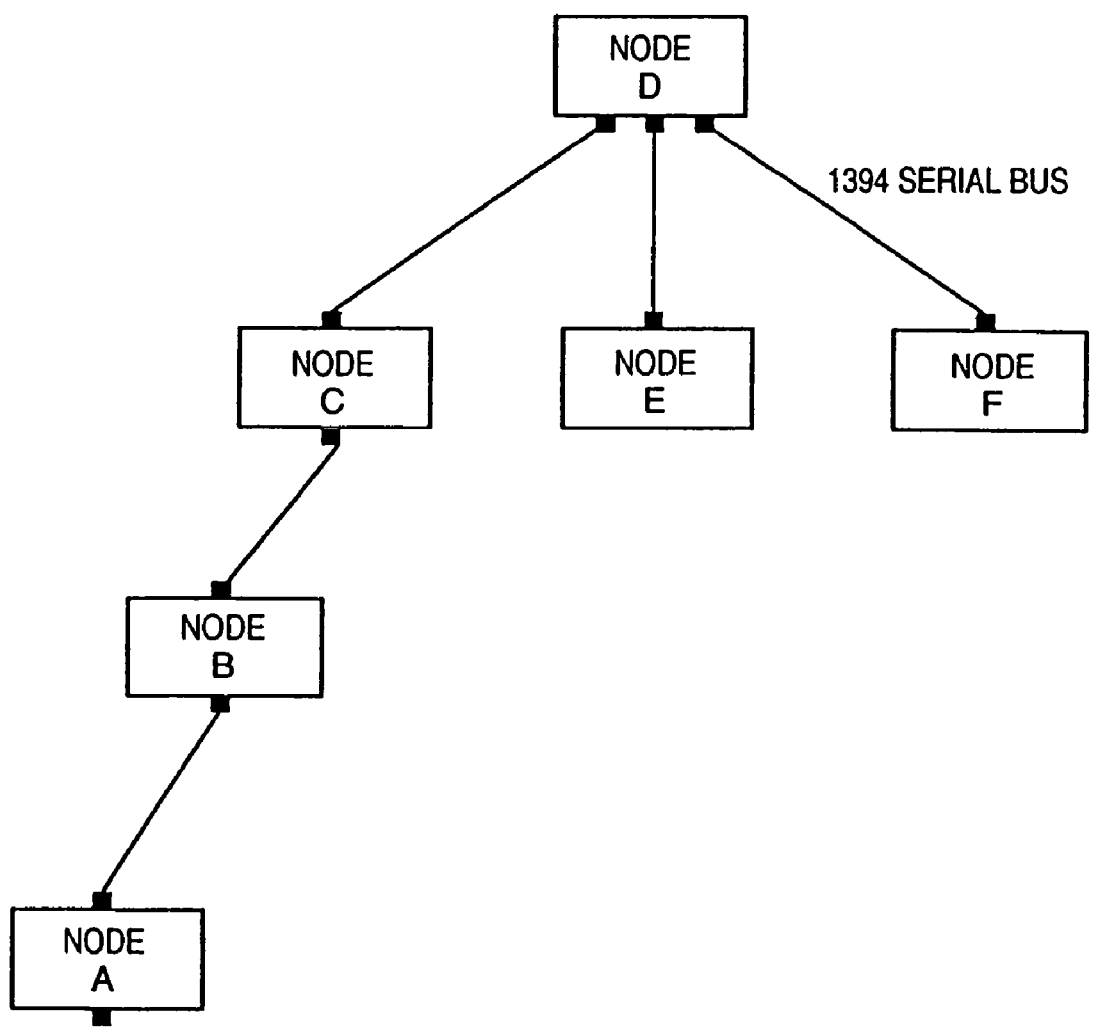
FIG. 2 is a view showing an example of a 1394 network configuration in the first embodiment.

FIG. 2 shows an example of a communication system (to be referred to as a "1394 network") constituted by nodes having digital interfaces complying with the IEEE 1394 standard (to be referred to as "1394 interfaces"). The 1394 network constitutes a bus type network capable of communicating serial data.

In FIG. 2, nodes A to H are connected via an IEEE 1394 standard-compliant communication cable. These nodes A to H are electronic devices such as a PC (Personal Computer), digital VTR (Video Tape Recorder), DVD (Digital Video Disc) player, digital camera, hard disk drive, and monitor.

The connection method of the 1394 network may include both a daisy chain method and node branch method, and enables connection with a high degree of flexibility.

The 1394 network automatically performs bus reset when, e.g., an existing device is removed, a new device is added, or an existing device is turned on/off. By performing this bus reset, the 1394 network can automatically recognize a new configuration and assign ID information to each device. This function allows the 1394 network to always recognize the network configuration.

The 1394 network also has a function of relaying data transferred from another device. This function allows all the devices to grasp the operation status of the bus.

The 1394 network has a function called plug & play. This function allows the 1394 network to automatically recognize connected devices by only connecting them without turning off all the devices.

The 1394 network copes with data transfer speeds of 100/200/400 Mbps. A device having a higher data transfer speed can support a lower data transfer speed, so that devices having different data transfer speeds can be connected.

The 1394 network further copes with two different data transfer schemes (i.e., asynchronous and isochronous transfer modes).

The asynchronous transfer mode is effective in transferring data (i.e., a control signal and file data) which should be asynchronously transferred if necessary. The isochronous transfer mode is effective in transferring data (i.e., video data and audio data) which should be successively transferred by a predetermined amount at a constant data transfer speed.

The asynchronous and isochronous transfer modes can be mixed in each communication cycle (one cycle is generally 125 μS). Each transfer mode is executed after transfer of a cycle start packet (to be referred to as a "CSP") representing the start of the cycle.

In each communication cycle period, the isochronous transfer mode has higher priority than that of the asynchronous transfer mode. The transfer band of the isochronous transfer mode is ensured in each communication cycle.

(2) Architecture

Figure 3:
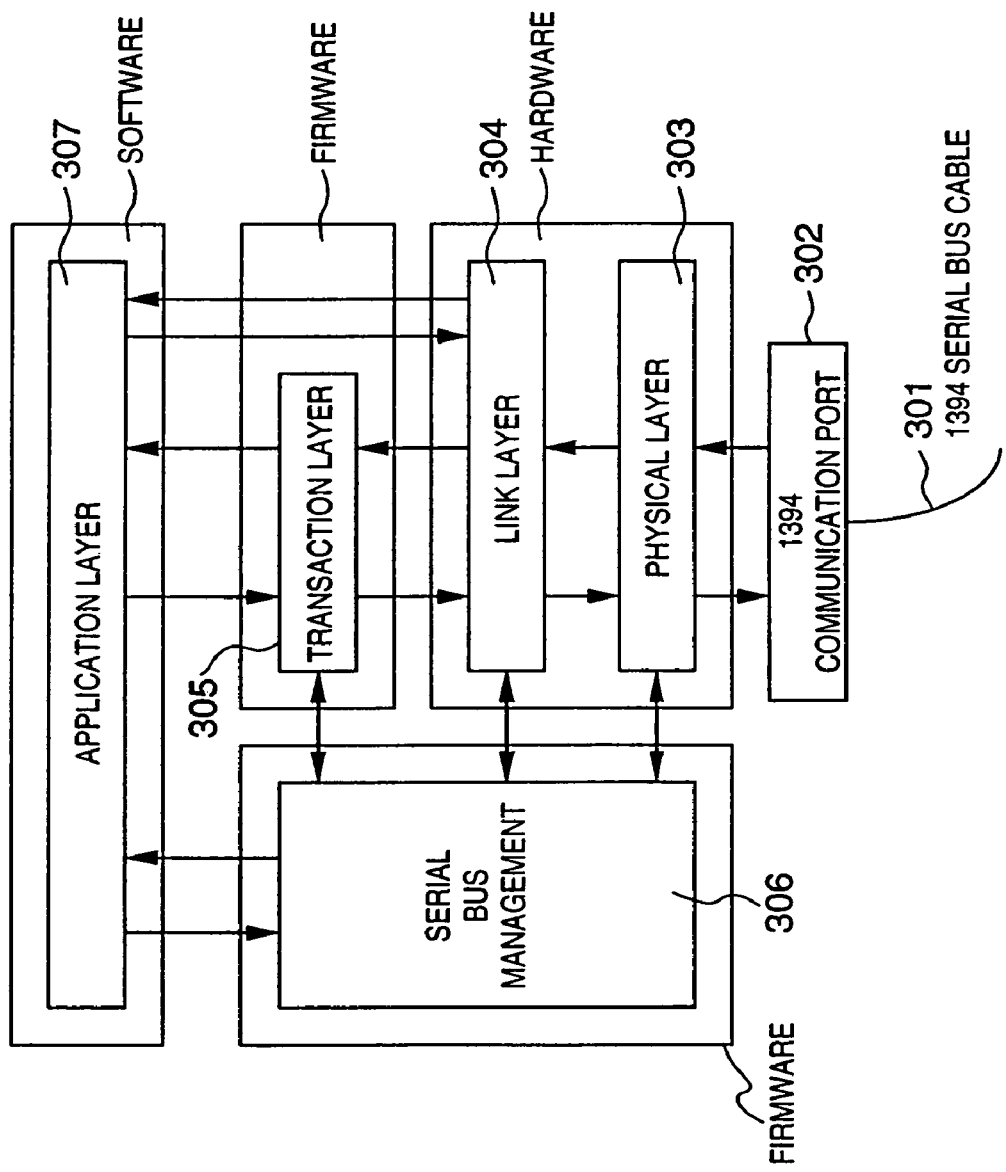
FIG. 3 is a block diagram for explaining the architecture of an IEEE 1394 standard in the first embodiment.

The architecture of the IEEE 1394 standard will be described with reference to FIG. 3. FIG. 3 is a block diagram showing the architecture of the IEEE 1394 standard in the first embodiment.

The building elements of the IEEE 1394 interface will be explained. The IEEE 1394 interface is functionally made up of a plurality of layers (hierarchies). In FIG. 3, the IEEE 1394 interface is connected to the IEEE 1394 interface of another node via an IEEE 1394 standard-compliant communication cable 301. The IEEE 1394 interface has one or more communication ports 302, and each communication port 302 is connected to a physical layer 303 included in hardware.

In FIG. 3, the hardware is comprised of the physical layer 303 and a link layer 304. The physical layer 303 performs a physical and electrical interface with another node, detection of bus reset and its processing, encoding/decoding of input and output signals, and arbitration of bus access. The link layer 304 performs generation and transmission/reception of a communication packet, and control of the cycle timer.

In FIG. 3, the firmware includes a transaction layer 305 and serial bus management 306. The transaction layer 305 manages the asynchronous transfer mode, and provides various transactions (read, write, and lock). The serial bus management 306 provides a function of controlling the self node, managing the connection state of the self node, managing the ID information of the self node, and managing the resource of the serial bus network on the basis of a CSR architecture (to be described later).

The hardware 303 and 304 and the firmware 305 and 306 substantially constitute a 1394 interface. The basic configuration is defined by the IEEE 1394 standard.

An application layer 307 included in the software changes depending on application software to be used, and controls how to communicate data on the network. For example, for moving picture data of a digital VTR, the application layer 307 is defined by a communication protocol such as an AV/C protocol.

(2-1) Function of Link Layer 304

Figure 4:
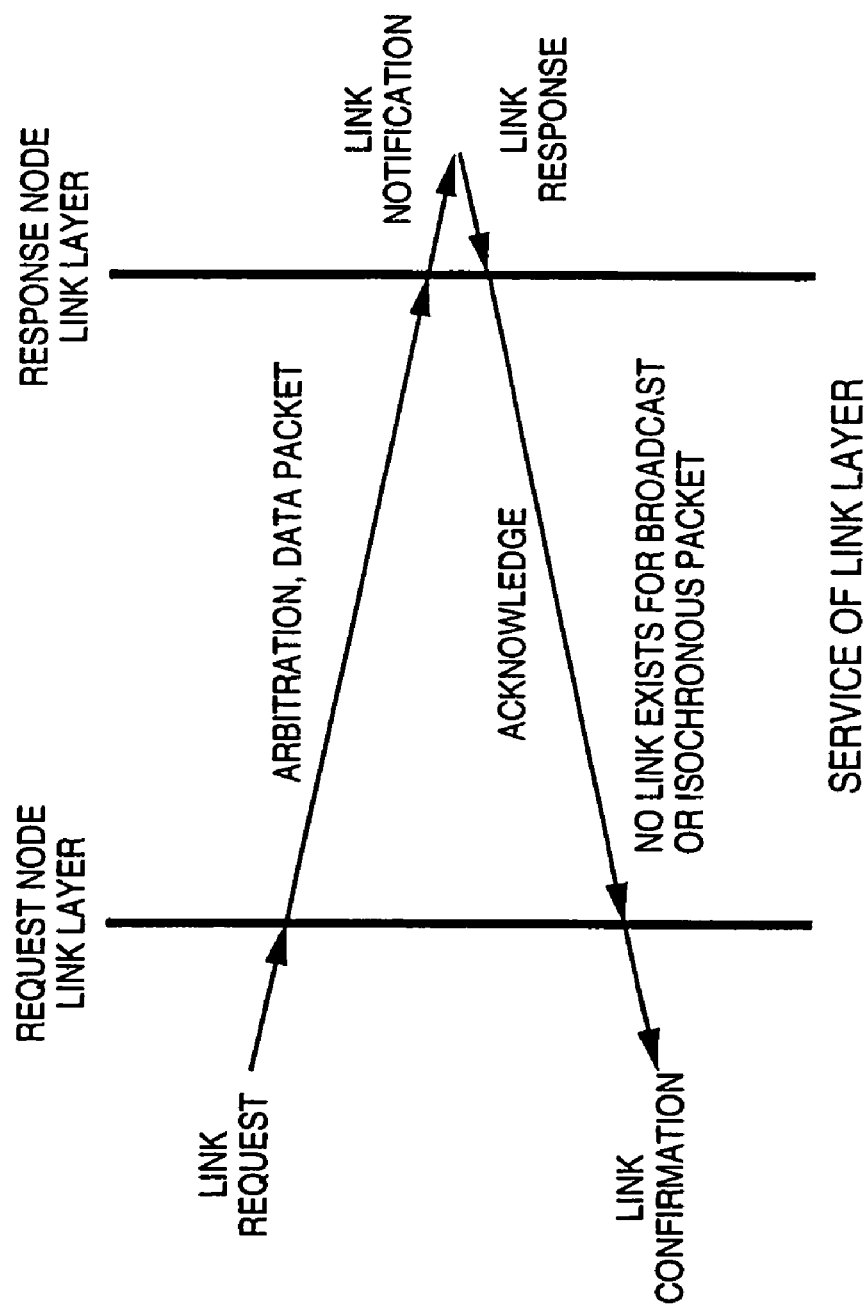
FIG. 4 is a view showing services which can be provided by a link layer in the first embodiment.

FIG. 4 is a view showing services which can be provided by the link layer 304. In FIG. 4, the link layer 304 provides the following four services:

① Link request (LK_DATA.request) for requesting transfer of a predetermined packet of a response node
② Link indication (LK_DATA.indication) for indicating reception of a predetermined packet to a response node
③ Link response (LK_DATA.response) representing reception of an acknowledge from a response node
④ Link confirmation (LK_DATA.confirmation) for confirming an acknowledge from a request node Note that the link response (LK_DATA.response) does not exist in broadcast communication and the transfer of an isochronous packet.

Based on these services, the link layer 304 realizes the two transfer schemes, i.e., asynchronous and isochronous transfer modes.

(2-2) Function of Transaction Layer 305

Figure 5:
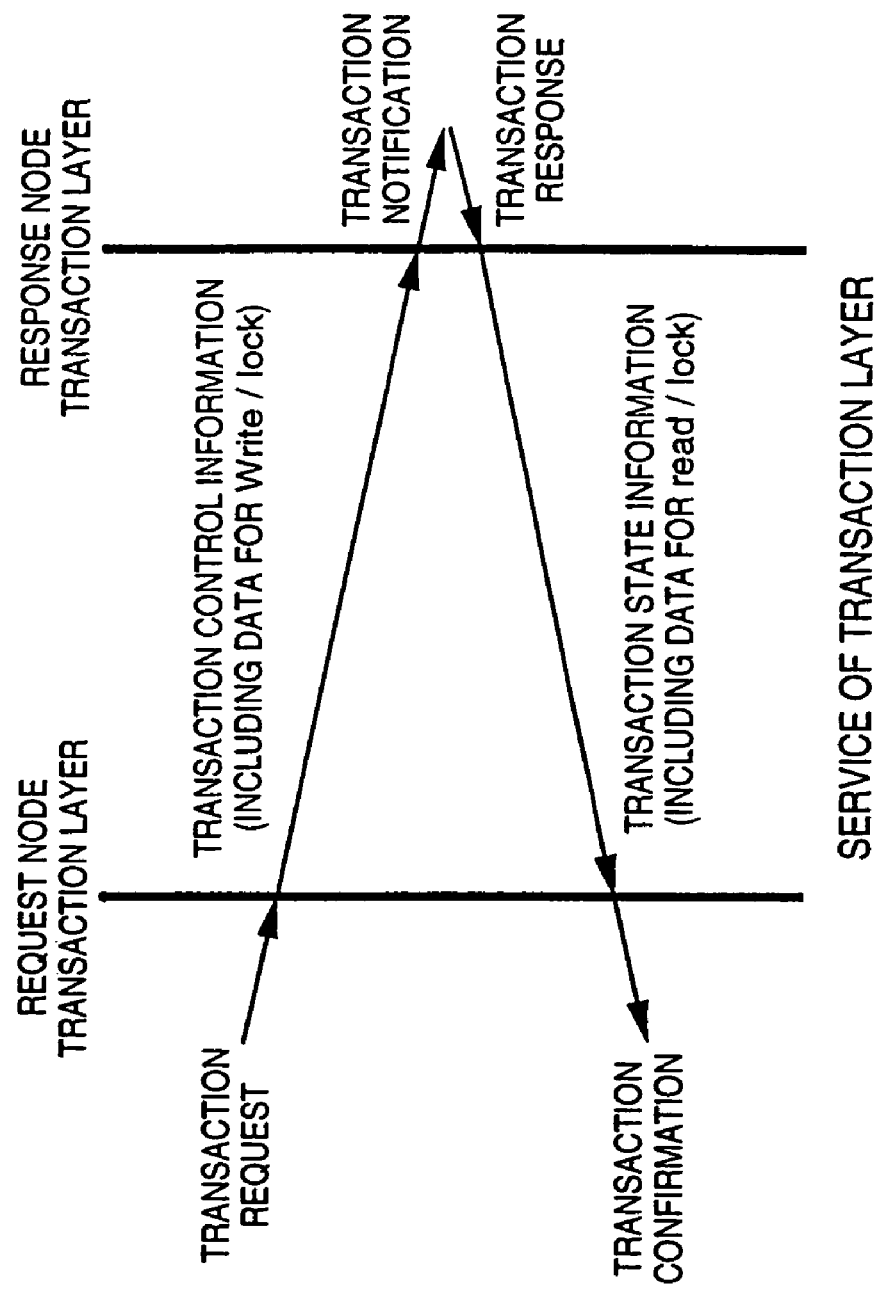
FIG. 5 is a view showing services which can be provided by a transaction layer in the first embodiment.

FIG. 5 is a view showing services which can be provided by the transaction layer 305. In FIG. 5, the transaction layer 305 provides the following four services:

① Transaction request (TR_DATA.request) for requesting a predetermined transaction of a response node
② Transaction indication (TR_DATA.indication) for indicating reception of a predetermined transaction request to a response node
③ Transaction response (TR_DATA.response) representing reception of state information (including data for write and lock) from a response node
④ Transaction confirmation (TR_DATA.confirmation) for confirming state information from a request node Based on these services, the transaction layer 305 manages asynchronous transfer, and realizes the following three transactions:

① Read transaction
② Write transaction
③ Lock transaction

In ① read transaction, a request node reads information stored at a specific address of a response node.

In ② write transaction, the request node writes predetermined information at a specific address of the response node.

In ③ lock transaction, the request node transfers reference data and update data to the response node, compares information at a specific address of the response node with the reference data, and updates the information at the specific address to the update data in accordance with the comparison result.

(2-3) Function of Serial Bus Management 306

The serial bus management 306 can provide the following three functions, i.e., ① node control, ② isochronous resource manager (to be referred to as an "IRM"), and ③ bus manager.

① Node control provides a function of managing the above-described layers, and managing asynchronous transfer executed with another node.

② The IRM provides a function of managing isochronous transfer executed with another node. More specifically, the IRM manages pieces of information necessary to assign a transfer bandwidth and a channel number, and provides these pieces of information to another node.

The IRM exists only on a local bus, and is dynamically selected from other candidates (nodes having the IRM function) every bus reset. The IRM may provide some of functions (connection configuration management, power supply management, speed information management, and the like) which can be provided by the bus manager (to be described below).

③ The bus manager has the IRM function, and provides a more advanced bus management function than the IRM.

More specifically, the bus manager has a function of performing more advanced power supply management (manage, for each node, information representing whether power can be supplied via a communication cable and whether power must be supplied), more advanced speed information management (manage the maximum transfer speed between nodes), more advanced connection configuration management (create a topology map), and bus optimization based on these pieces of management information, and providing the pieces of information to another node.

The bus manager can provide an application with a service for controlling a serial bus network. This service includes a serial bus control request (SB_CONTROL.request), serial bus event control confirmation (SB_CONTROL.confirmation), and serial bus event indication (SB_CONTROL.indication).

The serial bus control request (SB_CONTROL.request) is a service of requesting bus reset by an application.

The serial bus event control confirmation (SB_CONTROL.confirmation) is a service of confirming the serial bus control request (SB_CONTROL.request) for the application. The serial bus event indication (SB_CONTROL.indication) is a service of indicating an asynchronously generated event to the application.

(3) Description of Addressing

Figure 6:
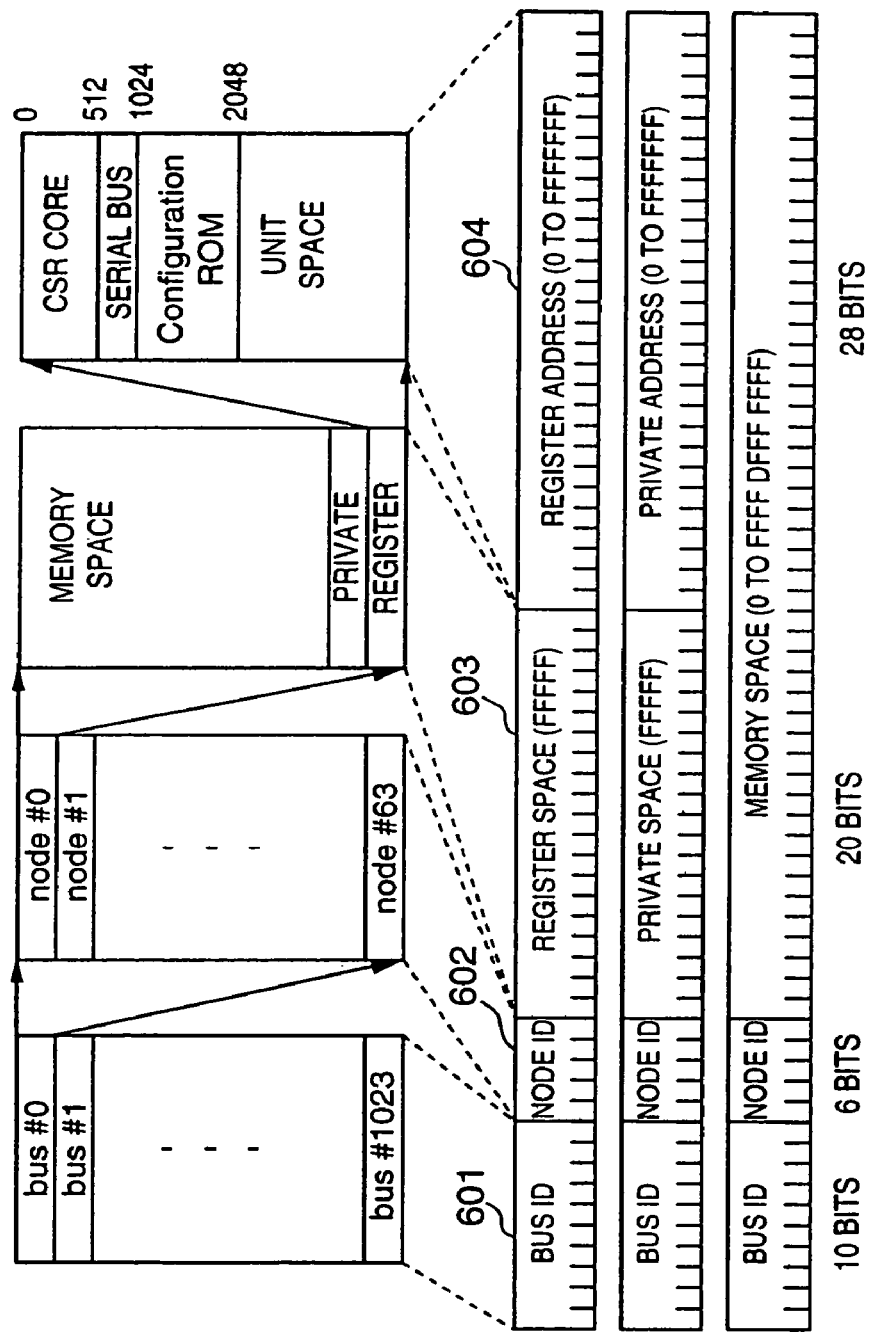
FIG. 6 is a view for explaining the address space of a 1394 serial bus in the first embodiment.

FIG. 6 is a view for explaining an address space in the 1394 interface. The 1394 interface defines a 64-bit address space in accordance with a CSR (Command and Status Register) architecture complying with ISO/IEC 13213:1994.

In FIG. 6, a 10-bit field 601 is used for an ID number for designating a predetermined bus, and a 6-bit field 602 is used for an ID number for designating a predetermined device (node). The upper 16 bits will be called a "node ID", and each node identifies another node using this node ID. Each node can also perform communication with an identified partner using this node ID.

The remaining 48-bit field designates an address space (256-Mbyte structure) of each node. Of this field, a 20-bit field 603 designates a plurality of areas constituting an address space.

In the field 603, an area "0-0xFFFFD" is called a memory space.

An area "0xFFFFE" is called a private space, and represents addresses freely usable by each node. The area "0xFFFFE" is called a register space, and stores information common to nodes connected to a bus. Each node can use information of the register space to manage communication between nodes.

A 28-bit field 604 designates an address where information common or unique to each node is stored.

For example, the first 512 bytes in the register space are used for a CSR architecture core (CSR core) register. FIG. 7 shows the address and function of information stored in the CSR core register. The offset in FIG. 7 is a relative position from "0xFFFFF0000000".

The next 512 bytes in FIG. 6 are used for a serial bus register. FIG. 8 shows the address and function of information stored in the serial bus register. The offset in FIG. 8 is a relative position from "0xFFFFF0000200".

Figure 9:
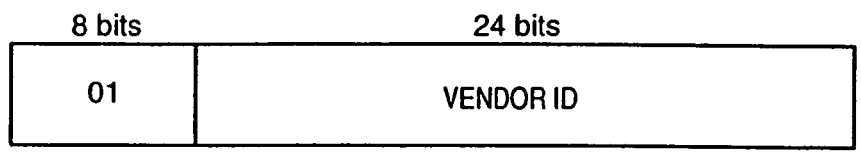
FIG. 9 is a view showing a structure of a configuration ROM of the minimum format in the first embodiment.

The next 1,024 bytes in FIG. 6 are used for a configuration ROM. The configuration ROM has minimum and general formats, and is arranged from "0xFFFFF0000400". FIG. 9 shows a configuration ROM of the minimum format. In FIG. 9, a vender ID is a 24-bit numerical value uniquely assigned to each vendor by IEEE.

Figure 10:
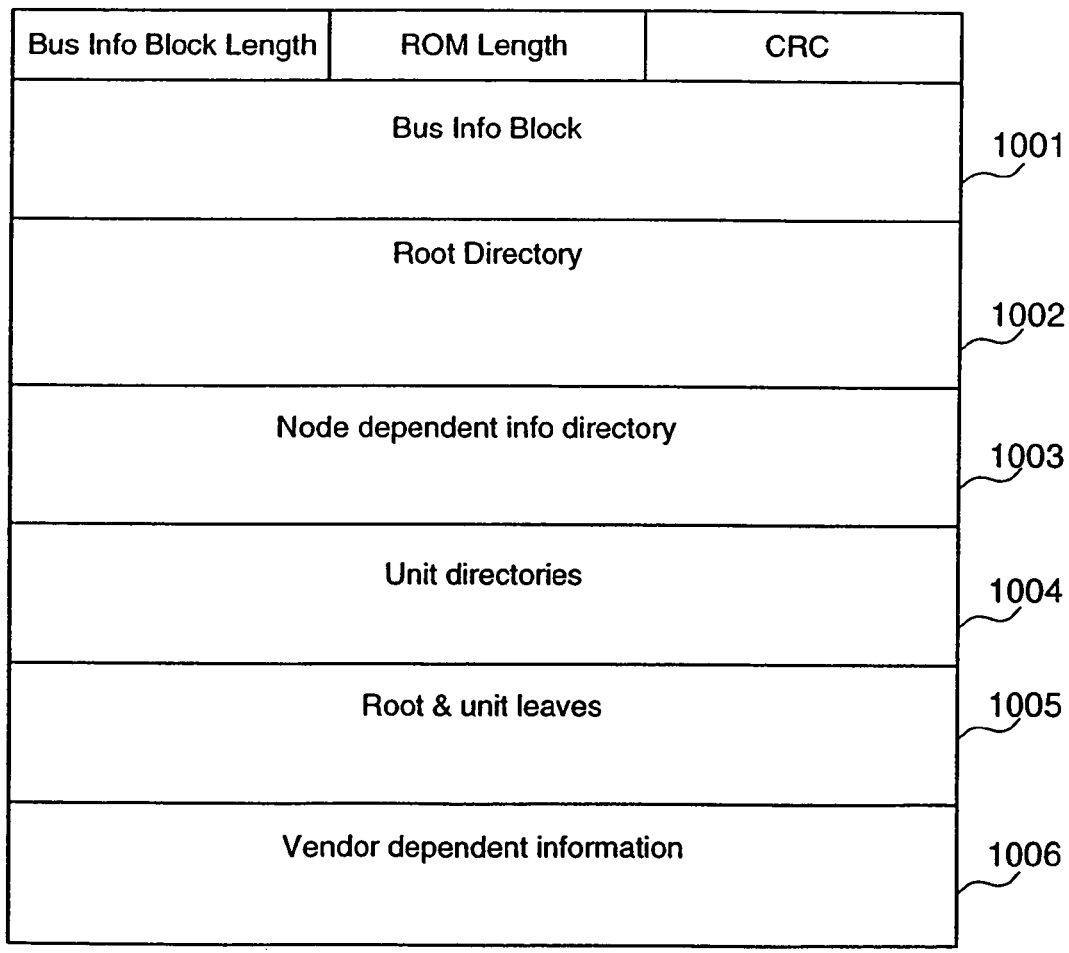
FIG. 10 is a view showing a structure of a configuration ROM of the general format in the first embodiment.

FIG. 10 shows a configuration ROM of the general format. In FIG. 10, the vendor ID is stored in a root directory 1002. A bus inform block 1001 and root leaf 1005 can hold node unique IDs as unique ID information for identifying each node.

The node unique ID determines a unique ID capable of specifying one node regardless of the manufacturer and model. The node unique ID is made up of 64 bits. The upper 24 bits represent a vendor ID, and the lower 48 bits represent information (e.g., the manufacturing number of a node) freely settable by the manufacturer of each node. The node unique ID is used when, for example, a specific node is kept recognized before and after bus reset.

In FIG. 10 showing the configuration ROM of the general format, the root directory 1002 can hold information about the basic function of a node. Detailed functional information is stored in subdirectories (unit directories 1004) offset from the root directory 1002. The unit directories 1004 store, e.g., information about software units supported by a node. More specifically, the unit directories 1004 hold information about a data transfer protocol for data communication between nodes, and a command set for defining predetermined communication procedures.

In FIG. 10, a node dependent info directory 1003 can hold information unique to a device. The node dependent info directory 1003 is offset from the root directory 1002.

In FIG. 10, vendor dependent information 1006 can hold information unique to a vendor which manufactures or sells nodes.

The remaining area is called a unit space, and designates an address where information unique to each node, e.g., identification information (manufacturer name, model name, or the like) or use conditions of each device are stored. FIG. 11 shows the address and function of information stored in the serial bus register of the unit space. The offset in FIG. 11 is a relative position from "0xFFFFF0000800".

In general, to simplify the design of different types of bus systems, each node should use only the first 2,048 bytes of the register space. In other words, the bus system is desirably constituted by 4,096 bytes as a total of the CSR core register, the serial bus register, the configuration. ROM, and the first 2,048 bytes of the unit space.

(4) Structure of Communication Cable

Figure 12:
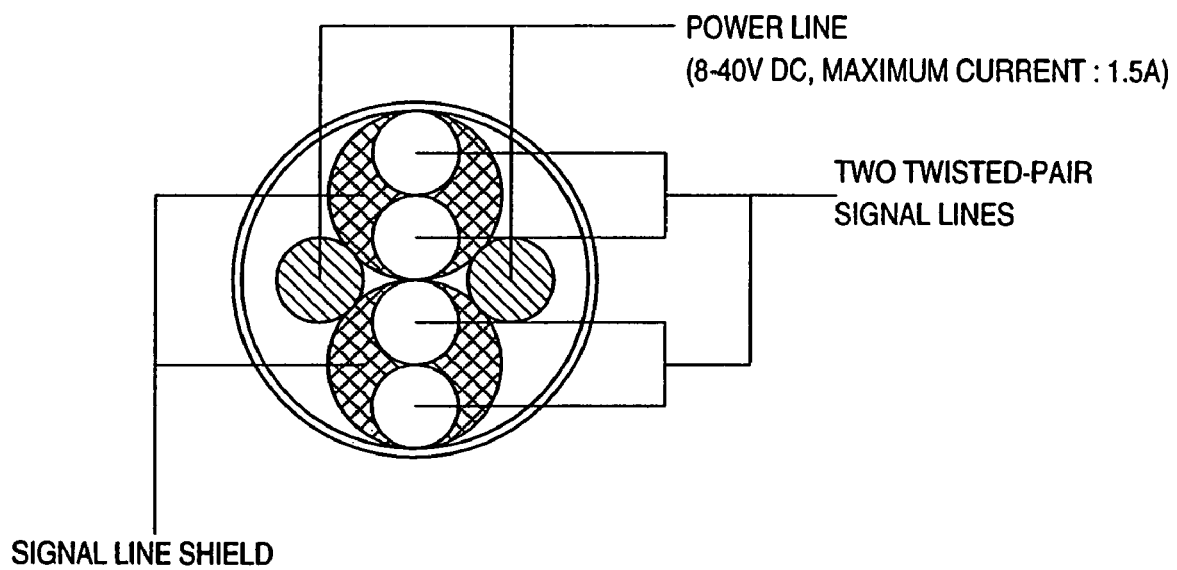
FIG. 12 is a sectional view showing a 1394 serial bus cable in the first embodiment.

FIG. 12 is a sectional view showing an IEEE 1394-compliant communication cable.

The communication cable is made up of two twisted-pair signal lines and a power supply line. This power supply line can supply power even to a device whose main power supply is turned off, or a device which decreases in power due to a failure. The power supply voltage flowing through the power supply line is defined as 8 to 40 V, and the current is defined as a maximum of DC 1.5 A.

Figure 13:
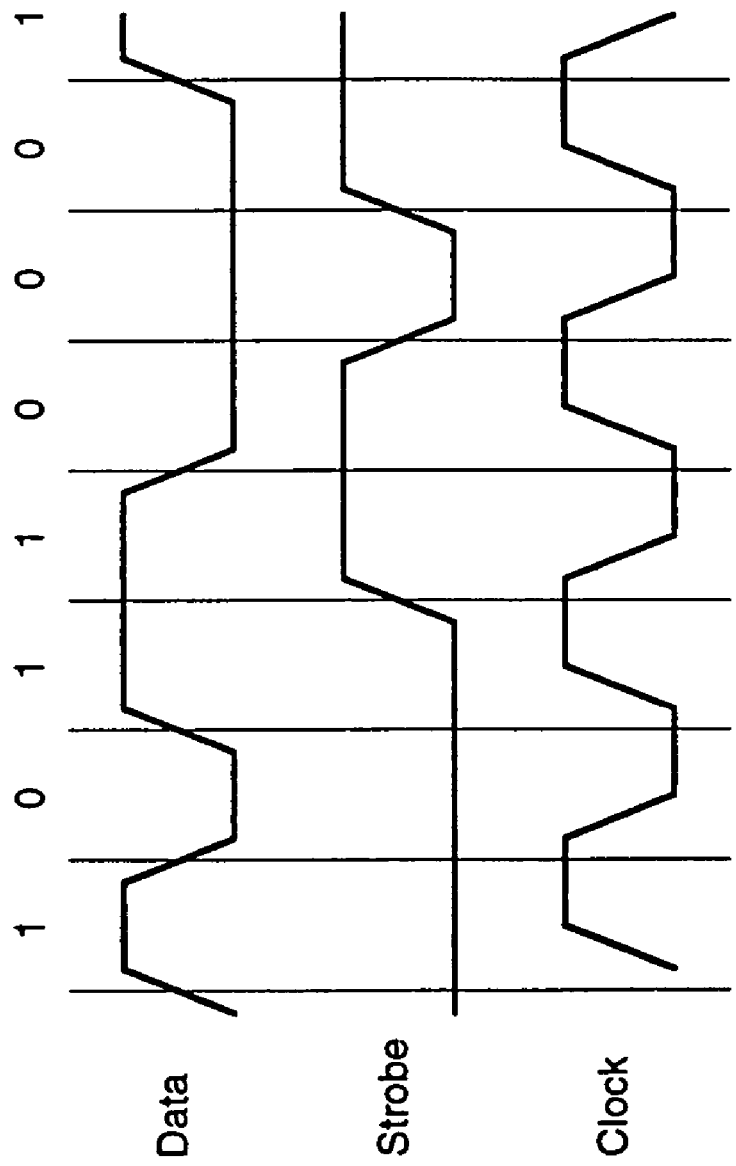
FIG. 13 is a view showing a DS-link coding scheme in the first embodiment.

The two twisted-pair signal lines transmit information signals encoded by a DS-link (Data/Strobe link) coding scheme. FIG. 13 is a view for explaining the DS-link coding scheme in the first embodiment.

The DS-link coding scheme shown in FIG. 13 is suitable for high-speed serial data communication, and requires two twisted-pair lines. One twisted-pair line transmits a data signal, whereas the other twisted-pair line transmits a strobe signal. The receiving side can regenerate a clock by exclusive-ORing the data and strobe signals received from the two signal lines.

The 1394 interface using the DS-link coding scheme attains the following advantages:

① The transfer efficiency is higher than other coding schemes.

② The PLL circuit can be omitted to downsize the controller LSI.

③ Information representing an idle state need not be transmitted, so that the transceiver circuit can easily change to a sleep state to reduce the power consumption.

(5) Bus Reset Function

The 1394 interface of each node can automatically detect a change in network connection configuration. In this case, the 1394 network executes processing called bus reset by the following procedures. A change in connection configuration can be detected by a change in bias voltage applied to the communication port of each node.

A node which has detected a change in network connection configuration (e.g., an increase/decrease in the number of nodes upon insertion/removal of a node or ON/OFF operation of a node), or a node which must recognize a new connection configuration transmits a bus reset signal onto the bus via the 1394 interface.

The 1394 interface of a node which has received the bus reset signal transmits occurrence of bus reset to its link layer 304, and transfers the bus reset signal to another node. A node which has received the bus reset signal clears the recognized network connection configuration and the node ID assigned to each device. After all the nodes detect the bus reset signal, each node automatically performs initialization processing (recognition of a new connection configuration and assignment of a new node ID) accompanying bus reset.

Note that bus reset can be activated not only by a change in connection configuration described above, but also by directly issuing an instruction from the application layer 307 to the physical layer 303 under host control.

After bus reset occurs, data transfer is temporarily suspended, and then restarted in a new network after completion of initialization processing accompanying bus reset.

(6) Description of Sequence After Occurrence of Bus Reset

After bus reset occurs, the 1394 interface of each node automatically executes recognition of a new connection configuration and assignment of a new node ID. A basic sequence from the start of bus reset to assignment processing of a node ID will be explained with reference to FIGS. 14 to 16.

Figure 14:
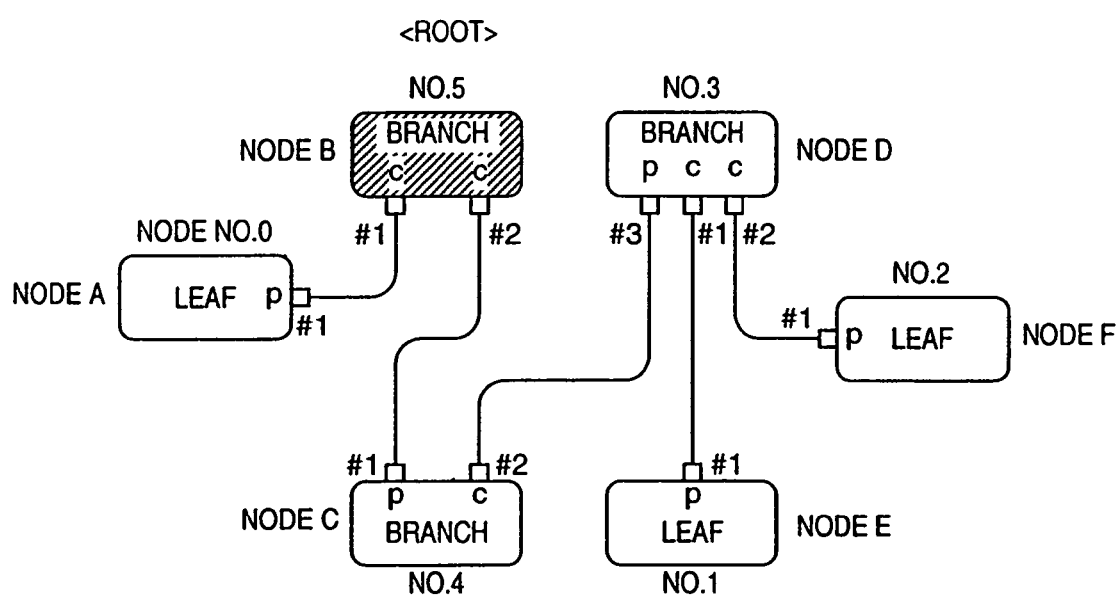
FIG. 14 is a view for explaining a state after activation of bus reset in the 1394 network in the first embodiment.

FIG. 14 is a view for explaining a state after occurrence of bus reset in the 1394 network of FIG. 2.

In FIG. 14, node A comprises one communication port; node B, two communication ports; node C, two communication ports; node D, three communication ports; node E, one communication port; and node F, one communication port. The communication port of each node has a port number for identifying each port.

Figure 15:
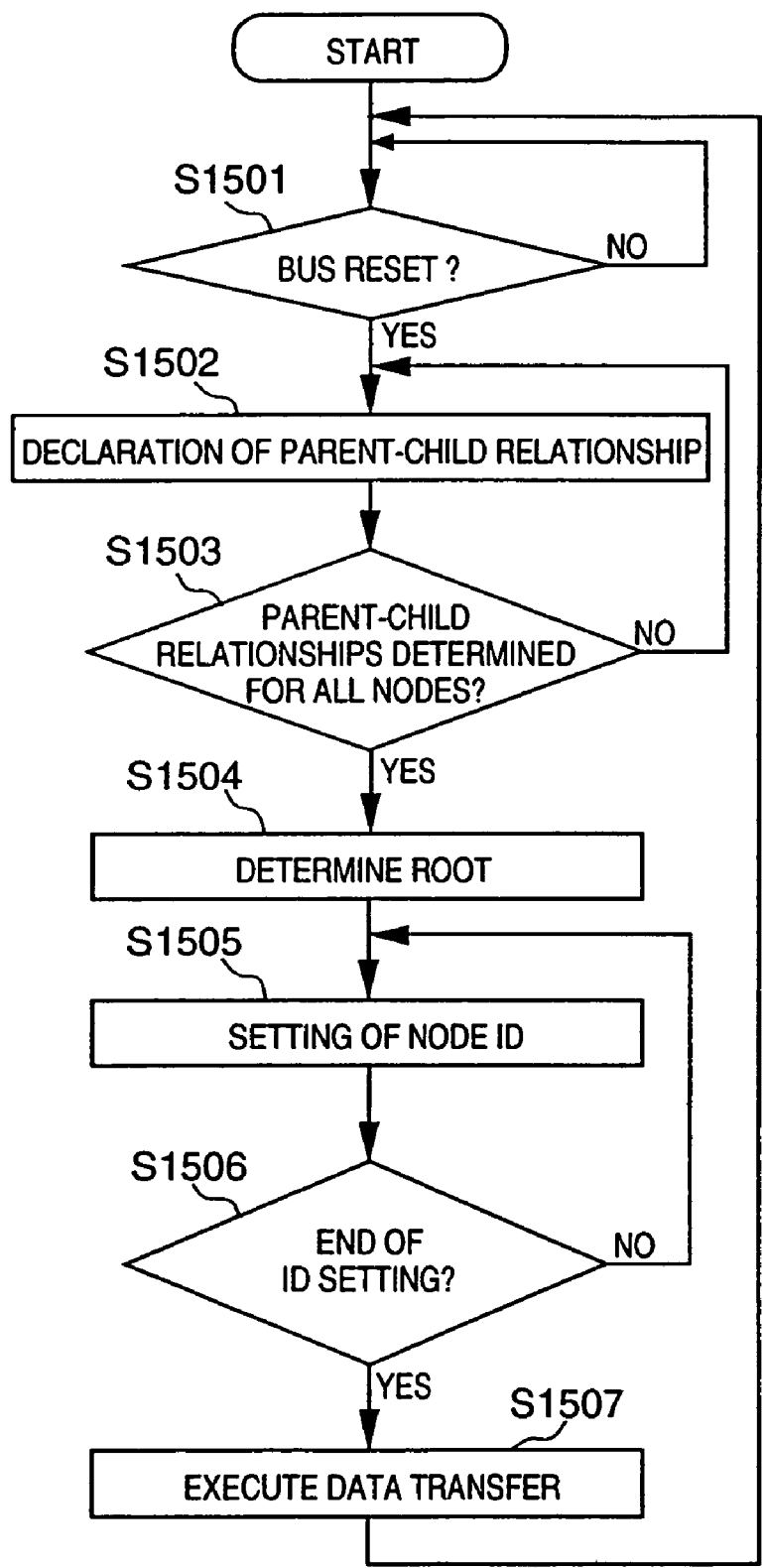
FIG. 15 is a flow chart showing processing from the start of bus reset to assignment of a node ID in the first embodiment.

Processing from the start of bus reset to assignment of a node ID in FIG. 14 will be explained with reference to the flow chart of FIG. 15. FIG. 15 is a flow chart showing processing from the start of bus reset to assignment of a node ID in the first embodiment.

Nodes A to F shown in FIG. 14 that constitute a 1394 network always monitor whether bus reset occurs, as shown in step S1501. If a node which has detected a change in connection configuration outputs a bus reset signal, each node detects bus reset to execute processing from step S1502.

If bus reset is detected, the flow advances from step S1501 to step S1502, and respective nodes declare parent-child relationships between their communication ports after occurrence of bus reset. In step S1503, whether parent-child relationships between all the nodes are determined is checked. If NO in step S1503, the flow returns to step S1502, and each node repeats processing in step S1502 until parent-child relationships between all the nodes are determined.

After parent-child relationships between all the nodes are determined, the flow shifts from step S1503 to step S1504. In step S1504, the 1394 network determines a node, i.e., root which performs network arbitration. After the root is determined, the flow shifts to step S1505, and the 1394 interface of each node executes an operation of automatically setting the self node ID. In step S1506, whether node IDs have been set for all the nodes to complete ID setting processing is checked. If NO in step S1506, the flow returns to step S1505, and each node sets an ID for the next node based on predetermined procedures.

After node IDs are set for all the nodes, the flow advances from step S1506 to step S1507, and each node executes isochronous transfer or asynchronous transfer. After data transfer ends, the 1394 interface of each node returns to step S1501 to monitor bus reset.

By the above procedures, the 1394 interface of each node can automatically execute recognition of a new connection configuration and assignment of a new node ID every time bus reset occurs.

(7) Determination of Parent-Child Relationship

Figure 16:
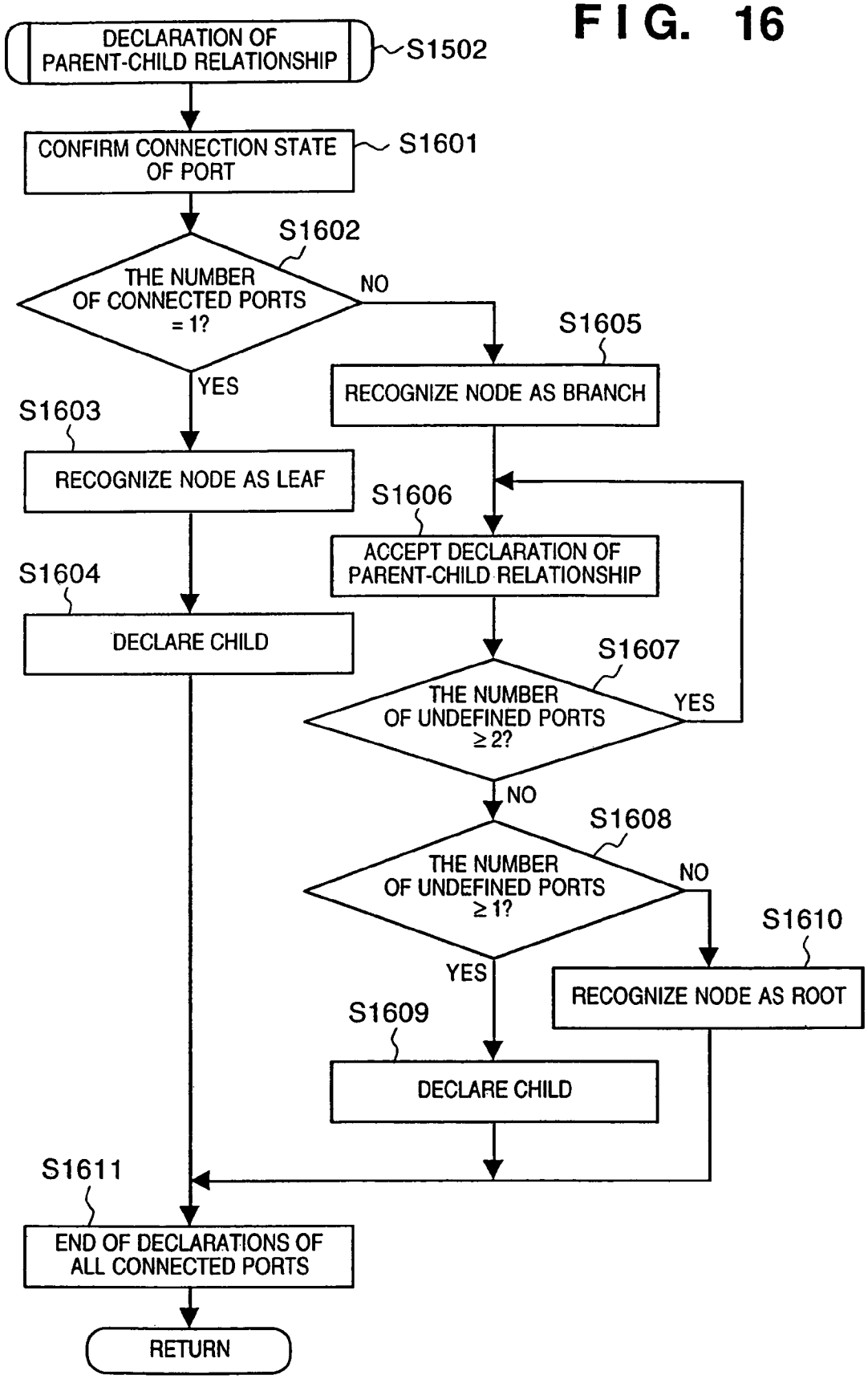
FIG. 16 is a flow chart showing details of parent-child relationship declaration processing in step S1502 shown in FIG. 15.

Details of parent-child relationship declaration processing (i.e., processing of recognizing parent-child relationships between nodes) in step S1502 shown in FIG. 15 will be described with reference to the flow chart of FIG. 16. FIG. 16 is a flow chart showing details of parent-child relationship declaration processing in step S1502 shown in FIG. 15 in the first embodiment.

In parent-child relationship declaration processing of the first embodiment, nodes A to F on the 1394 network confirm the connection states (connection or disconnection) of the self communication ports upon occurrence of bus reset in step S1601 shown in FIG. 16. After confirming the connection state of the communication port, each node counts in step S1602 the number of communication ports (to be referred to as connected ports) connected to other nodes, and checks whether the number of connected ports is one.

If the number of connected ports is one in step S1602, the flow shifts to step S1603, and the node recognizes itself as a "leaf". The "leaf" means a node connected to only one node. In step S1604, the node serving as a leaf declares a "child" to a node connected to the connected port. At this time, the leaf recognizes that the connected port is a "parent port (communication port connected to a parent node)". After that, the flow advances to step S1611.

Parent-child relationships are sequentially declared between a branch and a leaf serving as a network terminal end, and then between branches. The parent-child relationships between nodes are determined in the order of a communication port which can make a declaration early. A communication port which declares a child is recognized as a "parent port" between nodes, and a communication port which has received the declaration is recognized as a "child port (communication port connected to a child node)". For example, in FIG. 14, nodes A, E, and F recognize themselves as leaves, and declare child-parent relationships. Then, nodes A and B are determined to be a child and parent; nodes E and D, a child and parent; and nodes F and D, a child and parent.

If the number of connected ports is not one but two or more as. a result of processing in step S1602, the flow shifts to step S1605, and the node recognizes itself as a "branch". The "branch" means a node connected to two or more nodes. In step S1606, the node serving as a branch receives declaration of a parent-child relationship from a node at each connected port. The connected port which has received the declaration is recognized as a "child port".

After one connected port is recognized as a "child port", the flow advances to step S1607, and the branch detects whether there are two or more connected ports (i.e., undefined ports) for which parent-child relationships have not been determined yet. If YES in step S1607, the flow returns to processing in step S1606, and the branch receives declaration of a parent-child relationship from a node at each connected port again.

If NO in step S1607, the flow shifts to step S1608, and the branch checks whether only one undefined port exists, If YES in step S1608, the branch recognizes the undefined port as a "parent port", and declares a "child" to a node connected to the port in step S1609. Then, the flow advances to step S1611.

The branch cannot declare a child to another node until the number of remaining undefined ports decreases to one. For example, in the configuration of FIG. 14, nodes B, C, and D recognize themselves as branches, and receive declarations from leaves or other branches. Node D declares a parent-child relationship to node C after parent-child relationships between D and E and between D and F are determined. Node C which has received the declaration from node D declares a parent-child relationship to node B.

If NO in step S1608 (i.e., all the connected ports of the branch are parent ports), the flow shifts to step S1610, and the branch recognizes itself as a root. For example, in FIG. 14, node B in which all the connected ports are parent ports is recognized by other nodes to be a root for arbitrating communication on the 1394 network.

In this case, node B is determined to be a root. If the timing at which node B declares a parent-child relationship is earlier than the timing at which node C declares a parent-child relationship, another node may become a root. Hence, even the same network configuration does not always use the same node as a root.

After the parent-child relationships of all the connected ports are declared, each node can recognize the connection configuration of the 1394 network as a hierarchical structure (tree structure). The declarations at all the connected ports end in step S1611, and the flow returns to the main routine. Note that the parent node is an upper node in the hierarchical structure, and the child node is a lower node in the hierarchical structure.

(8) Assignment of Node ID

Figure 17:
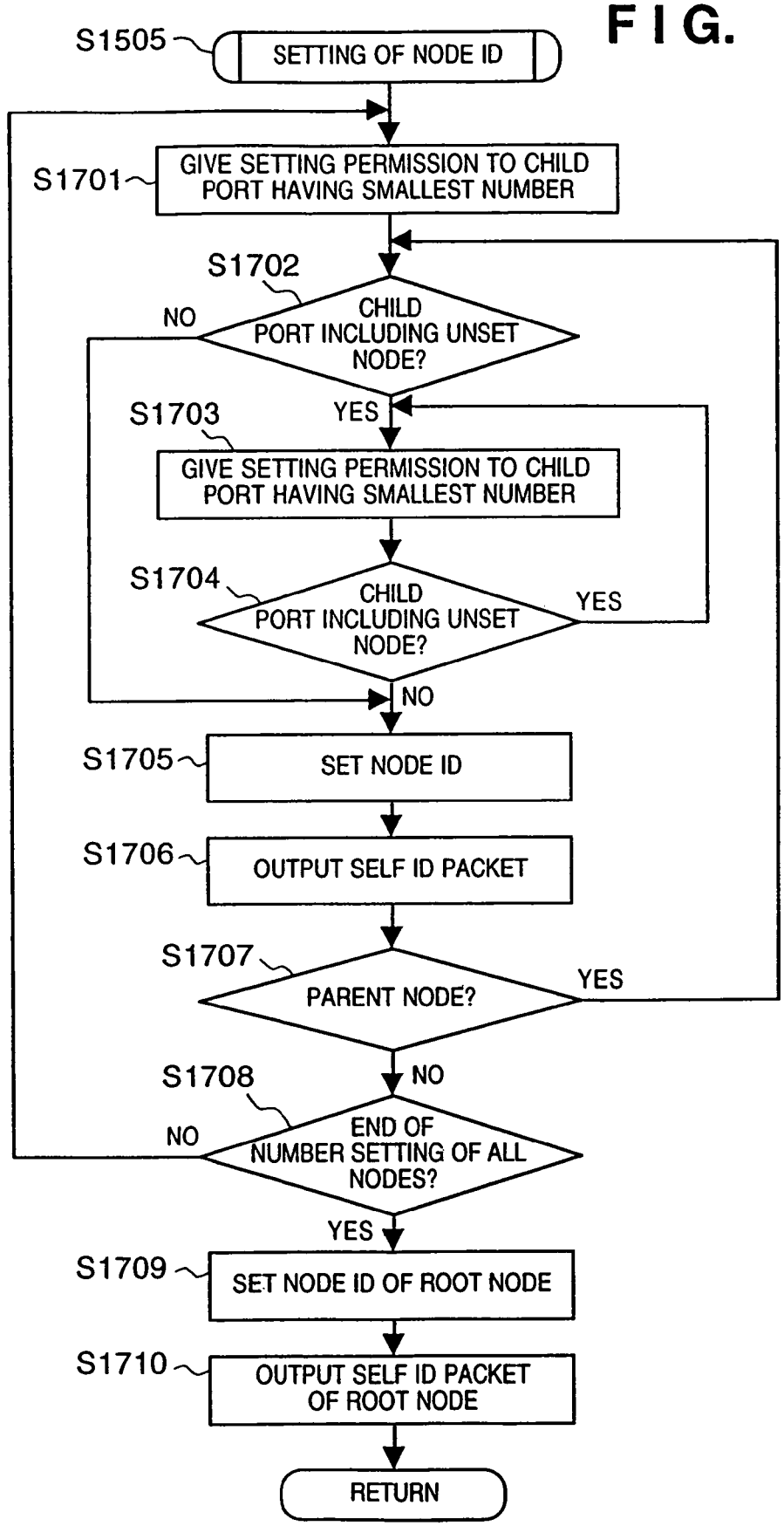
FIG. 17 is a flow chart showing details of node ID setting processing in step S1505 shown in FIG. 15.

Node ID setting processing (i.e., processing of automatically assigning the node ID of each node) in step S1505 shown in FIG. 15 will be described in detail with reference to FIG. 17. FIG. 17 is a flow chart showing details of node ID setting processing in step S1505 of FIG. 15. The node ID is made up of a bus number and node number. In the first embodiment, respective nodes are connected to the same bus, and have the same bus number.

In node ID setting processing of the first embodiment, the root gives node ID setting permission to a communication port having the smallest number among child ports connected to nodes whose node IDs have not been set yet. In FIG. 17, the root sets the node IDs of all the nodes connected to a child port having the smallest number, determines that the child port has been set, and performs the same control for a child port having the second smallest number. After the IDs of all the nodes connected to child ports are set, the root sets the self node ID. Node numbers contained in node IDs are basically sequentially assigned as 0, 1, 2, . . . to leaves and branches. Thus, the root has the largest node number.

A node which has received the setting permission in step S1701 checks in step S1702 whether a child port including a node whose node ID has not been set yet exists in the self child ports. If NO in step S1702, the flow shifts to step S1705.

If YES in step S1702, the flow advances to step S1703, and the node which has received setting permission gives setting permission to a node directly connected to the child port (child port having the smallest number). In step S1704, the node which has received setting permission checks whether a child port including a node whose node ID has not been set yet exists in the self child ports. If YES in step S1704, the flow returns to step S1703, and the node gives setting permission to a child port having the smallest number.

If NO in step S1704, the flow shifts to step S1705.

In this way, if a child port including an unset node is not detected in step S1702 or S1704, the flow shifts to step S1705, and the node which has received setting permission sets the self node ID. In step S1706, the node which has set the self node ID broadcasts a self ID packet containing information about its node number and the connection state of the communication port. "Broadcast" means to transfer a communication packet of a given node to many unspecified nodes constituting a 1394 network.

Each node can receive this self ID packet to recognize a node number assigned to each node, and can recognize the assigned node number. For example, in FIG. 14, node B serving as a root gives node ID setting permission to node A connected to a communication port having the smallest port number "#1". Node A assigns "No. 0" as its node number, and sets a node ID made up of a bus number and the node number. Then, node A broadcasts a self ID packet containing the node number.

Figure 18:
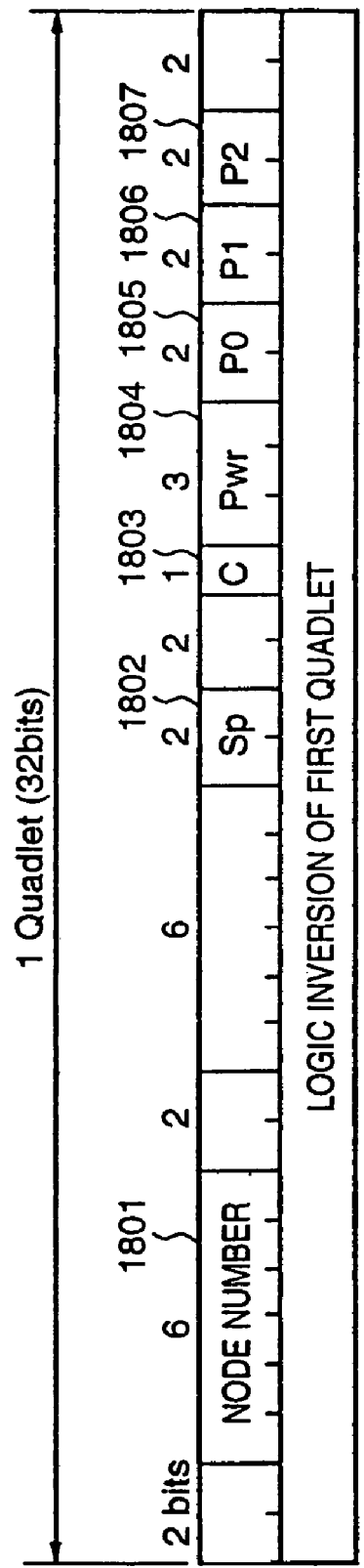
FIG. 18 is a view showing a format of a self ID packet in the first embodiment.

FIG. 18 shows a format of a self ID packet output in step S1706. In FIG. 18, reference numeral 1801 denotes a field for storing the node number of a node which has sent a self ID packet; 1802, a field for storing information about a compatible transfer speed; 1803, a field representing the presence/absence of a bus management function (the presence/absence of a bus manager ability); and 1804, a field for storing information about power consumption and supply characteristics.

In FIG. 18, reference numeral 1805 denotes a field for storing information about the connection state of a communication port having a port number "#0" (connection, disconnection, parent-child relationship of a communication port, and the like); 1806, a field for storing information about the connection state of a communication port having a port number "#1" (connection, disconnection, parent-child relationship of a communication port, and the like); and 1807, a field for storing information about the connection state of a communication port having a port number "#2" (connection, disconnection, parent-child relationship of a communication port, and the like).

When a node which sends a self ID packet has a bus manager ability, a contender bit in the field 1803 is set to "1"; otherwise, to "0".

The bus manager is a node having a function of performing, based on various pieces of information contained in the above-mentioned self ID packet, bus power supply management (manage, for each node, information representing whether power can be supplied via a communication cable and whether power must be supplied), speed information management (manage the maximum transfer speed between nodes from information about a compatible transfer speed of each node), topology map information management (manage the network connection configuration from parent-child relationship information of a communication port), and bus optimization based on topology map information, and a function of providing these pieces of information to other nodes. These functions allow the node serving as a bus manager to manage the bus over the 1394 network.

In processing of FIG. 17, a node which has set a node ID after processing in step S1706 checks in step S1707 whether a parent node exists. If YES in step S1707, the flow returns to step S1702, and the parent node executes processing from step S1702, and gives permission to a node.whose node ID has not been set yet.

If NO in step S1707, the node is determined to be a root. The flow shifts to step S1708, and the node serving as a root checks whether node IDs are set for nodes connected to all the child ports. If ID setting processing for all the nodes is not completed in step S1708 (NO), the flow returns to step S1701, and the root gives ID setting permission to a child port having the smallest number among child ports including the node. Then, processing after step S1702 is executed.

If YES in step S1708, the flow shifts to step S1709, and the root sets the self node ID. After setting the node ID, the root broadcasts a self ID packet in step S1710. Then, the flow returns to the main routine.

By this processing, the 1394 network can automatically assign a node ID to each node.

If a plurality of nodes have a bus manager ability after node ID setting processing, a node having the largest node number serves as a bus manager. That is, when a root having the largest node number in the network has a bus manager function, the root serves as a bus manager.

If, however, the root does not have this function, a node having the largest node number next to the root serves as a bus manager. Which node becomes a bus manager can be grasped by checking the contender bit 1803 in a self ID packet broadcasted by each node.

(9) Arbitration Function

Figure 19A:
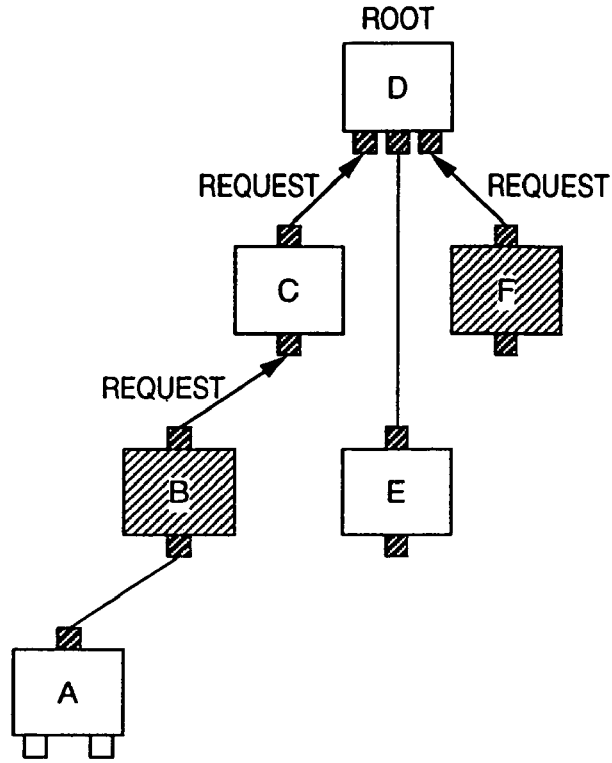
FIGS. 19A and 19B are views for explaining arbitration in the 1394 network in the first embodiment.
Figure 19B:
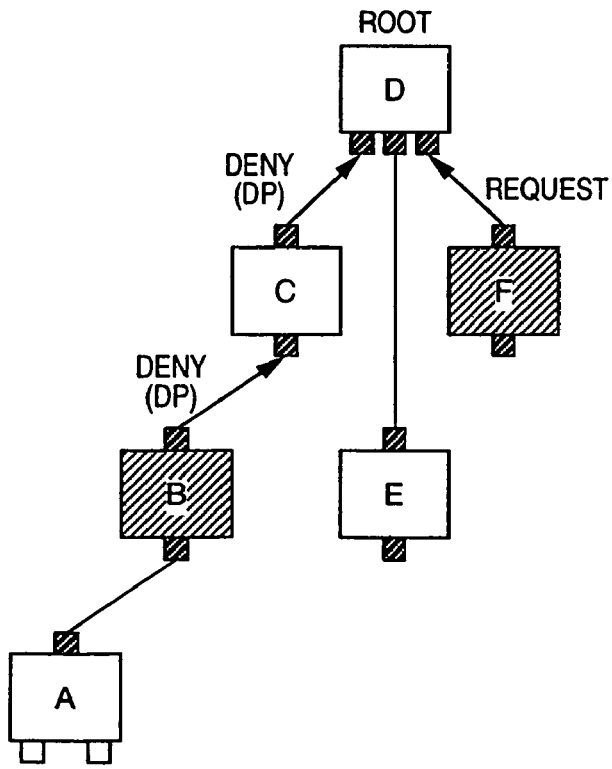

FIGS. 19A and 19B are views for explaining arbitration in the 1394 network in the first embodiment shown in FIG. 1.

The 1394 network always performs bus access arbitration prior to data transfer. The 1394 network is a logical bus type network, and can transfer the same communication packet to all the nodes in the network by relaying a communication packet transferred from each node to another node. To prevent collision of communication packets, arbitration must be executed, which allows only one node to transfer a packet at given time.

FIG. 19A is a view for explaining a case wherein nodes B and F issue bus access requests.

When arbitration starts, nodes B and F issue bus access requests to their parents. A parent (i.e., node C) which has received the request from node B relays the bus access request to its parent node (i.e., node D). This request is finally sent to a root (node D) which finally executes arbitration.

The root which has received the bus access requests determines which node can use the bus. This arbitration operation can be done by only a node serving as a root, and a node which wins arbitration is permitted to use the bus.

FIG. 19B is a view showing a case wherein a request from node F is permitted, and a request from node B is denied.

The root transmits a DP (Data Prefix) packet to a node which loses in arbitration, and notifies the node of denial. The denied node holds a bus access request until the next arbitration.

By controlling arbitration, the 1394 network can manage bus access.

(10) Communication Cycle

In the first embodiment, the asynchronous and isochronous transfer modes can be mixed in time division in each communication cycle period. In general, the communication cycle period is 125 μS long.

Figure 20:
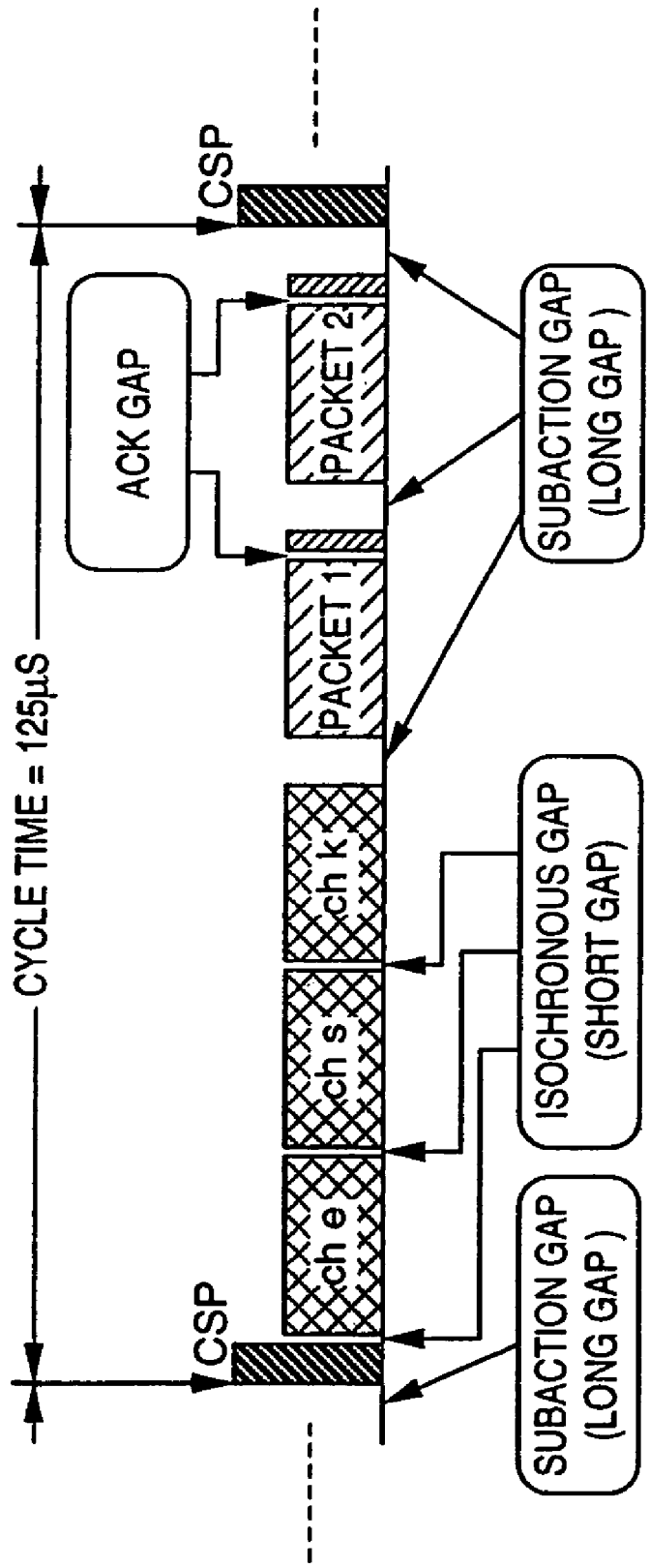
FIG. 20 is a view for explaining a case wherein asynchronous and isochronous transfer modes are mixed in one communication cycle in the first embodiment.

FIG. 20 is a view for explaining a case wherein the asynchronous and isochronous transfer modes are mixed in one communication cycle.

In the first embodiment, the isochronous transfer mode is executed preferentially to the asynchronous transfer mode. This is because an idle period (subaction gap) necessary for activating asynchronous transfer after a cycle start packet is set longer than an idle period (isochronous gap) necessary for activating isochronous transfer. Thus, isochronous transfer is executed preferentially to asynchronous transfer.

In FIG. 20, a cycle start packet (to be referred to as a "CSP" hereinafter) is transferred from a predetermined node at the start of each communication cycle. Each node can count the same time as another node by adjusting the time using the CSP.

(11) Isochronous Transfer Mode

The isochronous transfer mode is an isochronous type transfer scheme. Isochronous mode transfer can be executed in a predetermined period after the start of a communication cycle. The isochronous transfer mode is always executed every cycle in order to maintain real-time transfer.

The isochronous transfer mode is a transfer mode suitable for transfer of data such as moving picture data or audio data which requires real-time transfer. The isochronous transfer mode is broadcasting communication, unlike one-to-one communication in the asynchronous transfer mode. That is, a packet sent from a given node is transferred to all the nodes on the network. Note that isochronous transfer does not use any ack (acknowledge).

In FIG. 20, channel e (ch e), channel s (ch s), and channel k (ch k) represent periods during which nodes perform isochronous transfer. The 1394 interface uses different channel numbers in order to discriminate a plurality of different isochronous transfer operations. This enables isochronous transfer between a plurality of nodes. In this case, the channel number does not specify a transmission destination, but only gives a logical number to data.

The isochronous gap shown in FIG. 20 represents a bus idle state. Upon the lapse of a predetermined time in this idle state, a node which desires isochronous transfer determines that it can use the bus, and executes arbitration.

Figure 21:
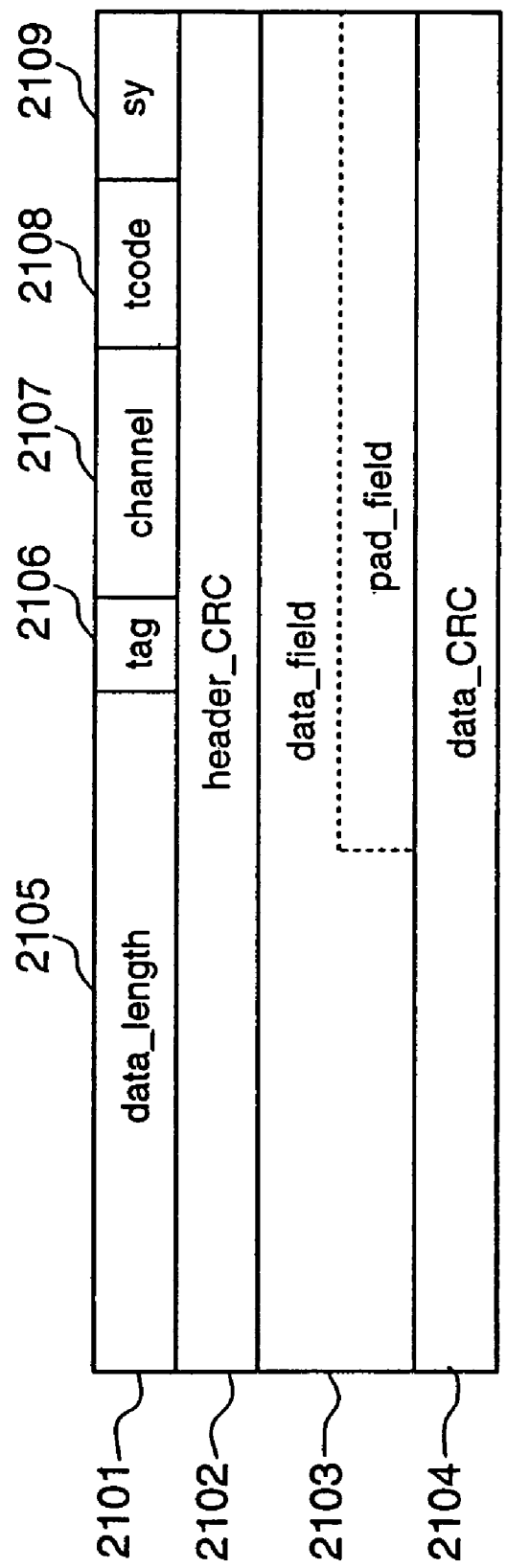
FIG. 21 is a view showing the format of a communication packet transferred based on the isochronous transfer mode in the first embodiment.

FIG. 21 shows the format of a communication packet transferred based on the isochronous transfer mode in the first embodiment. The communication packet transferred based on the isochronous transfer mode will be called an isochronous packet.

In FIG. 21, the isochronous packet is made up of a header 2101, header CRC 2102, data 2103, and data CRC 2104.

The header 2101 includes a field 2105 for storing the data length of the data 2103, a field 2106 for storing format information of the isochronous packet, a field 2107 for storing the channel number of the isochronous packet, a field 2108 for storing a packet format and a transaction code (tcode) for identifying processing which must be executed, and a field 2109 for storing an isochronous code.

(12) Asynchronous Transfer Mode

The asynchronous transfer mode of the first embodiment is an asynchronous type transfer scheme. Asynchronous transfer is one-to-one communication from a self node to a partner node, and can be executed until the next communication cycle starts (i.e., the CSP of the next communication cycle is transferred) after the end of an isochronous transfer period.

In FIG. 20, the first subaction gap represents a bus idle state. After the idle time reaches a predetermined value, a node which desires asynchronous transfer determines that it can use the bus, and executes arbitration.

Figure 22:
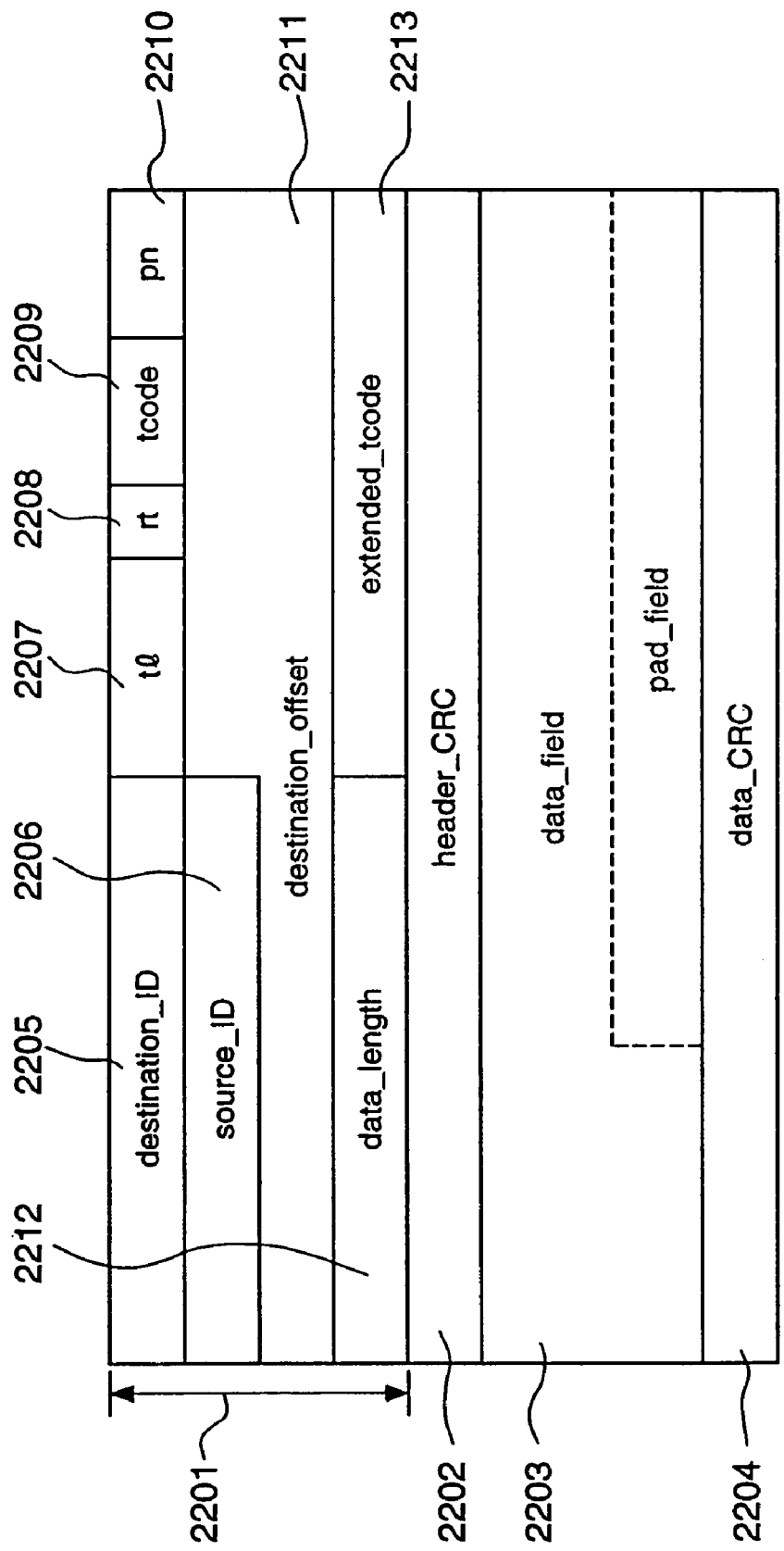
FIG. 22 is a view showing the format of a communication packet based on the asynchronous transfer mode in the first embodiment.

The node which gains bus access by arbitration transfers a packet shown in FIG. 22 to a predetermined node. The node which has received this packet returns ack (acknowledge) or response packet subsequently to ack gap.

FIG. 22 is a view showing the format of a communication packet based on the asynchronous transfer mode in the first embodiment. The communication packet transferred based on the asynchronous transfer mode will be called an asynchronous packet.

In FIG. 22, the asynchronous packet is made up of a header 2201, header CRC 2202, data 2203, and data CRC 2204.

In the header 2201, a field 2205 stores the node ID of a destination node; a field 2206, the node ID of a source node; a field 2207, a label representing a series of transactions; a field 2208, a code representing a retransmission status; a field 2209, a packet format and a transaction code (tcode) for identifying processing which must be executed; a field 2210, priority; a field 2211, the memory address of a destination; a field 2212, the length of data; and a field 2213, an extended transaction code.

A packet transferred from a transferring node in asynchronous transfer is transmitted to all the nodes in the network, but the nodes ignore packets except for ones designated to the self addresses. Thus, only a destination node can read the packet.

When asynchronous transfer reaches time at which the next CSP should be transferred, the next CSP is transmitted after the end of transfer without forcibly stopping transfer. If one communication cycle continues for 125 μS or more, the next communication cycle is shortened. This enables the 1394 network to hold an almost constant communication cycle.

(13) Creation of Device Map

As a means for obtaining the topology of the 1394 network by an application in order to create a device map, the IEEE 1394 standard provides the following means:

1) The topology map register of the bus manager is read.

2) The topology map is estimated from a self ID packet in bus reset.

By the means 1) and 2), the topology of a cable connection order based on the parent-child relationships between nodes can be attained, but the topology of a physical positional relationship cannot be attained (a port which is not actually mounted is listed).

As another means, information for creating a device map is held in the database of a device other than a configuration ROM. In this case, the means for obtaining various pieces of information depends on protocols for database access. On the other hand, the configuration ROM itself and the function of reading it are necessarily attached to an IEEE 1394-compliant device.

Thus, the first embodiment employs a function of storing information about the device position, function, and the like in the configuration ROM of each node and reading information by an application. Accordingly, the application of each node can have a so-called device map display function regardless of specific protocols for database access, data transfer, and the like.

The configuration ROM can store a physical position, function, and the like as node dependent information. Such information can be used to realize the device map display function.

In this case, in order for an application to obtain the 1394 network topology based on the physical positional relationship; the configuration ROM of each node is read-accessed in accordance with bus reset or a user's request, thereby obtaining the 1394 network topology. Further, various pieces of node information such as functions in addition to the physical position of a node can be described in the configuration ROM. By read-accessing the configuration ROM, function information of each node can be attained at the same time as the physical position of the node. When an application is to acquire configuration ROM information of each node, the application uses an API for acquiring arbitrary configuration ROM information of a designated node.

With the use of this means, the application of a device on the IEEE 1394 network can create various device maps such as a physical topology map and the function map of each node in accordance with application purposes. The user can select a device having a necessary function.

<Overview of 1394 Bridge>

The configuration and connection device in the first embodiment will be described.

The technique of an IEEE 1394 bridge applied to the digital interface of the first embodiment will briefly be described. The standard of the IEEE 1394 bridge (to be referred to as a "1394 bridge" hereinafter) is being defined by the IEEE p1394.1.

According to the 1394 standard, a maximum of 63 nodes can be connected to one 1394 bus, and the hop count is up to 16. To connect more than 63 1394 nodes to a 1394 network, or connect devices at remote places by connecting more than 16 hops, a 1394 bridge is generally used.

The IEEE 1394 standard uses 64-bit fixed addressing according to the IEEE 1212 standard, and defines 10 bits as a bus ID. Thus, a maximum of 1,023 buses except for ID 1023 for designating a local bus can be connected via 1394 bridges to constitute a 1394 network.

The main function of the 1394 bridge is control of 1394 node transaction between buses via the bridge. In 1394 transaction, a node which issues a transaction, i.e., issuing node is designated using a node ID as described in <Technical Overview of IEEE 1394 Standard>. The 1394 bridge has a table of information such as topology information of two connected buses and node ID information, and discloses partner's bus/node information to two connected buses to enable transactions between the buses.

On the 1394 bus, bus reset occurs when the connection configuration changes by additionally connecting a device node or when a certain node intentionally instructs bus reset. To automatically reassign a node ID upon occurrence of bus reset, the bus reset sequence and node ID determination sequence are done to create a new topology. Details of these sequences are described in "(6) Description of Sequence After Occurrence of Bus Reset" and "(8) Assignment of Node ID" of <Technical Overview of IEEE 1394 Standard>, and a description thereof will be omitted.

Because of these characteristics, topology/node ID information of a connected bus dynamically changes, and the bridge updates this information.

During the 1394 bus reset sequence, data transfer on the bus is suspended, and a complicated node ID reassignment sequence is executed. It is, therefore, inefficient to propagate a bus reset signal to a bus which need not execute any bus reset sequence. For this reason, the 1394 bridge does not propagate the bus reset signal of one connected bus to the other bus.

As another bridge function, the 1394 bridge has a packet routing function based on arbitration between 1394 bridges and exchange of information between bridges in a network constituted by a plurality of buses in which a plurality of bus bridges are connected.

The configuration and functions of the communication system constructed using the 1394 interface have been described.

[Description of Configuration and Connection Device in First Embodiment]

Figure 23:
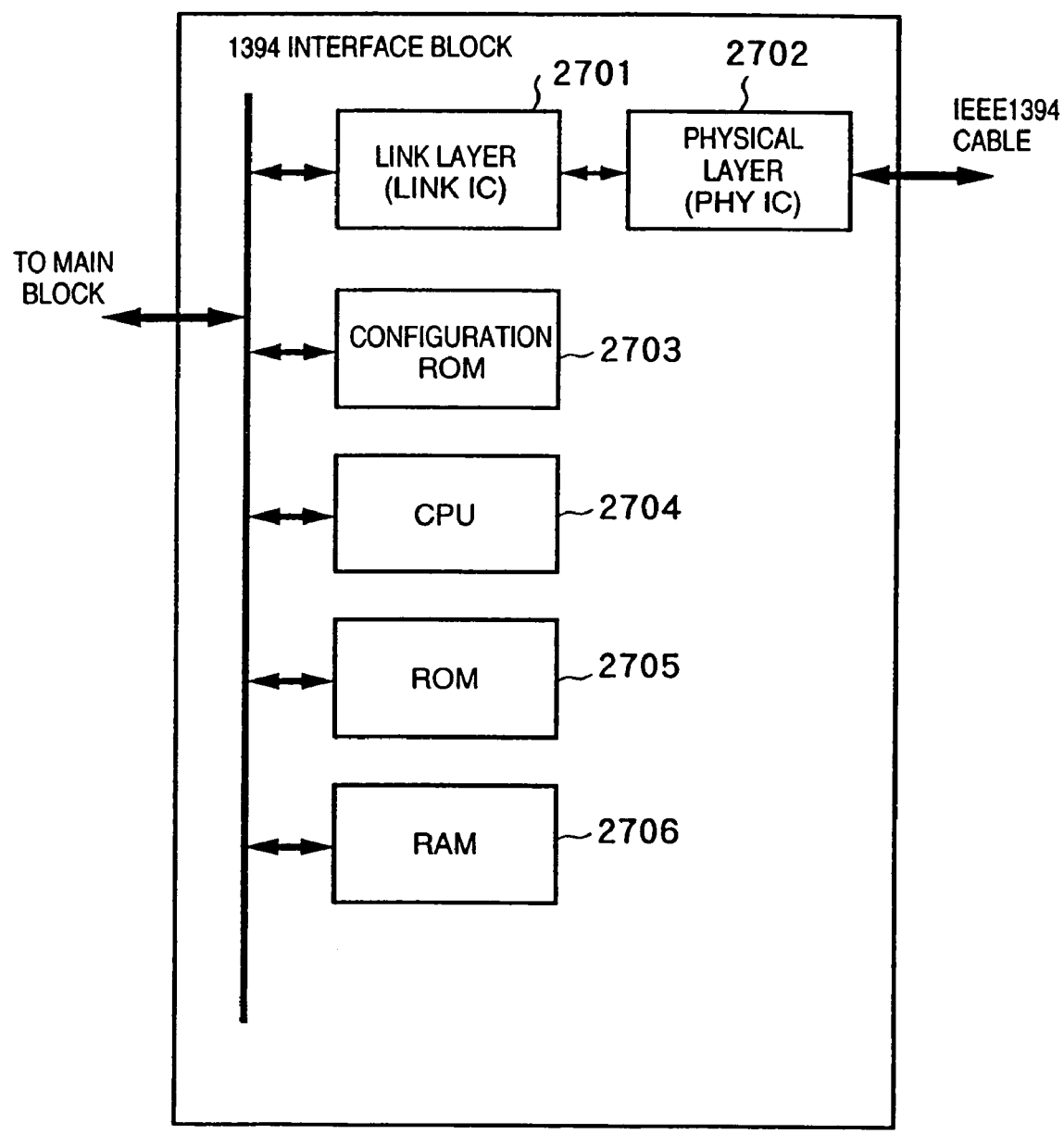
FIG. 23 is a block diagram showing the arrangement of the 1394 interface block of a 1394 node in the first embodiment.

The configuration and connection device in the first embodiment will be described. The configuration of a 1394 serial bus interface common to respective nodes connected to each local bus will be explained with reference to FIG. 23. FIG. 23 is a block diagram showing the arrangement of the 1394 interface block of a 1394 node in the first embodiment.

In FIG. 23, reference numeral 2701 denotes a link layer control IC (LINK IC) which interfaces a device main body, controls data transfer of a PHY IC, and realizes the function of the link layer in <Technical Overview of IEEE 1394 Standard>. The main function of this IC includes a transmission/reception FIFO function of temporarily storing transmission/reception data via the PHY IC, a function of packeting transmission data, a function of determining whether the PHY IC is suitable for an assigned channel when reception data has the self node address or is isochronous transfer data, a receiver function of performing error check for the data, and a function of interfacing the device main body.

Reference numeral 2702 denotes a physical layer control IC (PHY IC) for directly driving the 1394 serial bus. The physical layer control IC 2702 realizes the function of the physical layer in <Technical Overview of IEEE 1394 Standard>. The main function of this IC includes bus initialization, arbitration, encoding/decoding of a transmission data code, monitoring of a cable ON state, supply of a load termination type power source (for recognizing active connection), and an interface with a link layer IC.

Reference numeral 2703 denotes a configuration ROM which stores identification and communication conditions unique to each device. The data format of this ROM complies with a format defined by the IEEE 1212 and IEEE 1394 standards, as described in <Technical Overview of IEEE 1394 Standard>.

Reference numeral 2704 denotes a CPU for controlling 1394 interfaces such as the link layer IC and PHY IC; 2705, a ROM storing control programs for these interfaces; and 2706, a RAM used for a data buffer for storing transmission/reception data, a control work area, and the data areas of various registers mapped at 1394 addresses.

Figure 24:
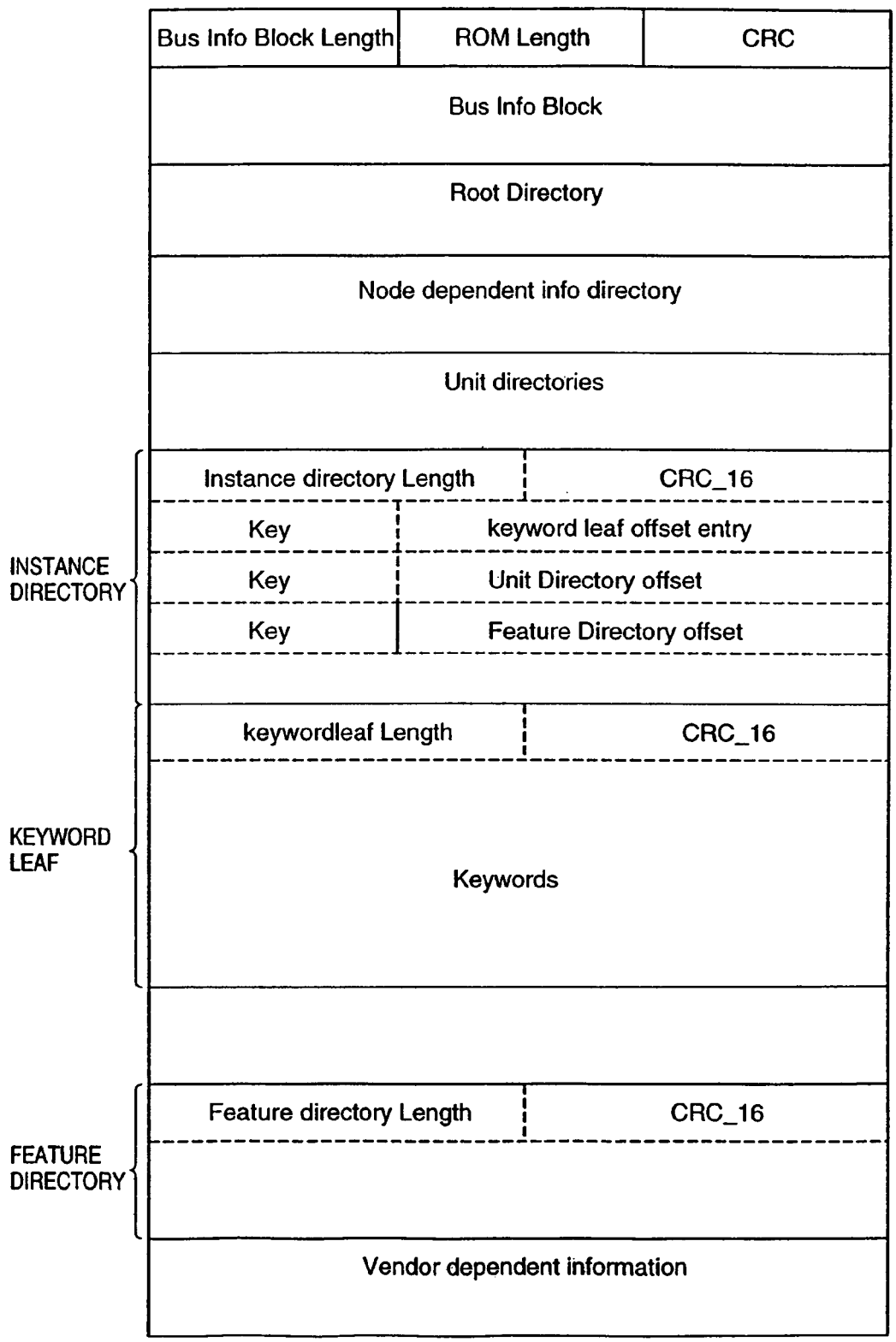
FIG. 24 is a view showing the format of storage data in the configuration ROM in the first embodiment.

Each node comprises a configuration ROM of a general format as shown in FIG. 24. Software unit information of each device is stored in a unit directory, whereas node dependent information is stored in a node dependent info directory.

The basic function instance of each device such as a printer function or scanner function, and detailed information accessory to the basic function can be held by an instance directory offset from the root directory.

The format of the instance directory will be described. The instance directory stores information of a device such as a printer or scanner which does not depend on protocols. For a single-function device, basic function information is one. For a device which supports a plurality of functions, a plurality of functions are listed. For each of the listed functions, the instance directory stores pointer information to a unit directory for storing corresponding protocol software information, and a pointer to a feature directory for holding detailed information unique to each function.

Figure 25:
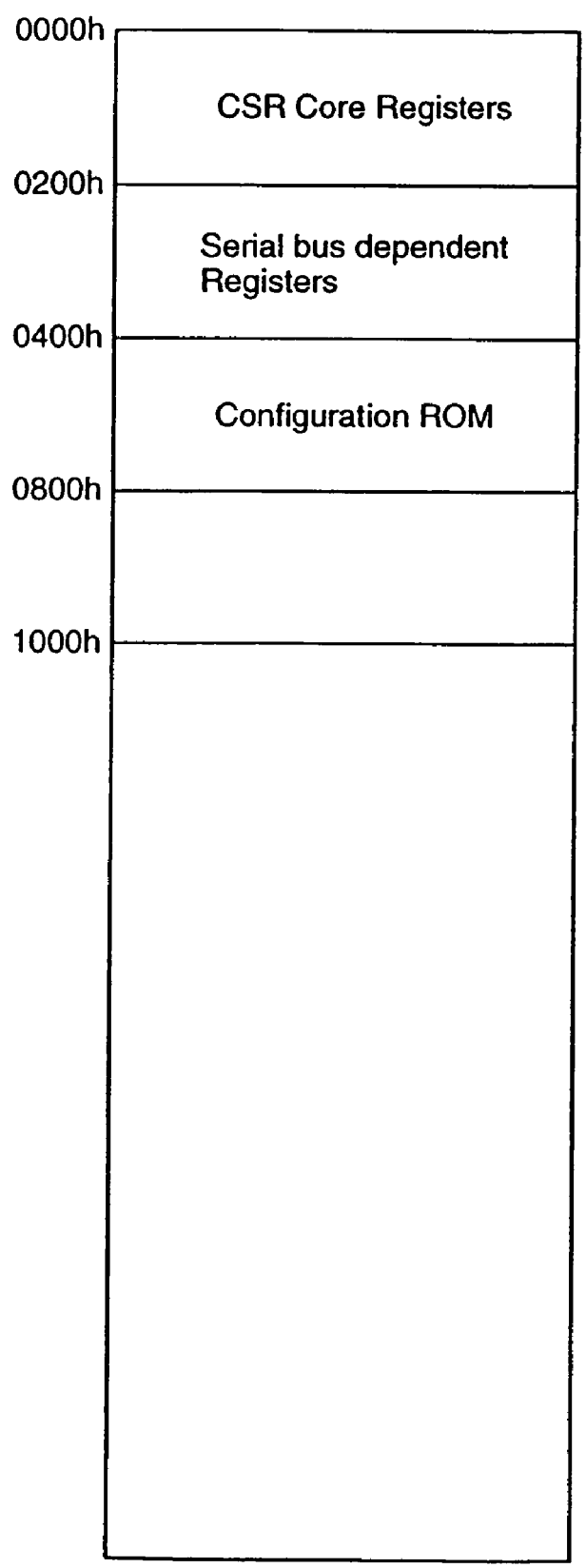
FIG. 25 is a view showing the address space of the 1394 node in the first embodiment.

As described in <Technical Overview of IEEE 1394 Standard>, the last 28 bits out of the address setting of the 1394 serial bus are ensured as the unique data area of each device which can be accessed by another device connected to the serial bus. FIG. 25 is a view showing the address space of the 28-bit area serving as the unique data area of each device.

CSR core registers shown in FIG. 11 are arranged in an area from address 0000 to address 0200 in FIG. 25. These registers exist as basic functions for node management defined by the CSR architecture.

An area from address 0200 to address 0400 is defined by the CSR architecture as an area for storing serial bus dependent registers. FIG. 26 shows an example of the area for storing serial bus dependent registers according to the first embodiment. As described in <Technical Overview of IEEE 1394 Standard>, registers at address 0200 to address 0230 are defined and used for synchronization of data transfer, supply of power, management of the bus resource, and the like. This is the same as the arrangement shown in FIG. 12.

A register REMOTE_BUS_RESET arranged at address 0240 in FIG. 26 is a feature of the first embodiment. The format of this register is shown in FIG. 27.

Figure 27:
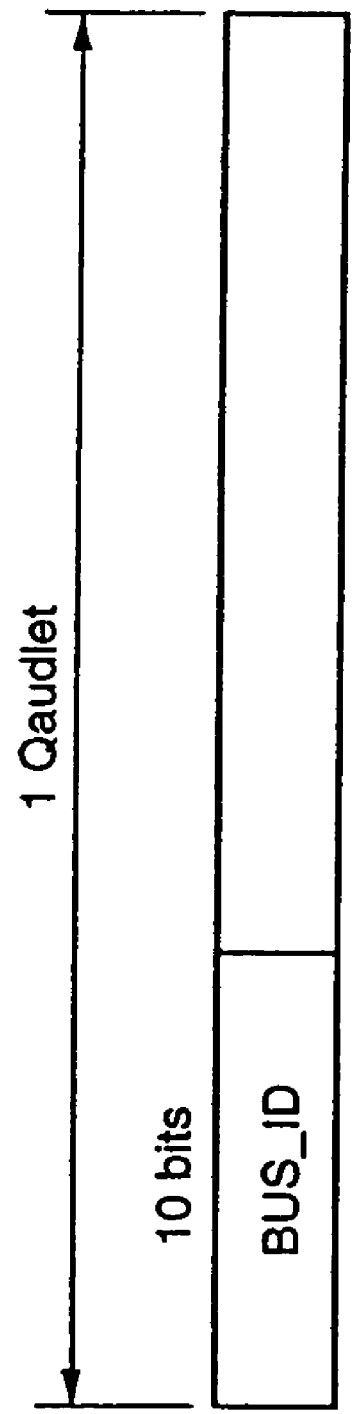
FIG. 27 is a view showing the REMOTE_BUS_RESET register of the 1394 node in the first embodiment.

A node in which data prepared by substituting an effective bus ID in a BUS_ID field in accordance with the format of FIG. 27 is written by a 1394 write transaction to this register can know occurrence of bus reset in a remote bus represented by the BUS_ID field other than a local bus connected to this node. The above-mentioned configuration ROM is arranged in an area from address 0400 to address 0800.

An area from address 0800 to address 1000 shown in FIG. 25 stores the current 1394 bus topology information and information about the transfer speed between nodes. An area after address 1000 is called a unit space where registers concerning operations unique to each device are arranged. This area stores registers and a data transfer memory mapped buffer area defined by upper protocols supported by each device, or device dependent registers.

Figure 28:
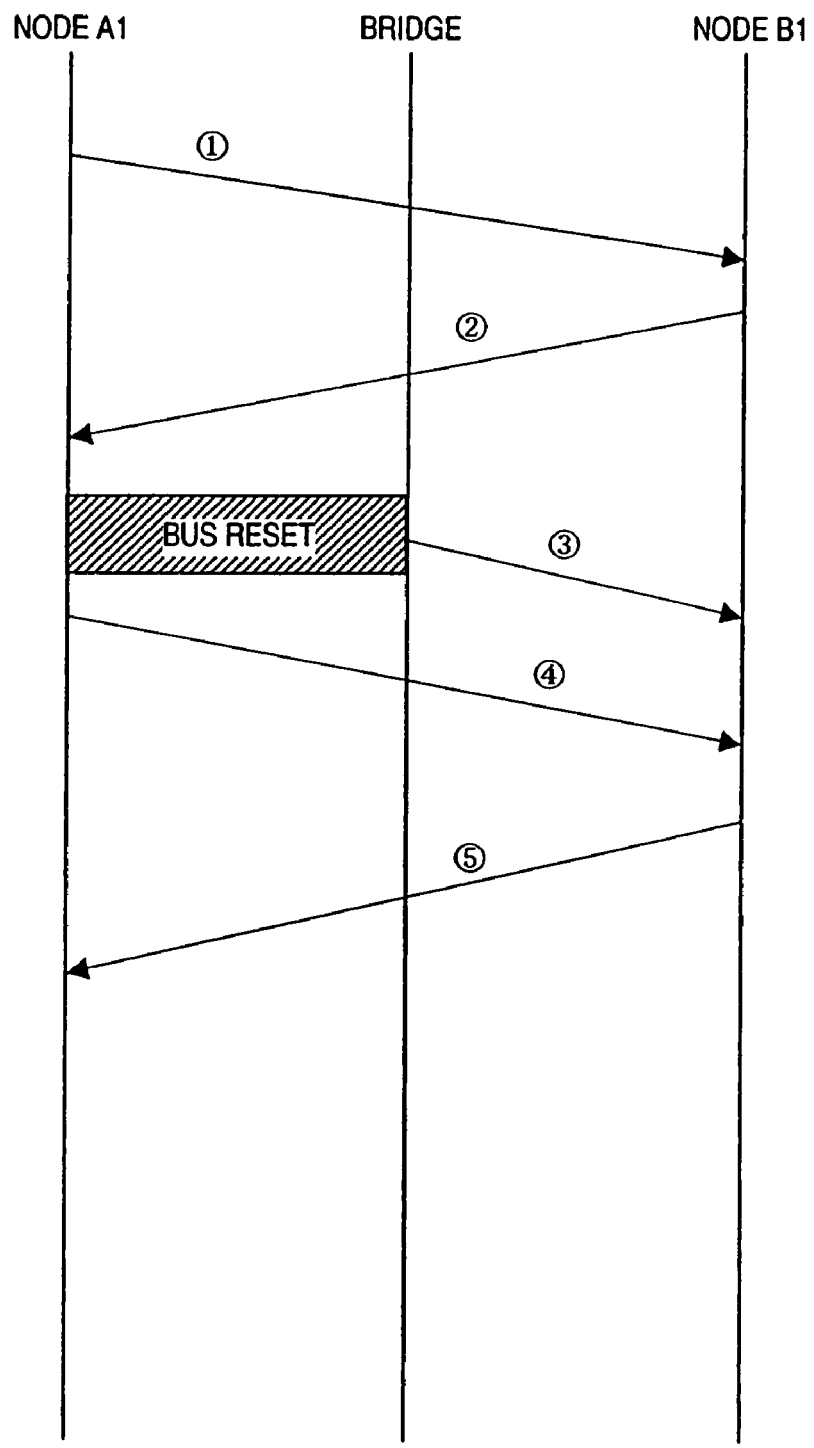
FIG. 28 is a view showing communication control procedures complying with a DPP protocol in the first embodiment.
Figure 29:
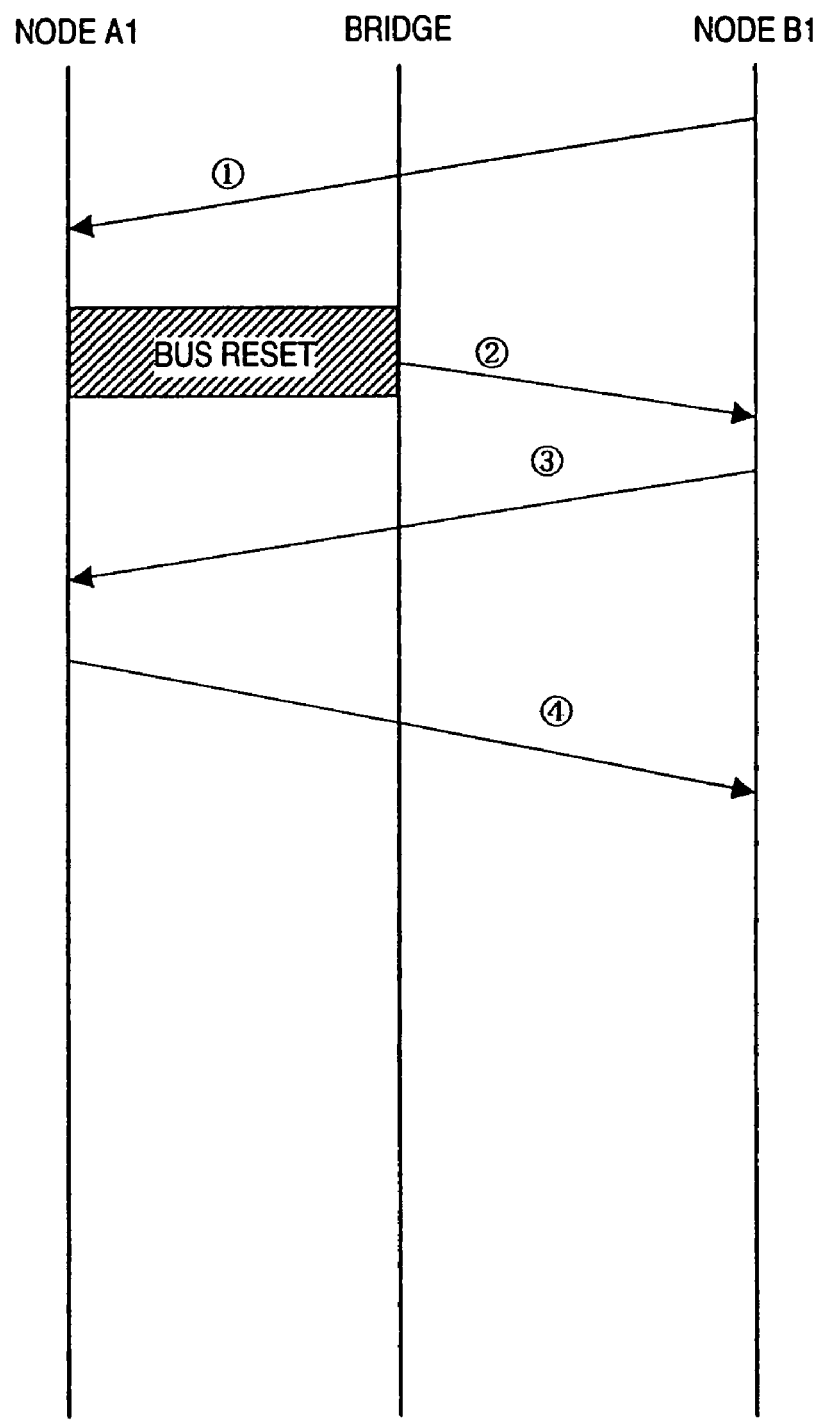
FIG. 29 is a view showing communication control procedures complying with an AV/C protocol in the first embodiment.

The operation of the first embodiment in a 1394 network where devices A1 and A2 each having a 1394 interface constituted in the above manner are connected to the bus A, devices B1 and B2 are connected to the bus B, and the buses A and B are connected by a 1394 bridge device will be explained with reference to FIGS. 28 and 29. FIG. 28 is a view showing communication control procedures complying with a DPP protocol in the first embodiment, and FIG. 29 is a view showing communication control procedures complying with an AV/C protocol in the first embodiment.

Before the buses A and B attain their current connection configurations, bus reset independently occurs on each bus every time a device node is additionally connected. A bus reset sequence and bus ID determination sequence are executed to automatically assign a node ID upon occurrence of bus reset, and a new topology is created.

Then, 1394 data transfer starts on each bus. Details of these sequences are described in "(6) Description of Sequence After Occurrence of Bus Reset" and "(8) Assignment of Node ID" of <Technical Overview of IEEE 1394 Standard>, and a description thereof will be omitted. Although the operation changes depending on the connection order of connection nodes and the connection order of buses to the 1394 bridge, the bus reset-1394 initialization sequence is repeated every time a node is connected. Finally, a topology in which devices A1 and A2 are connected to the bus A via the 1394 bridge 101, and devices B1 and B2 are connected to the bus B is formed.

While the topology of the 1394 network is determined in this state, and 1394 data transfer is normally performed, the node A1 as a digital still camera having a direct print protocol (to be referred to as a "DPP") as an upper protocol searches for a printer device which supports the DPP on the 1394 network, like the self node, in order to transfer image data to a printer connected to the 1394 network and print the image data in accordance with user operation or the trigger of an application.

This is realized by read-accessing the configuration ROM of a partner node for a node connected to the network. This is shown in FIG. 19. More specifically, the node uses an IEEE 1394 read transaction for the partner node to receive the ROM contents of the partner node as a read response.

As described above, 1394-related information is described in the configuration ROM of each node. Further, the basic function of each node such as a printer or camera is described in the instance directory, and an upper protocol such as an AV/C protocol or DPP and software information are described in the unit directory.

While the node A1 read-accesses the ROM of each node on the local bus A, and then read-accesses the ROM of each node on the bus B via the 1394 bridge, the node A1 detects that the node B1 is a printer as a DPP device.

Although details of a 1394 transaction via the 1394 bridge will be omitted, its standard is being defined by IEEE p1394.1.

After the camera as the node A1 finds the node B1 which is a printer and has the same protocol as the DPP protocol supported by the node A1, the node A1 establishes connection with the node B1 in accordance with procedures and a format defined by the DPP protocol shown in FIG. 28.

More specifically, the node A1 transmits a connection request command to the node B1 using a write transaction, as shown in ① of FIG. 28. In response to this, the node B1 transmits a connection request response using a write transaction, as shown in ② of FIG. 28. Then, transfer of application data starts.

Similarly, the node B2 as a digital video cam coder having an AV/C protocol as an upper protocol starts transmission/reception of an AV/C command with the node A2 via the 1394 bridge using an AV/C protocol shown in FIG. 29. The node B2 issues an AV/C command, and enters a response wait state, as shown in ① of FIG. 29.

Assume that a device node A3 (108) shown in FIG. 1 is newly connected to the bus A by user operation in this network state. Since the new node is additionally connected, bus reset occurs in accordance with IEEE 1394 characteristics.

The 1394 interface layer of each node on the bus A which has received a bus reset signal notifies the upper protocol layer of this information. At the same time, the node starts a series of bus reset resume processes such as a bus reset sequence and node ID determination sequence in order to automatically assign a node ID upon occurrence of bus reset.

After bus reset on the bus A 102 is notified to the DPP layer, the node A1 (104), which establishes connection with the node B1 (106) on the bus B 103 in accordance with a DPP protocol on the bus A 102 and performs data transfer, starts bus reset resume processing complying with the DPP protocol.

In bus reset resume processing by DPP, when data transfer normally restarts after bus reset resume processing ends in the 1394 layer to determine a new node ID and topology, a node which has first transmitted a connection request to a partner node within a predetermined time before data transmission restarts transmits a reconnection request command.

After bus reset resume is completed in the 1394 interface layer, a node which has received a request in establishment of connection enters a reception wait state for a reconnection request command from the node which has established connection. If the node does not receive any command, it abandons the connection.

After bus reset on the bus A 102 is notified to the AV/C layer, the node B1 (106) which is transferring data to the node B2 (107) on the bus B 103 in accordance with an AV/C protocol on the bus A 102 starts bus reset procedure processing.

In the AV/C protocol, a node which has received an AV/C command transmitted by one node generally transmits a paired response containing information such as command execution results and the like to the command issuing node. Upon occurrence of bus reset, an AV/C command sent before reset for which no response is received is regarded not to be executed and to be abandoned. Thus, an AV/C command must be resent after bus reset processing ends in the 1394 interface layer, and data transfer normally resumes.

On the bus B 103 whose connection configuration is not changed, no bus reset occurs in accordance with the IEEE standard. Even if bus reset occurs on the bus A 102 connected via the 1394 bridge 101, the bus B 103 detects this, but the 1394 bridge 101 does not propagate any bus reset signal to another bus, i.e., the bus B 103 in this case because of defined characteristics.

Hence, only nodes such as the nodes A1, A2, and A3 connected to the bus A 102 start bus reset resume processing. The node B1 (106) as the data transmission destination of the node A1 (104) and the node B2 (107) as the data transmission destination of the node A2 (105) do not start this processing.

In the 1394 network system of the first embodiment, the 1394 bridge comprises a means for notifying, of bus reset occurrence information on one bus, a node connected to the other bus, and each node comprises a means for receiving a bus reset occurrence notification from a remote bus.

More specifically, the 1394 bridge 101 which has received a bus reset signal upon occurrence of bus reset on the bus A executes bus reset processing on the node controller side. At the same time, the 1394 bridge 101 notifies the node controller side of the bus B of occurrence of bus reset together with bus ID information of the bus A, i.e., a value 3FDh.

The node controller of the bus B which has received this information uses a 1394 write transaction to write a packet containing data representing the bus ID: 3 FDh of the remote bus suffering bus reset in the register "REMOTE_BUS_RESET" arranged at address 0240 of each node connected to the bus B in accordance with the format of this register.

Although no bus reset occurs on the bus B, the bus B is notified of occurrence of bus reset on the remote bus A by writing the ID of the bus A in the REMOTE_BUS_RESET register of each node by the 1394 bridge 101, as shown in ③ of FIG. 28 or ② of FIG. 29.

The 1394 interface layer of each node on the bus B which has detected write in the REMOTE_BUS_RESET register notifies the upper protocol layer of occurrence of bus reset on the remote bus and bus ID information of the remote bus.

The node B1, which has established connection with the node A1 on the bus A in accordance with a DPP protocol on the bus B and has performed data transfer, checks the ID of the remote bus suffering bus reset, and confirms that the remote bus is the bus A connected to a node as the connection destination of the node B1. Then, the node B1 recognizes that the connection destination node, i.e., node A1 has started bus reset resume processing complying with a DPP protocol.

The node B1 also starts processing corresponding to DPP bus reset processing, and enters a reception wait state for a reconnection request command from the node with which the node B1 establishes connection. This ensures the consistency of DPP protocol processing between the node A1 which starts bus reset processing after bus reset actually occurs, and the node B1 connected to the bus B on which no bus reset occurs.

After that, the node A1 transmits a reconnection request command shown in ④ of FIG. 28 to the node B1, and the node B1 transmits a reconnection request response shown in ⑤ of FIG. 28 to the node A1, thereby restarting data communication.

Similarly, the node B2, which has exchanged an AV/C command with the node A2 on the bus A in accordance with an AV/C protocol on the bus B, checks the ID of the remote bus suffering bus reset, and confirms that the remote bus is the bus A connected to the node A2 as a connection destination node. Then, the node B2 recognizes that the connection destination node, i.e., node A2 has started bus reset processing according to an AV/C protocol.

The node B2 also executes processing corresponding to AV/C bus reset processing shown in FIG. 29, and processing in which an AV/C command sent before remote bus reset for which no response is received is regarded not to be executed and to be abandoned. This ensures the consistency of AV/C protocol processing between the node A2 which starts bus reset processing after bus reset actually occurs, and the node B2 connected to the bus B on which no bus reset occurs.

The node B2 resends an AV/C command shown in ③ of FIG. 29 to the node A2. In response to this, the node A2 transmits an AV/C response shown in ④ of FIG. 29 to the node B2, thereby continuing communication.

As described above, the first embodiment provides a 1394 bus system characterized in that a node connected to an IEEE 1394 bus comprises a means capable of receiving the ID of a bus suffering bus reset and a reset occurrence notification when bus reset occurs on a remote bus other than a bus connected to the self node, and if a plurality of buses are connected via bridges, a bridge connected to the bus suffering bus reset transmits to the reception means of other connected buses a remote bus reset occurrence notification containing the ID of the bus suffering bus reset. When bus reset occurs on one local bus in performing data transfer from a data transmission node on one local bus to a data reception node connected to the other local bus via a 1394 bridge, the 1394 bridge can notify the node connected to the remote bus of bus reset. The reception node connected to the other bus can detect bus reset to maintain the consistency of bus reset processing in the upper protocol layer. This enables normal data communication between buses.

The first embodiment can further provide a node connected to an IEEE 1394-compliant communication control bus with a means capable of receiving the ID of a bus suffering bus reset and a reset occurrence notification when bus reset occurs on a remote bus other than a local bus connected to the self node.

As the remote bus reset occurrence notification reception means, the first embodiment can provide a means for storing a register at a predetermined address on the node, and detecting write of bus ID information at the address to receive a remote bus reset occurrence notification.

Further, the first embodiment can provide an information signal processing apparatus characterized in that the predetermined register is arranged in the core CSR architecture register space or serial bus register space in the address space of each 1394 node.

The first embodiment can provide a 1394 bus system characterized in that occurrence of remote bus reset is notified when a plurality of buses are connected via bridges in an IEEE 1394 bus system, and bus reset occurs in a remote bus other than connected buses. Moreover, this embodiment can provide a 1394 bus system characterized in that a bridge connected to a bus suffering bus reset transmits to the node of another connected bus a remote bus reset occurrence notification containing the ID of the bus suffering bus reset.

Second Embodiment

The second embodiment according to the present invention will be described below. In the second embodiment, the configuration and function of a communication system using a 1394 interface are the same as those in the first embodiment, and a detailed description thereof will be omitted.

In the second embodiment, the same reference numerals as in the first embodiment denote the same parts in the configuration and connection device of the second embodiment, and a detailed description thereof will be omitted.

In the second embodiment, a 1394 serial bus interface can be constituted similarly to the first embodiment shown in FIG. 23, and the configuration ROM of each node can adopt the same formats as those shown in FIGS. 24 and 25. The second embodiment is different from the first embodiment in that the format of an area from address 0200 to address 0400 shown in FIG. 25 for storing serial bus dependent registers has the format shown in FIG. 30.

Figure 31:
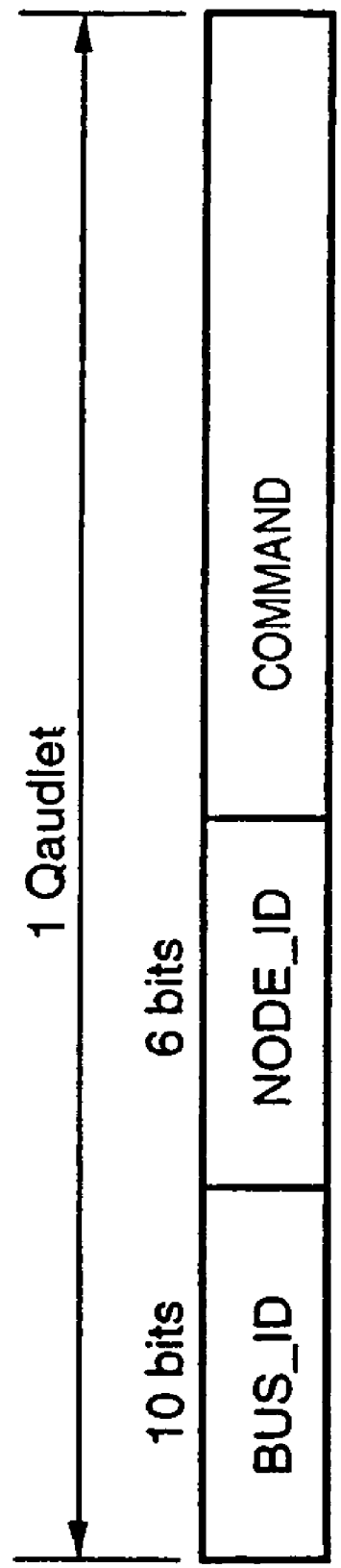
FIG. 31 is a view showing details of the NOTIFY_BUS_RESET register of the 1394 node in the second embodiment.

In the second embodiment, NOTIFY_BUS_RESET arranged at address 0244 is assigned in addition to serial bus dependent registers shown in FIG. 26, and is a characteristic register of the second embodiment. The format of the NOTIFY_BUS_RESET register will be explained with reference to FIG. 31. FIG. 31 is a view showing the format of the NOTIFY_BUS_RESET register in the second embodiment.

The NOTIFY_BUS_RESET register is a register mounted on the bridge portal of a 1394 bridge 101 (to be described below) to which the second embodiment is applied. According to a 1394 write transaction, a data with a format of FIG. 31 is written into the register. If an effective bus ID, an effective node ID and an effective command (1: store, 0: delete) are respectively substituted in a BUS_ID field, a NODE_ID field and a command field of the data written in the register, the bridge 101 receives the data as an effective data, and executes process according to the value of the command field. If the value of the command field is "1" (store), the bridge 101 stores the values of BUS_ID field and NODE_ID field of the received data into the storage table corresponds to the portal. If the value of the command field is "0" (delete), the bridge 101 deletes the values of BUS_ID field and NODE_ID field of the received data from the storage table corresponds to the portal. When a bus reset occurs in the 1394 bus to which the portal is connected, the bridge 101 notifies the occurrence of the bus reset to the node by writing, according to the 1394 write transaction, to a REMOTE_BUS_RESET register of the node designated by the bus ID and node ID stored in the storage table.

Figure 32:
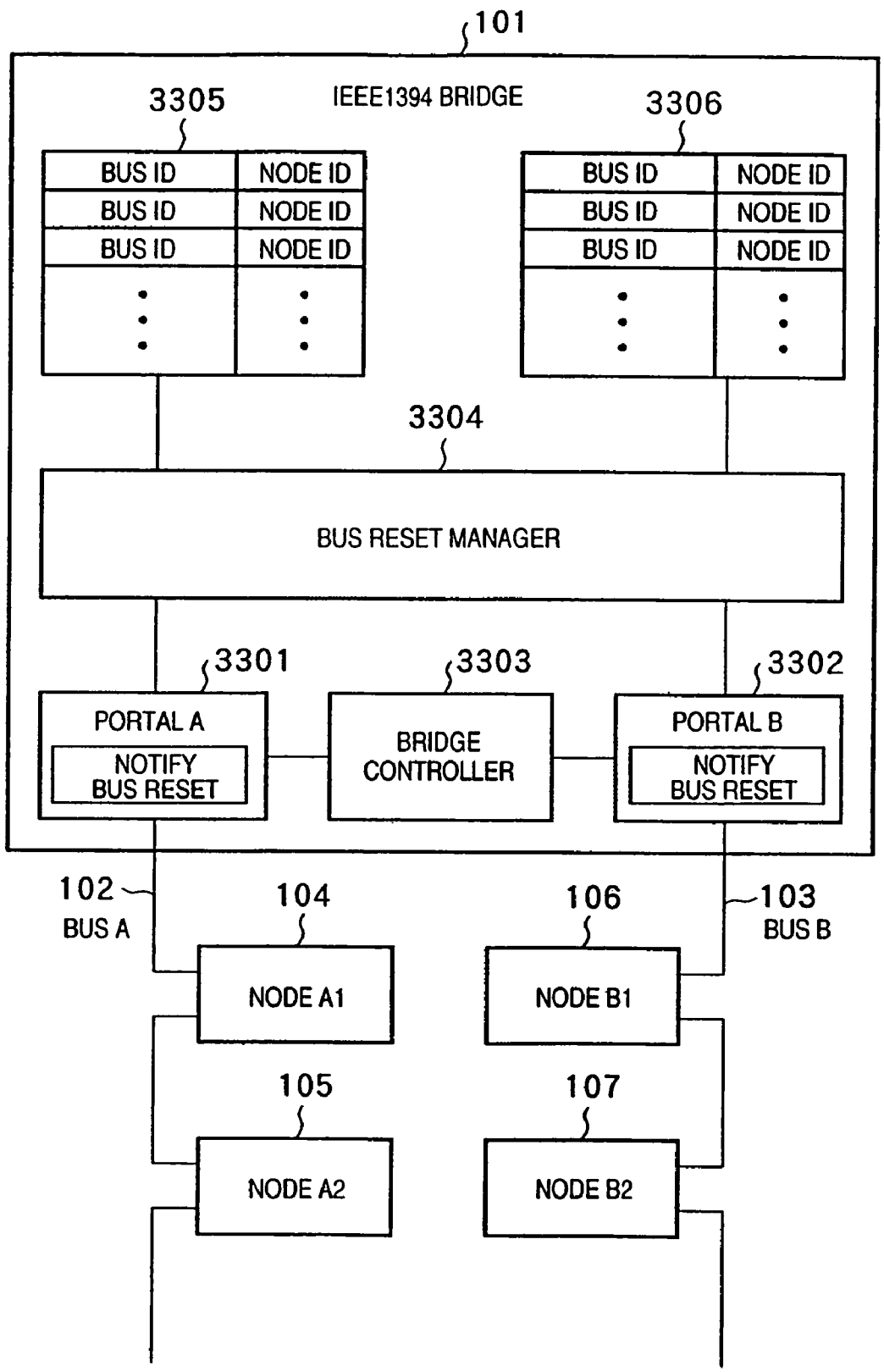
FIG. 32 is a block diagram showing the detailed arrangement of a 1394 bridge in the second embodiment.

FIG. 32 is a block diagram showing the arrangement of the IEEE 1394 bridge 101 in the second embodiment. In FIG. 32, a portal A 3301 is connected to a bus A 102, whereas a portal B 3302 is connected to a bus B 103. Each portal functions as one node connected to the bus.

A bridge controller 3303 has a function of bridging the portals A 3301 and B 3302. A bus reset manager 3304 stores or deletes a bus ID and node ID written in the NOTIFY_BUS_RESET register of the portal A 3301 in or from a storage table A 3305.

Similarly, the bridge controller 3303 stores or deletes a bus ID and node ID written in the NOTIFY_BUS_RESET register of the portal B 3302 in or from a storage table B 3306. The bridge controller 3303 notifies a node of occurrence of bus reset by writing data in accordance with the same format of FIG. 27 as in the first embodiment in the REMOTE_BUS_RESET register of the node stored in the storage table A 3305 when bus reset occurs on the bus A 102, or in the storage table B 3306 when bus reset occurs on the bus B 103.

The configuration ROM is arranged in an area from address 0400 to address 0800.

Similar to the first embodiment, an area from address 0800 to address 1000 shown in FIG. 25 stores the current 1394 bus topology information and information about the transfer speed between nodes. An area after address 1000 is called a unit space where registers concerning operations unique to each device are arranged. This area stores registers and a data transfer memory mapped buffer area defined by upper protocols supported by each device, or device dependent registers.

Figure 33:
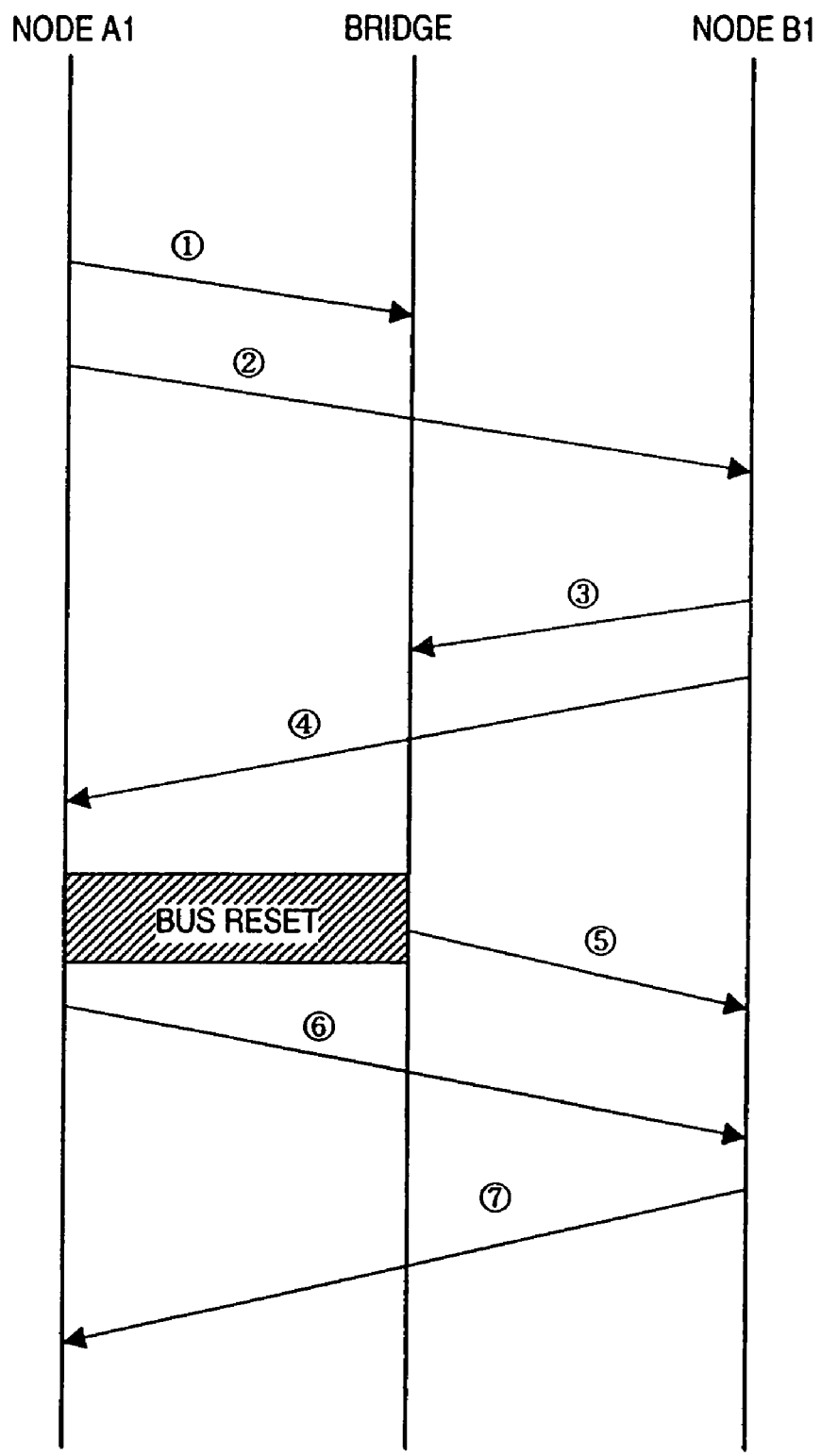
FIG. 33 is a view showing communication control procedures complying with a DPP protocol in the second embodiment.
Figure 34:
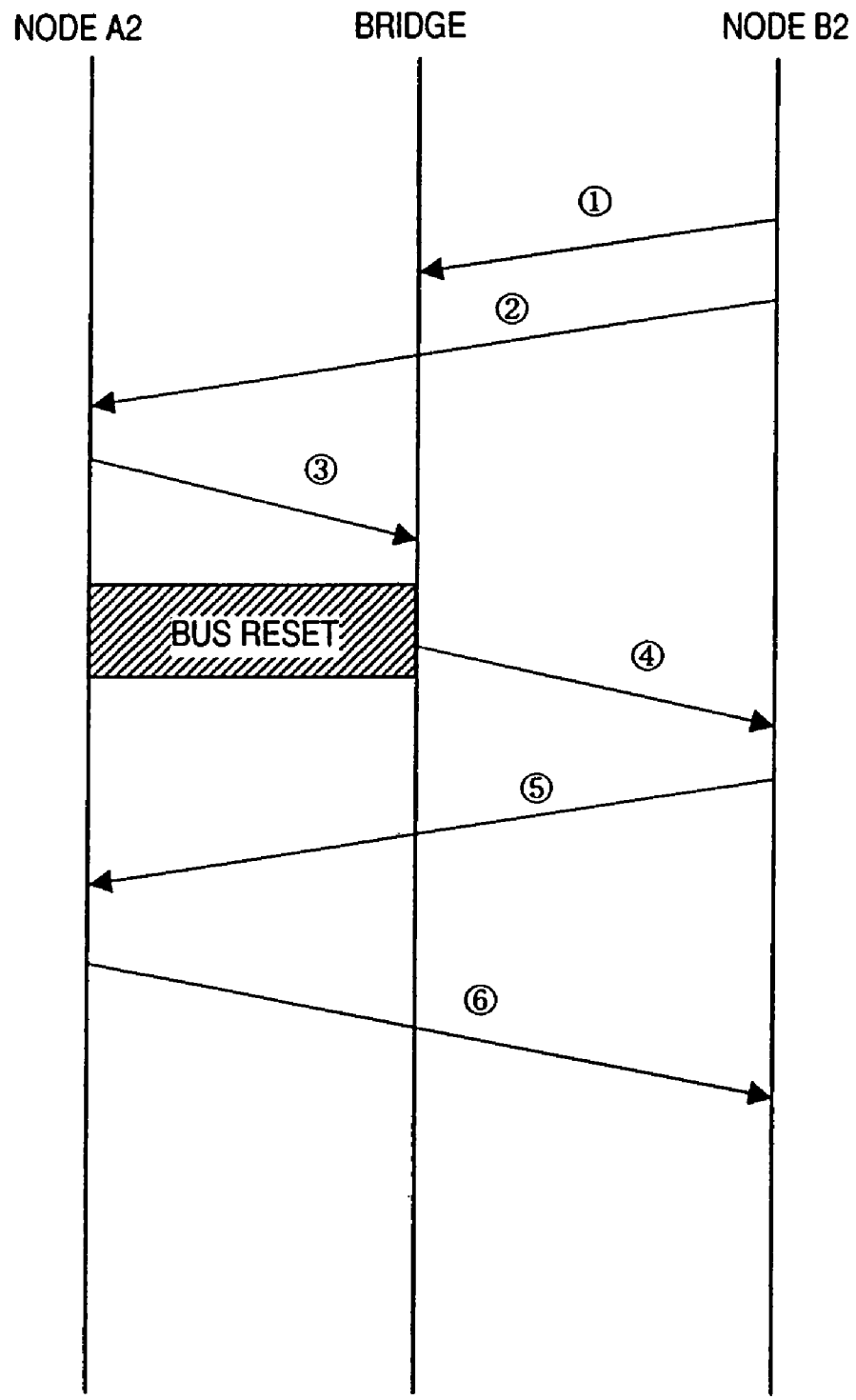
FIG. 34 is a view showing communication control procedures complying with an AV/C protocol in the second embodiment.

A detailed operation in a 1394 network shown in FIG. 1 where the nodes A1 (104) and A2 (105) each having a 1394 interface constituted in the above manner are connected to the bus A 102, the nodes B1 (106) and B2 (107) are connected to the bus B 103, and the bus A 102 and bus B 103 are connected by the 1394 bridge 101 will be explained with reference to FIGS. 33 and 34. FIG. 33 is a view showing communication control procedures complying with a DPP protocol in the second embodiment, and FIG. 34 is a view showing communication control procedures complying with an AV/C protocol in the second embodiment.

Before buses A and B attain their current connection configurations, bus reset independently occurs on each bus every time a device node is additionally connected. Upon occurrence of bus reset, a node ID is automatically assigned. For this purpose, a bus reset sequence and bus ID determination sequence are executed to create a new topology.

Then, 1394 data transfer starts on each bus. Details of these sequences are described in "(6) Description of Sequence After Occurrence of Bus Reset" and "(8) Assignment of Node ID" of <Technical-Overview of IEEE 1394 Standard>, and a description thereof will be omitted.

Although the operation changes depending on the connection order of connection nodes and the connection order of buses to the 1394 bridge 101, the bus reset-1394 initialization sequence is repeated every time a node is connected. Finally, a topology in which devices A1 and A2 are connected to the bus A via the 1394 bridge 101, and devices B1 and B2 are connected to the bus B is formed.

While the topology of the 1394 network is determined in this state, and 1394 data transfer is normally performed, the node A1 as a digital still camera having a direct print protocol (to be referred to as a "DPP") as an upper protocol searches for a printer device which supports the DPP on the 1394 network, like the self node, in order to transfer image data to a printer connected to the 1394 network and print the image data in accordance with user operation or the trigger of an application.

This is realized by read-accessing the configuration ROM of a partner node for a node connected to the network. This is shown in FIG. 19. More specifically, the node uses an IEEE 1394 read transaction for the partner node to receive the ROM contents of the partner node as a read response.

As described above, 1394-related information is described in the configuration ROM of each node. Further, the basic function of each node such as a printer or camera is described in the instance directory, and an upper protocol such as an AV/C protocol or DPP and software information are described in the unit directory.

While the node A1 read-accesses the ROM of each node on the local bus A, and then read-accesses the ROM of each node on the bus B via the 1394 bridge, the node A1 detects that the node B1 is a printer as a DPP device.

Although details of a 1394 transaction via the 1394 bridge will be omitted, its standard is being defined by IEEE p1394.1.

After the camera as the node A1 (104) finds the node B1 (106) which is a printer and has the same protocol as the DPP protocol supported by the node A1, the node A1 establishes connection with the node B1 in accordance with procedures and a format defined by the DPP protocol shown in FIG. 33, and starts data transfer.

At this time, as shown in ① of FIG. 33, the node A1 (104) writes {(bus ID of bus B), (node ID of node B1), (storage command)} in the NOTIFY_BUS_RESET register of the portal A 3301 of the 1394 bridge 101 in accordance with the format shown in FIG. 31. The node A1 (104) transmits a connection request command to the node B1 using a write transaction shown in ② of FIG. 33.

In response to this, as shown in ③ of FIG. 33, the node B1 (106) writes {(bus ID of bus A), (node ID of node A1), (storage command)} in the NOTIFY_BUS_RESET register of the portal B 3302 of the 1394 bridge 101 in accordance with the format of FIG. 31.

The node B1 (106) transmits a connection request response to the node A1 using a write transaction shown in ④ of FIG. 33. In this way, the node A1 (104) establishes connection with the node B1 (106), and the bus reset manager of the 1394 bridge stores these bus IDs and node IDs in corresponding storage tables.

Similarly, the node B2 (107) as a digital video cam coder having an AV/C protocol as an upper protocol starts transmission/reception of an AV/C command with the node A2 (105) via the 1394 bridge using an AV/C protocol. For this purpose, the node B2 (107) performs the same write operation as ① of FIG. 33 in the bridge 101 so as to enable notifying a partner node of bus reset, as shown in ① of FIG. 34.

The node B2 (107) issues an AV/C command shown in ② of FIG. 34, and enters a response wait state. Also, the node A2 (105) which has received the AV/C command shown in ② of FIG. 34 performs the same write operation as ③ of FIG. 33 in the bridge 101 so as to enable notifying a partner node of bus reset, as shown in ③ of FIG. 34.

Assume that a device node A3 (108) shown in FIG. 1 is newly connected to the bus A by user operation in this network state. Then, bus reset occurs in accordance with IEEE 1394 characteristics.

In this case, no bus reset occurs on the bus B 103 whose connection configuration does not change. The node B1 (106) serving as the data transmission destination of the node A1 (104), and the node B2 (107) serving as the data transmission destination of the node A2 (105) do not start bus reset resume processing.

However, this causes the above problem, so that the second embodiment executes the following operation instead of the defined operation.

In the 1394 network system of the second embodiment, the bus reset manager 3304 of the 1394 bridge 101 comprises a means for notifying, of bus reset occurrence information on a bus connected to a bridge portal, a node stored in a storage table corresponding to this portal. Each node comprises a means for receiving a sub reset occurrence notification on a remote bus. This arrangement solves the above problem.

More specifically, the 1394 bridge 101 which has received a bus reset signal upon occurrence of bus reset on the bus A 102 performs bus reset processing by the node controller of the portal A 3301 connected to the bus A 102. The bus reset manager 3304 uses a 1394 write transaction to sequentially write packets containing data of the bus ID of a remote bus, i.e., the bus ID: 3FDh of the bus A suffering bus reset in accordance with the register format in the REMOTE_BUS_RESET registers arranged at address 0240 of the serial bus registers of respective nodes shown in FIG. 30 that are stored in the storage tables 3305 and 3306.

In the second embodiment, the bus IDs and node IDs of the node B1 (106) and node B2 (107) are stored in the storage tables, so that data are written in these nodes, as shown in ⑤ of FIG. 33 or ④ of FIG. 34.

As a result, the bus B 103 does not suffer bus reset, but can be notified of occurrence of bus reset on the remote bus A by writing the ID of the bus A 102 in the REMOTE_BUS_RESET register of each node that should be notified by the bridge 101.

The 1394 interface layer of each node which has detected write in the REMOTE_BUS_RESET register notifies the upper protocol layer of occurrence of bus reset on a remote bus and the bus ID information of the remote bus.

The node B1 (106), which establishes connection with the node A1 (104) on the bus A in accordance with a DPP protocol on the bus B and performs data transfer, checks the ID of the remote bus suffering bus reset, and confirms that the remote bus is the bus A 102 connected to a node as the connection destination of the node B1. Then, the node B1 recognizes that the connection destination node, i.e., node A1 (104) has started bus reset resume processing complying with a DPP protocol.

The node B1 (106) also starts processing corresponding to DPP bus reset processing, and enters a reception wait state for a reconnection request command from the node with which the node B1 (106) establishes connection. This ensures the consistency of DPP protocol processing between the node A1 (104) which starts bus reset processing after bus reset actually occurs, and the node B1 (106) connected to the bus B 103 on which no bus reset occurs.

After that, the node A1 (104) transmits a reconnection request command shown in ⑥ of FIG. 33 to the node B1 (106), and the node B1 (106) transmits a reconnection request response shown in ⑦ of FIG. 33 to the node A1 (104), thereby restarting data communication.

Similarly, the node B2 (107), which exchanges an AV/C command with the node A2 (105) on the bus A 102 in accordance with an AV/C protocol on the bus B 103, checks the ID of the remote bus suffering bus reset, and confirms that the remote bus is the bus A 102 connected to the node A2 (105) as the connection destination of the node B2. Then, the node B2 (107) recognizes that the connection destination node, i.e., node A2 (105) has started bus reset processing according to an AV/C protocol. The node B2 (107) also executes processing corresponding to AV/C bus reset processing, and processing in which an AV/C command sent before remote bus reset for which no response is received is regarded not to be executed and to be abandoned. This ensures the consistency of AV/C protocol processing between the node A2 (105) which starts bus reset processing after bus reset actually occurs, and the node B2 (107) connected to the bus B 103 on which no bus reset occurs.

The node B2 (107) resends an AV/C command shown in ⑤ of FIG. 34 to the node A2 (105). In response to this, the node A2 (105) transmits an AV/C response shown in ⑥ of FIG. 34 to the node B2 (107), thereby continuing communication.

Even when bus reset occurs on the bus B 103, the bus reset manager 3304 of the 1394 bridge 101 similarly notifies a target node on the bus A 102 of occurrence of bus reset, thereby maintaining the consistency of upper protocol processing.

As described above, the second embodiment provides an IEEE 1394 bridge having at least two portals respectively connected to different IEEE 1394 buses, characterized by comprising a bus reset management means made up of a means for monitoring bus reset of the IEEE 1394 buses inserted/removed to/from the respective portals, a means for designating either one of the IEEE 1394 buses connected to the respective portals, a means for designating a node on a network constituted by a plurality of IEEE 1394 buses connected via bridges, and a means for notifying the designated node of bus reset of the designated bus. This IEEE 1394 bridge can notify a node connected to a remote bus of occurrence of bus reset.

Third Embodiment

In the third embodiment, the basic configuration is the same as in the first and second embodiments shown in FIGS. 1 to 34, and a detailed description thereof will be omitted. Only the difference from the first and second embodiments will be described. The third embodiment is different from the second embodiment in communication control procedures complying with a DPP protocol. Communication control procedures complying with a DPP protocol in the third embodiment according to the present invention will be described with reference to FIG. 35.

Similar to the second embodiment, while the topology of a 1394 network is determined, and 1394 data transfer is normally performed, a node A1 as a digital still camera having a DPP as an upper protocol searches for a printer device which supports the DPP on the 1394 network, like the self node, in order to transfer image data to a printer connected to the 1394 network and print the image data in accordance with user operation or the trigger of an application.

While the node A1 read-accesses the ROM of each node on a local bus A 102, and then read-accesses the ROM of each node on a bus B 103 via a 1394 bridge, the node A1 detects that a node B1 is a printer as a DPP device. Assume that the node B1 comprises a REMOTE_BUS_RESET register, but the node A1 does not comprise it. The node B1 can know this from ROM information of the node A1.

In the third embodiment, when (3FFH) and (3FH) are respectively written in the bus ID field and node ID field of the format shown in FIG. 31 in the NOTIFY_BUS_RESET register of a bridge portal, a bus reset manager 3304 of a 1394 bridge 101 stores the bus ID and node ID of the writing node in a storage table corresponding to the written portal.

After the camera as the node A1 finds the node B1 which is a printer and has the same protocol as the DPP protocol supported by the node A1, the node A1 establishes connection with the node B1 in accordance with procedures and a format defined by the DPP protocol. To start transferring application data, the node A1 transmits a connection request shown in ① of FIG. 35 to the node B1 using a write transaction.

Figure 35:
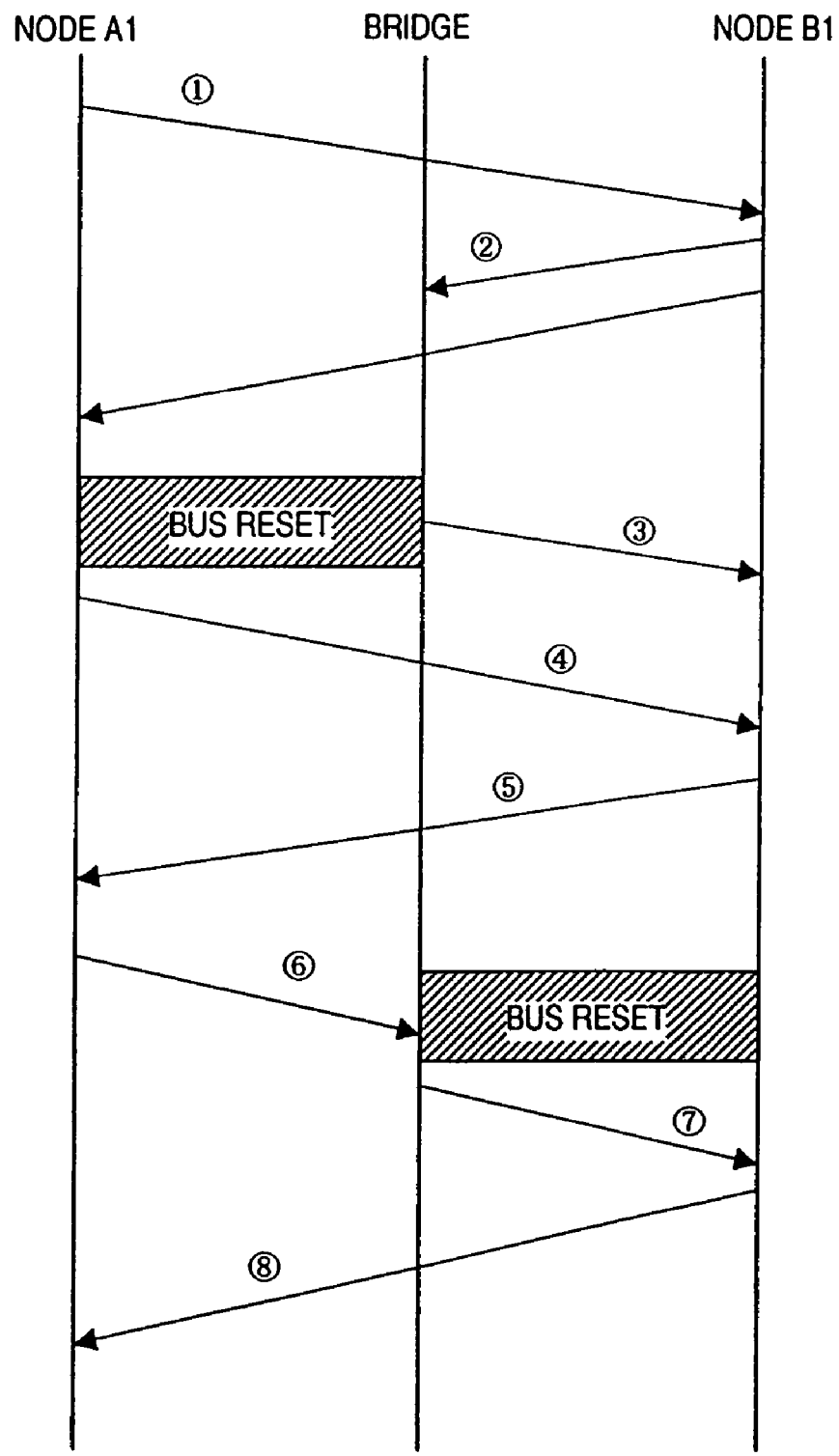
FIG. 35 is a view showing communication control procedures complying with a DPP protocol in the third embodiment according to the present invention.

At this time, as shown in ② of FIG. 35, the node B1 writes {(3FFH), (3FFH), (storage command)} in the NOTIFY_BUS_RESET register of the portal A 3301 of the 1394 bridge in accordance with the format of FIG. 31.

The bus reset manager of the 1394 bridge stores the bus ID and node ID of the node B1 in a storage table corresponding to the portal A. Then, the node B1 transmits a connection request response shown in ③ of FIG. 35 to the node A1 using a write transaction, and establishes connection.

Similar to the second embodiment, assume that a device node A3 (108 shown in FIG. 1) is newly connected to the bus A 102 by user operation in the network state shown in FIG. 1. Part of this control is different from the second embodiment.

Since the new node is additionally connected, bus reset occurs in accordance with IEEE 1394 characteristics. The 1394 interface layer of each node on the bus A 102 which has received a bus reset signal notifies the upper protocol layer of this information. At the same time, the node starts a series of bus reset resume processes such as a bus reset sequence and node ID determination sequence in order to automatically assign a node ID upon occurrence of bus reset.

After bus reset on the bus A 102 is notified to the DPP layer, the node A1 (104), which has established connection with the node B1 (106) on the bus B 103 in accordance with a DPP protocol on the bus A 102 and has performed data transfer, starts bus reset resume processing complying with the DPP protocol, similar to the first embodiment.

On the other hand, when no bus reset occurs in the bus B 103 whose connection configuration does not change, and bus reset occurs on the bus A 102, as described in the first embodiment, a bus reset signal is not propagated to the bus B 103. At this time, only nodes such as the nodes A1, A2, and A3 connected to the bus A start bus reset resume processing. The node B1 as the data transmission destination of the node A1 and the node B2 as the data transmission destination of the node A2 do not start this processing.

In the third embodiment, as well as the first embodiment, the 1394 bridge 101 which has received a bus reset signal upon occurrence of bus reset on the bus A 102 executes bus reset processing on the node controller side of the portal A 3301 connected to the bus A 102. The bus reset manager 3304 uses a 1394 write transaction to sequentially write packets containing data of the bus ID of a remote bus, i.e., the bus ID: 3FDh of the bus A 102 suffering bus reset in accordance with the register format in REMOTE_BUS_RESET registers arranged at address 0240 of respective nodes stored in storage tables 3305 and 3306. At the same time, the bus reset manager 3304 also writes data in the node B1, as shown in ④ of FIG. 35.

Although no bus reset occurs on the bus B, the bus B is notified of occurrence of bus reset on the remote bus A by writing the ID of the bus A 102 in the REMOTE_BUS_RESET register of each target node by the 1394 bridge 101.

The 1394 interface layer of each node which has detected write in the REMOTE_BUS_RESET register notifies the upper protocol layer of occurrence of bus reset on the remote bus and bus ID information of the remote bus.

The node B1 (106), which has established connection with the node A1 (104) on the bus A 102 in accordance with a DPP protocol on the bus B 103 and has performed data transfer, checks the ID of the remote bus suffering bus reset, and confirms that the remote bus is the bus A connected to a node as the connection destination of the node B1 (106). Then, the node B1 (106) recognizes that the connection destination node, i.e., node A1 (104) has started bus reset resume processing complying with a DPP protocol.

The node B1 (106) also starts processing corresponding to DPP bus reset processing, and enters a reception wait state for a reconnection request command from the node with which the node B1 (106) establishes connection. This ensures the consistency of DPP protocol processing between the node A1 which starts bus reset processing after bus reset actually occurs, and the node B1 connected to the bus B on which no bus reset occurs.

Thereafter, the node A1 transmits a reconnection request command shown in ⑤ of FIG. 35 to the node B1, and the node B1 transmits a reconnection request response shown in ⑥ of FIG. 35 to the node A1, thereby restarting data communication.

If bus reset occurs on the bus B, the node A1 on the bus A does not know occurrence of bus reset on the bus B. During bus reset on the bus B, the request of the node A1 is held by the bridge, and sent to the node B1 by the bridge after the end of bus reset on the bus B, as shown in ⑦ of FIG. 35. The node B1 transmits a reconnection request response to the node A1, as shown in (8) of FIG. 35, and can restart data communication.

Since the node B1 can maintain consistency after the end of bus reset, the node B1 can restart communication in response to a request from the node A1, as shown in FIG. 35.

As described above, the third embodiment provides an information communication system including a first IEEE 1394 bus connected to an IEEE 1394 bridge, a first node connected to the first IEEE 1394 bus, a second IEEE 1394 bus different from the first IEEE 1394 bus, and a second node connected to the second IEEE 1394 bus, the first and second nodes communicating with each other, characterized in that the first node instructs the IEEE 1394 bridge connected to the first IEEE 1394 bus to monitor bus reset on the first IEEE 1394 bus and notify the second node of bus reset on the first IEEE 1394 bus. This information communication system can notify a communication partner node connected to a remote bus of occurrence of bus reset on a bus connected to the self node.

If bus reset occurs on one local bus in performing data transfer from a data transmission node on one local bus to a data reception node connected to the other local bus via a 1394 bridge using the same upper protocol, the 1394 bridge can notify the node connected to the remote bus of bus reset. The reception node connected to the other bus can detect the bus reset, and maintain the consistency of bus reset processing in the upper protocol layer. This enables normal data communication between buses.

Fourth Embodiment

Figure 36:
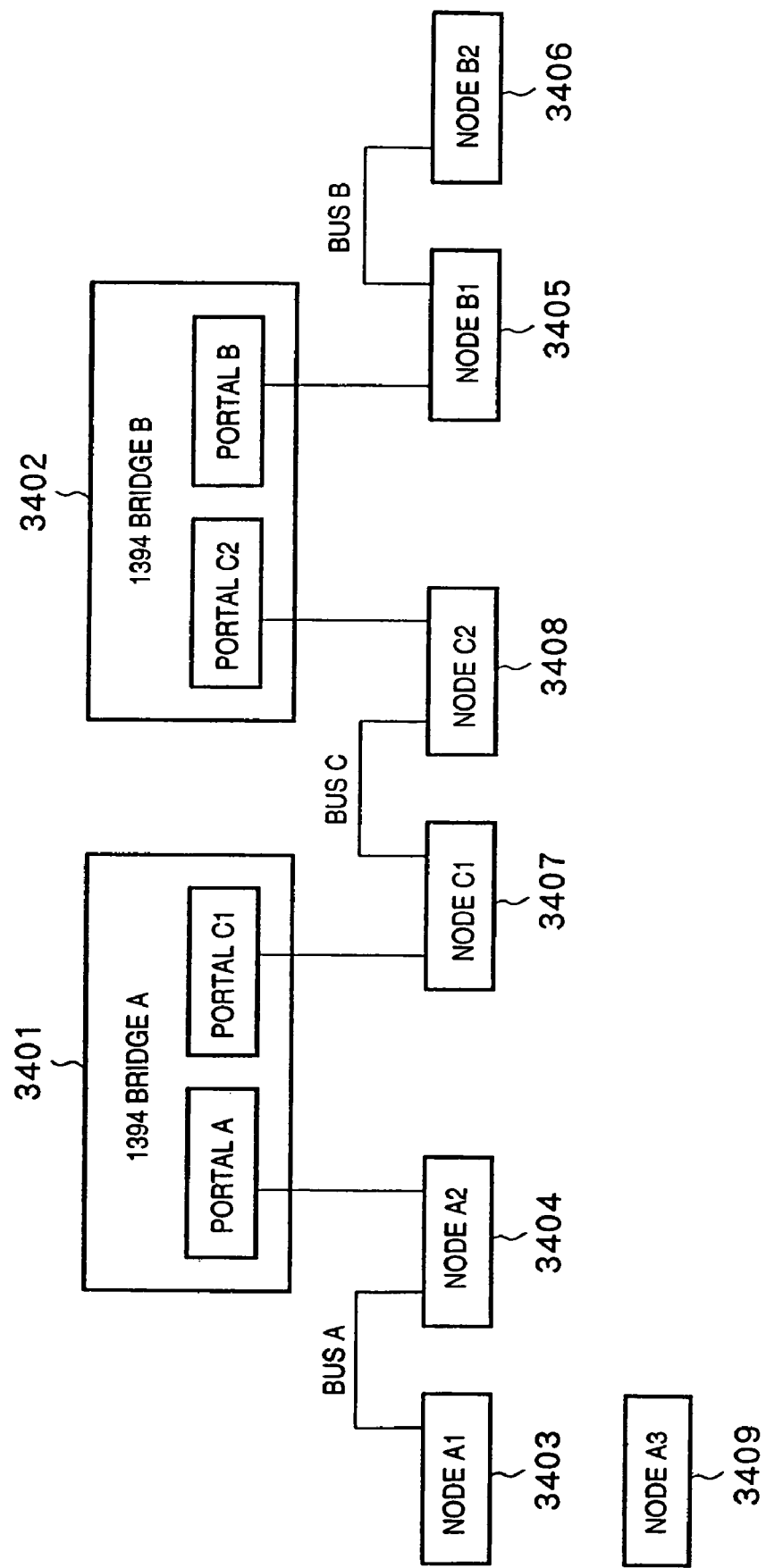
FIG. 36 is a block diagram showing the configuration of the fourth embodiment according to the present invention.

FIG. 36 is a block diagram showing the configuration of the fourth embodiment according to the present invention.

In the fourth embodiment, as shown in FIG. 36, a 1394 bridge A 3401 is connected to a bus A via a portal A, and to a bus C via a portal C1. A 1394 bridge B 3402 is connected to a bus B via a portal B, and the bus C via a portal C2.

The bus A is connected to a node A1 (3403) and node A2 (3404), the bus B is connected to a node B1 (3405) and node B2 (3406), and the bus C is connected to a node C1 (3407) and node C2 (3408).

The bus A has a bus ID (3FDh), the bus B has a bus ID (3FEh), and the bus C has a bus ID (3FCh).

The system of the fourth embodiment has the same building components as those in the third embodiment, and the 1394 bridge has the same arrangement as that shown in FIG. 32. Only the difference from the third embodiment will be described below.

In the fourth embodiment, as well as the second embodiment, after a camera as the node A1 finds the node B1 which is a printer and has the same protocol as the DPP protocol supported by the node A1, the node A1 establishes connection with the node B1 in accordance with the procedures and format defined by a DPP protocol shown in FIG. 37, and starts transferring application data. As shown in (1) of FIG. 37, the node A1 writes {(bus ID of bus B), (node ID of node B1), (storage command)}. in the NOTIFY_BUS_RESET register of the portal A of the 1394 bridge A 3401, and transmits a connection request shown in (2) of FIG. 37 to the node B1. In response to this, as shown in (3) of FIG. 37, the node B1 writes {(bus ID of bus A), (node ID of node A1), (storage command)} in the NOTIFY_BUS_RESET register of the portal B of the second 1394 bridge in accordance with the format of FIG. 31, and transmits a connection request shown in (4) of FIG. 37 to the node A1.

The bus reset managers of the 1394 bridges A 3401 and B 3402 store these bus IDs and node IDs in corresponding storage tables.

Similarly, the node B2 as a digital video cam coder having an AV/C protocol as an upper protocol starts exchanging an AV/C command with the node A2 via the 1394 bridges A 3401 and B 3402 using an AV/C protocol. The node B2 performs the same write operation as (1) of FIG. 37 in the second 1394 bridge in (1) of FIG. 38 so as to enable notifying a partner node of bus reset subsequently, the node B2 issues an AV/C command, as shown in (2) of FIG. 38, and enters a response wait state.

Figure 38:
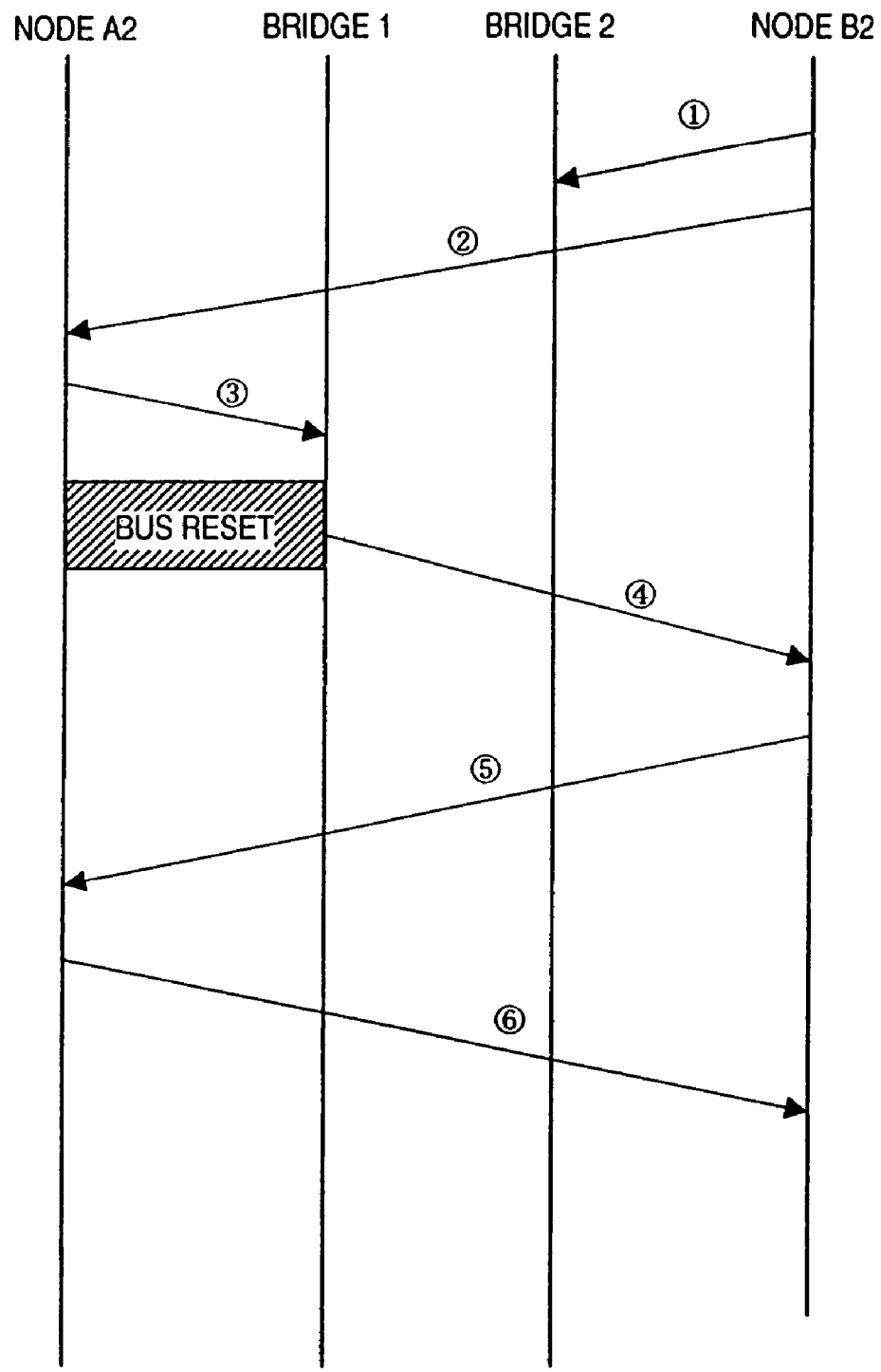
FIG. 38 is a view showing communication control procedures complying with an AV/C protocol in the fourth embodiment.

The node A2 which has received the command from the node B2 performs the same write operation as (1) of FIG. 38 in the first 1394 bridge so as to enable notifying a partner node of bus reset, as shown in (3) of FIG. 38.

Assume that a device node A3 (3409 in FIG. 36) is newly connected to the bus A by user operation in this network state. Since the new node is additionally connected, bus reset occurs in accordance with IEEE 1394 characteristics. The 1394 interface layer of each node on the bus A which has received a bus reset signal notifies the upper protocol layer of this information. At the same time, the node starts a series of bus reset resume processes such as a bus reset sequence and node ID determination sequence in order to automatically assign a node ID upon occurrence of bus reset.

In the fourth embodiment, as well as the first embodiment, the 1394 bridge A 3401 which has received a bus reset signal upon occurrence of bus reset on the bus A executes bus reset processing on the node controller side of the portal A connected to the bus A. The bus reset manager uses a 1394 write transaction to sequentially write packets containing data of the bus ID of a remote bus, i.e., the bus ID: 3FDh of the bus A suffering bus reset in accordance with the register format in REMOTE_BUS_RESET registers arranged at address 0240 of respective nodes stored in the storage tables, as shown in (5) of FIG. 37 or (4) of FIG. 38.

These packets are transmitted to the node on the bus B via the bus C and the 1394 bridge B 3402.

Although no bus reset occurs on the bus B, the bus B is notified of occurrence of bus reset on the remote bus A by writing the ID of the bus A in the REMOTE_BUS_RESET register of each node which should be notified to the storage table of the 1394 bridge B 3402.

The 1394 interface layer of each node which has detected write in the REMOTE_BUS_RESET register notifies the upper protocol layer of occurrence of bus reset on the remote bus and bus ID information of the remote bus.

Similar to the first embodiment, each node performs processing corresponding to bus reset to ensure the consistency of an upper protocol, as shown in (6) and (7) of FIG. 37 or (5) and (6) of FIG. 38.

Bus reset on the bus B can also be notified from the 1394 bridge B 3402 to the node on the bus A via the bus C and 1394 bridge A 3401, thereby maintaining the consistency of an upper protocol.

As described above, according to the fourth embodiment, a notification packet is transmitted to only a node to which bus reset must be notified. The traffic on the network does not greatly increase, and the performance of the network does not decrease.

The fourth embodiment provides an information communication system including a first IEEE 1394 bus connected to an IEEE 1394 bridge, a first node connected to the first IEEE 1394 bus, a second IEEE 1394 bus different from the first IEEE 1394 bus, and a second node connected to the second IEEE 1394 bus, the first and second nodes communicating with each other, characterized in that the second node instructs the IEEE 1394 bridge connected to the first IEEE 1394 bus to monitor bus reset on the first IEEE 1394 bus and notify the second node of bus reset on the first IEEE 1394 bus. This information communication system can notify the self node connected to a remote bus of occurrence of bus reset on a bus connected to a connection partner. Since the self node comprises an ability of maintaining consistency against bus reset on the remote bus, the node can communicate with a conventional device which is connected to the remote bus and to which the present invention is not applied.

Fifth Embodiment

In the fifth embodiment, the same reference numerals as in the second embodiment denote the same parts of the configuration and connection device in the fifth embodiment, and a detailed description thereof will be omitted.

In the fifth embodiment, similar to the first embodiment, the 1394 serial bus interface has the same arrangement as in the first embodiment shown in FIG. 23, and the configuration ROM of each node has the same format as shown in FIGS. 24 and 25. Further, an IEEE 1394 bridge device 101 has the same arrangement as in the second embodiment shown in FIG. 32.

The fifth embodiment is different from the above embodiments in that the format of an area where serial bus dependent registers from address 0200 to address 0400 shown in FIG. 25 has the format shown in FIG. 39.

The fifth embodiment uses address 023C, and does not require an area from address 0240, compared to the serial bus dependent registers shown in FIGS. 26 and 30. That is, the fifth embodiment is characterized by an operation with defined registers at address 0200 to address 0230 described in <Technical Overview of IEEE 1394 Standard>. The operation in the fifth embodiment adopting the 1394 bridge 101 with the same arrangement shown in FIG. 32 as the second embodiment will be described with reference to FIGS. 40 and 41.

Figure 40:
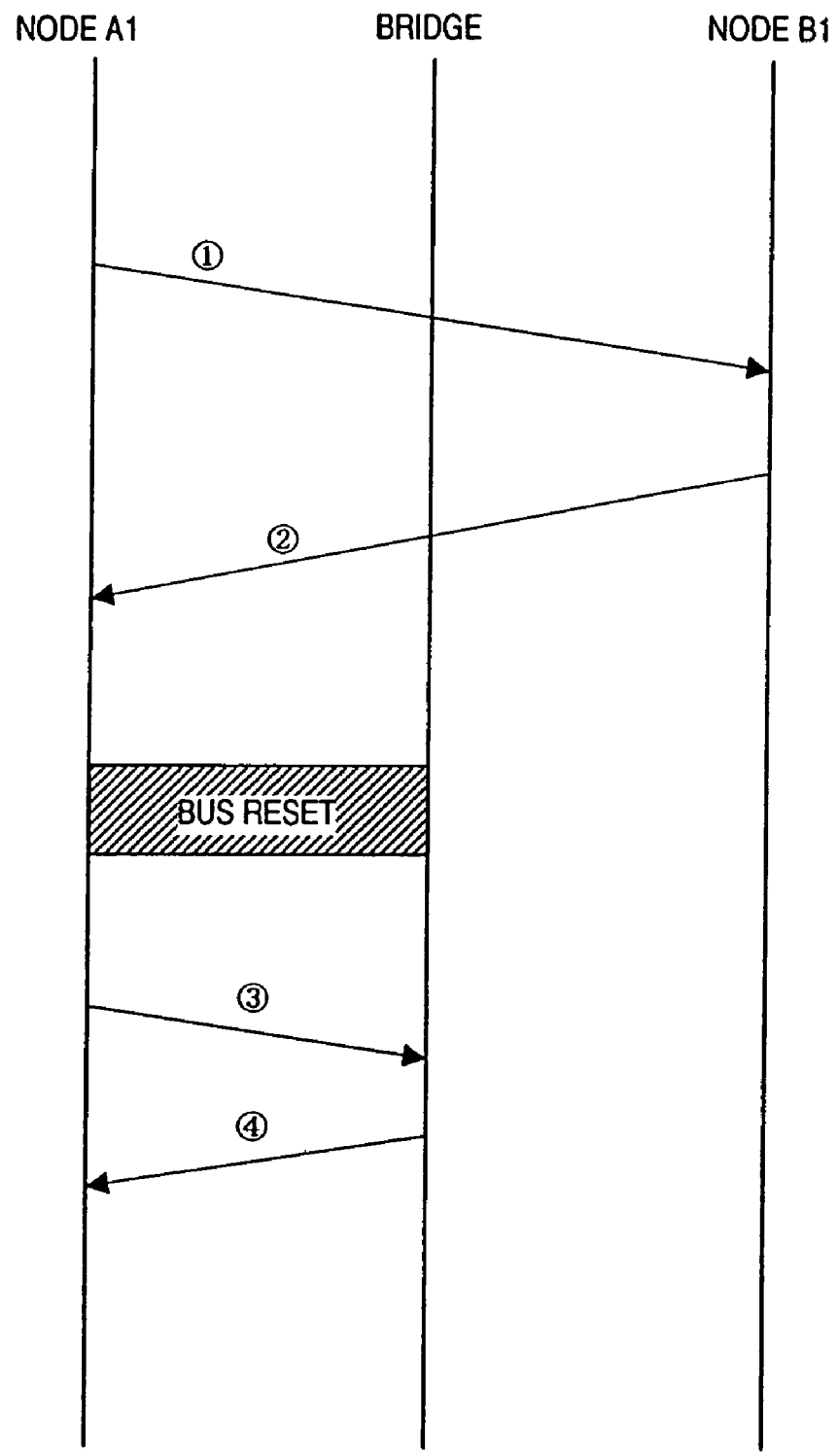
FIG. 40 is a view showing communication control procedures complying with a DPP protocol in the fifth embodiment.
Figure 41:
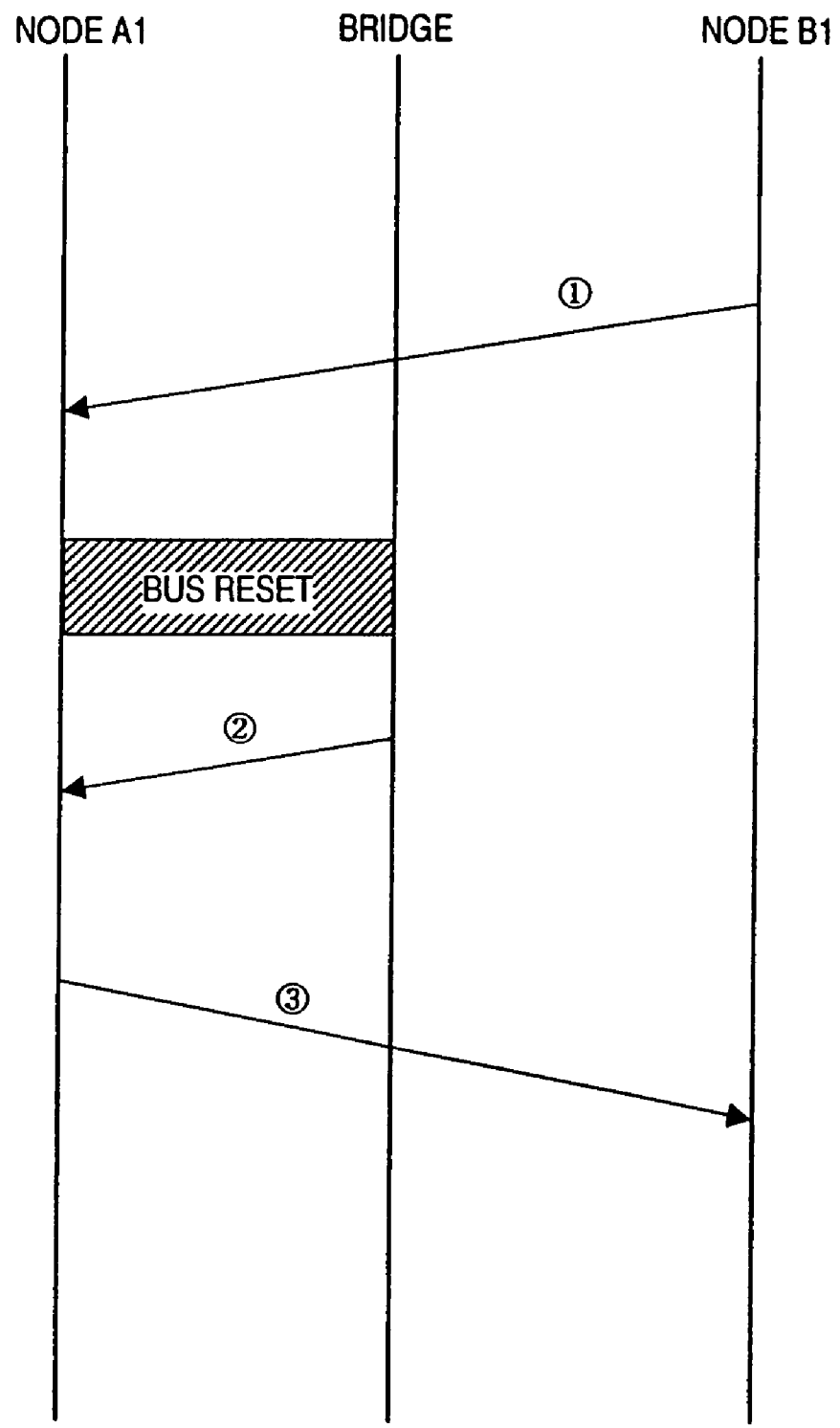
FIG. 41 is a view showing communication control procedures complying with an AV/C protocol in the fifth embodiment.

FIG. 40 is a view showing communication control procedures complying with a direct print protocol (to be referred to as a "DPP" hereinafter) in the fifth embodiment according to the present invention. FIG. 41 is a view showing communication control procedures complying with an AV/C protocol in the fifth embodiment.

Before buses A and B attain their current connection configurations, bus reset independently occurs on each bus every time a device node is additionally connected. A bus reset sequence and bus ID determination sequence are executed to automatically assign a node ID upon occurrence of bus reset, and a new topology is created.

Then, 1394 data transfer starts on each bus. Details of these sequences are described in "(6) Description of Sequence After Occurrence of Bus Reset" and "(8) Assignment of Node ID" of <Technical Overview of IEEE 1394 Standard>, and a description thereof will be omitted.

Although the operation changes depending on the connection order of connection nodes and the connection order of buses to the 1394 bridge, the bus reset-1394 initialization sequence is repeated every time a node is connected. Finally, a topology in which devices A1 and A2 are connected to the bus A via the 1394 bridge 101, and devices B1 and B2 are connected to the bus B is formed.

While the topology of the 1394 network is determined in this state, and 1394 data transfer is normally performed, the node A1 as a digital still camera having a DPP as an upper protocol searches for a printer device which supports the DPP on the 1394 network, like the self node, in order to transfer image data to a printer connected to the 1394 network and print the image data in accordance with user operation or the trigger of an application.

This is realized by read-accessing the configuration ROM of a partner node for a node connected to the network. This is described in the first embodiment with reference to FIG. 19. More specifically, the node uses an IEEE 1394 read transaction for the partner node to receive the ROM contents of the partner node as a read response.

As described above, 1394-related information is described in the configuration ROM of each node. Further, the basic function of each node such as a printer or camera is described in the instance directory, and an upper protocol such as an AV/C protocol or DPP and software information are described in the unit directory.

While the node A1 read-accesses the ROM of each node on the local bus A, and then read-accesses the ROM of each node on the bus B via the 1394 bridge, the node A1 detects that the node B1 is a printer as a DPP device.

Although details of a 1394 transaction via the 1394 bridge will be omitted, its standard is being defined by IEEE p1394.1.

After the camera as the node A1 finds the node B1 which is a printer and has the same protocol as the DPP protocol shown in FIG. 40 that is supported by the node A1, the node A1 establishes connection with the node B1 in accordance with procedures and a format defined by the DPP protocol.

More specifically, the node A1 transmits a connection request command to the node B1 using a write transaction, as shown in ① of FIG. 40. In response to this, the node B1 transmits a connection request response shown in ② of FIG. 40 to the node A1.

At this time, the 1394 bridge 101 traces communication between these nodes, and stores an identification set of the bus ID and node ID of the node B1, those of the node A1, and the DPP protocol in a connection management table 3105.

Similarly, the node B2 as a digital video cam coder having an AV/C protocol as an upper protocol starts transmission/reception of an AV/C command with the node A2 shown in FIG. 41 via the 1394 bridge using an AV/C protocol. The node B2 issues an AV/C command shown in ① of FIG. 41, and enters a response wait state.

The 1394 bridge 101 traces communication between these nodes, and stores an identification set of the bus ID and node ID of the node B2, those of the node A2, and the AV/C protocol in the connection management table 3105.

Assume that a device node A3 (node 108 shown in FIG. 1) is newly connected to the bus A by user operation in this network state. Then, bus reset occurs, as described above, and a series of bus reset resume processes start. When bus reset on the bus A is notified to the DPP layer, the node A1, which has established connection with the node B1 on the bus B in accordance with a DPP protocol on the bus A and has performed data transfer, starts the above-described bus reset resume processing complying with the DPP protocol.

On the bus B whose connection configuration is not changed, no bus reset occurs. If bus reset occurs on the bus A connected via the 1394 bridge 101, the bus B detects this, but the characteristics of the 1394 bridge 101 in the fifth embodiment prevent any bus reset signal from propagating to another bus, i.e., the bus B in this case.

Hence, only nodes such as the nodes A1, A2, and A3 connected to the bus A start bus reset resume processing. The node B1 as the data transmission destination of the node A1 and the node B2 as the data transmission destination of the node A2 do not start this processing.

In the 1394 network system of the fifth embodiment, the 1394 bridge 101 comprises a means for storing connection information containing the upper protocol of a node which establishes connection via the bridge, and performing, by the bridge, bus reset resume processing of the upper protocol layer which should be executed by a node connected to the other node upon occurrence of bus reset on one bus.

More specifically, the 1394 bridge 101 which has received a bus reset signal upon occurrence of bus reset on the bus A executes bus reset processing on the node controller side connected to the bus A. At the same time, the 1394 bridge 101 confirms a node on the bus A which starts bus reset resume processing of the upper protocol layer, from connection information stored in the connection management table.

The node A1 of the bus A transmits a reconnection command shown in ③ of FIG. 40 to the node B1 with which the node A1 establishes connection to transfer data. The 1394 bridge does not transmit this to the node B1, but transmits a reconnection response shown in ④ of FIG. 40 to the node A1 in place of the node B1. This ensures the consistency of DPP protocol processing between the node A1 which starts bus reset processing after bus reset actually occurs, and the node B1 connected to the bus B on which no bus reset occurs.

The node B2, which has exchanged an AV/C command with the node A2 on the bus A in accordance with an AV/C protocol on the bus B, wait for a response from the node A2. However, the communication destination node A2 starts bus reset processing complying with an AV/C protocol, and abandons the command received from the node B2 because bus reset has occurred on the connected bus A. The 1394 bridge knows that a response from the node A2 is not transmitted to the node B2. Thus, the 1394 bridge resends an AV/C command which the node B2 sent before remote bus reset and for which no response is received, to the node A2, as shown in ② of FIG. 41.

This ensures the consistency of AV/C protocol processing between the node A2 which starts bus reset processing after bus reset actually occurs, and the node B2 connected to the bus B on which no bus reset occurs. Thus, subsequent communication control procedures can be smoothly executed, as shown in, e.g., ③ of FIG. 41.

As described above, the fifth embodiment provides an information communication system including a first IEEE 1394 bus connected to an IEEE 1394 bridge, a first node connected to the first IEEE 1394 bus, a second IEEE 1394 bus different from the first IEEE 1394 bus, and a second node connected to the second IEEE 1394 bus, the first and second nodes communicating with each other, characterized in that the IEEE 1394 bridge comprises a means for interpreting an upper protocol used by communication between the first and second nodes, and a means for performing processing which should be done by the second node, by the bridge instead of the second node when bus reset occurs on the first IEEE 1394 bus, and when bus reset occurs on the first IEEE 1394 bus, the IEEE bus bridge performs processing which should be executed upon occurrence of bus reset between the first node and the IEEE 1394 bridge, thereby performing communication between the first and second nodes regardless of bus reset on the first IEEE 1394 bus.

According to the fifth embodiment, if bus reset occurs on one local bus in performing data transfer from a data transmission node on one local bus to a data reception node connected to the other local bus via a 1394 bridge using the same upper protocol, the 1394 bridge 101 can execute bus reset resume processing instead of the node on the remote bus.

As a result, the consistency of bus reset processing in the upper protocol layer can be maintained without notifying the reception node connected to the other bus of occurrence of bus reset. This realizes normal data communication between buses.

More specifically, in a system in which a plurality of communication control networks (e.g., IEEE 1394 buses) are connected via connection devices (e.g., IEEE 1394 bridges), if a network configuration update request (e.g., IEEE 1394 bus reset) occurs in one communication control network in performing data transfer from a data transmission communication device of one communication network to a data reception communication device connected to the other communication control network via a connection device using the same upper protocol, the connection device can execute network configuration update resume processing instead of the communication device connected to the communication control network. The consistency of network configuration update request processing in the upper protocol layer can be ensured without notifying the reception communication device connected to the other communication control network of the network configuration update request. This enables normal data communication between communication control networks.

Other Embodiment

The present invention may be applied to a system constituted by a plurality of devices (e.g., a host computer, interface device, reader, and printer) or an apparatus comprising a single device (e.g., a copying machine or facsimile apparatus).

The object of the present invention is realized even by supplying a storage medium storing software program codes for realizing the functions of the above-described embodiments to a system or apparatus, and causing the computer (or a CPU or MPU) of the system or apparatus to read out and execute the program codes stored in the storage medium.

In this case, the program codes read out from the storage medium realize the functions of the above-described embodiments by themselves, and the storage medium storing the program codes constitutes the present invention.

As a storage medium for supplying the program codes, a floppy disk, hard disk, optical disk, magnetooptical disk, CD-ROM, CD-R, magnetic tape, nonvolatile memory card, ROM, or the like can be used.

The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

When the present invention is applied to the above storage medium, program codes corresponding to the above-described flow charts are stored in this storage medium.

As many apparently widely different embodiments of the present invention can be made without departing from the spirit and scope thereof, it is to be understood that the invention is not limited to the specific embodiments thereof except as defined in the appended claims.

The invention claimed is:

1. An information communication system connectable to serial buses via a serial bridge, wherein the serial bridge comprises:
   at least two portals respectively connected to different serial buses;
   a registration table for registering serial bus specifying information and information of a connected node for each connected serial bus;
   a monitoring unit constructed to monitor bus reset on the serial bus connected to each portal; and
   a re-registration unit constructed to, when said monitoring unit detects bus reset, rewrite contents of the registration table corresponding to the serial bus on which bus reset is detected in accordance with newly updated node information, wherein a change in system configuration can be recognized from the updated registration table, and
   wherein the serial bridge further comprises a communication management unit configured to manage a communication state of the connected node for each connected serial bus, and when said monitoring unit detects bus reset, said monitoring unit notifies, of re-registration, a node rewritten by said re-registration unit and the connected node for each connected serial bus having a communication state managed by said communication management unit.

2. The system according to claim 1, wherein said communication management unit comprises a communication state write portion in which a node communication state can be written for each node connected to the bus, and said communication management unit manages the node communication state by writing information of a communication partner node in the communication state write portion.

3. The system according to claim 2, wherein the system further comprises a confirmation unit constructed to confirm occurrence of bus reset on a bus connected to the communication partner node from the node connected to the serial bus, and if a node written when said re-registration unit detects rewrite of the re-registration table in correspondence with detection of bus reset by said monitoring unit corresponds to the node having the communication state managed by said communication management unit, said confirmation unit rewrites node information of said communication management unit in correspondence with re-registration, thereby enabling confirming occurrence of bus reset on the bus connected to the communication partner node.

4. The system according to claim 1,
   wherein the serial bus specifying information includes a bus ID assigned to each bus, and the node information includes a node ID assigned to each node, and
   wherein the serial bridge comprises:
   a notification request reception unit adapted to receive a notification request to a communication partner node from a node connected to a bus on which bus reset has occurred; and
   a notification unit adapted to notify the communication partner node in accordance with the notification request from said notification request reception unit.

5. The system according to claim 1,
   wherein the serial bus specifying information includes a bus ID assigned to each bus, and the node information includes a node ID assigned to each node, and
   wherein the serial bus includes an IEEE 1394 bus complying with IEEE 1394, and the serial bridge includes an IEEE 1394 bridge complying with IEEE 1394.

* * * * *